US011954623B2

United States Patent
Moorthy et al.

(10) Patent No.: US 11,954,623 B2
(45) Date of Patent: Apr. 9, 2024

(54) APPARATUS AND METHOD FOR RESOURCE ALLOCATION PREDICTION AND MODELING, AND RESOURCE ACQUISITION OFFER GENERATION, ADJUSTMENT AND APPROVAL

(71) Applicant: Assurant, Inc., New York, NY (US)

(72) Inventors: Satish Moorthy, Wayne, PA (US); Jay Stauffer, Jr., Wayne, PA (US); Brett Caltabiano, Atlanta, GA (US); Ronnie Jeffries, III, York, PA (US); Vivek Kumar Jha, New York, NY (US); Deepak Kumar Dhirasaria, New York, NY (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 16/416,883

(22) Filed: May 20, 2019

(65) Prior Publication Data
US 2020/0042920 A1   Feb. 6, 2020

Related U.S. Application Data

(60) Provisional application No. 62/673,325, filed on May 18, 2018.

(51) Int. Cl.
*G06Q 10/0631* (2023.01)
*G06N 7/01* (2023.01)
(Continued)

(52) U.S. Cl.
CPC ......... *G06Q 10/06315* (2013.01); *G06N 7/01* (2023.01); *G06N 20/00* (2019.01); *G06Q 30/0202* (2013.01)

(58) Field of Classification Search
CPC ......... G06Q 10/06315; G06Q 30/0202; G06N 20/00; G06N 7/005
(Continued)

(56) References Cited

U.S. PATENT DOCUMENTS 8,386,639 B1   2/2013  Galvin
2002/0077954 A1  6/2002  Slaight et al.
(Continued)

FOREIGN PATENT DOCUMENTS

CN      113230658 A  *  8/2021  ........... A63F 13/358
EP        3817337 A1     5/2021
JP     2006-527884 A    12/2006

OTHER PUBLICATIONS

Cloud for Scientific and Business Applications: Taxonomy, Vision, and Research Challenges; Netto et al; 2018 (Year: 2018).*
(Continued)

*Primary Examiner* — Brian M Epstein
*Assistant Examiner* — Francis Z. Santiago Merced
(74) *Attorney, Agent, or Firm* — Alston & Bird LLP

(57) ABSTRACT

An apparatus, method, and computer program product are provided for the improved and automatic prediction and modeling of one or more channels and relevant conditions through which resources may be directed to users in an environment where resource demand, utility, and perceived value vary over time. Some example implementations employ predictive, machine-learning modeling to facilitate the use of multiple disparate and unrelated data sets to extrapolate and otherwise predict the future needs for certain resources and identify the channels and conditions that may be employed to meet such future needs. An apparatus, method, system, and computer program product are provided for improved generating, adjusting, and/or facilitating
(Continued)

approval of a resource offer set. Some example implementations employ one or more predictive models.

19 Claims, 16 Drawing Sheets

(51) Int. Cl.
  *G06N 20/00* (2019.01)
  *G06Q 30/0202* (2023.01)
(58) Field of Classification Search
  USPC .......................................................... 705/7.25
  See application file for complete search history.

(56) References Cited

U.S. PATENT DOCUMENTS

| | | | |
|---|---|---|---|
| 2005/0055694 A1* | 3/2005 | Lee | G06F 9/4881 718/100 |
| 2005/0289042 A1* | 12/2005 | Friesen | G06Q 40/04 705/37 |
| 2010/0107172 A1 | 4/2010 | Calinescu et al. | |
| 2010/0235715 A1* | 9/2010 | Thatcher | G11C 16/26 714/763 |
| 2012/0054642 A1* | 3/2012 | Balsiger | G06Q 10/10 715/752 |
| 2012/0150860 A1* | 6/2012 | Bhamidipati | G06F 16/355 707/E17.09 |
| 2013/0018651 A1* | 1/2013 | Djordjevic | G06Q 10/00 704/9 |
| 2013/0080641 A1 | 3/2013 | Lui et al. | |
| 2013/0290234 A1* | 10/2013 | Harris | G06Q 30/00 901/50 |
| 2014/0006132 A1 | 1/2014 | Barker | |
| 2015/0379595 A1 | 12/2015 | Gange | |
| 2016/0092898 A1 | 3/2016 | Wang | |
| 2016/0171599 A1* | 6/2016 | Bray | G06Q 30/08 705/26.3 |
| 2016/0292624 A1* | 10/2016 | Curtland | G06Q 10/087 |
| 2017/0147941 A1* | 5/2017 | Bauer | G06N 20/10 |
| 2017/0161783 A1 | 6/2017 | Nair | |
| 2017/0293763 A1 | 10/2017 | Shear et al. | |
| 2018/0018732 A1 | 1/2018 | Wang | |
| 2018/0032928 A1* | 2/2018 | Li | G06Q 10/08 |
| 2018/0096290 A1* | 4/2018 | Awad | G06Q 30/0635 |
| 2018/0240148 A1 | 8/2018 | Georgoff et al. | |
| 2018/0308025 A1* | 10/2018 | Bansal | G06N 3/02 |
| 2021/0133761 A1 | 5/2021 | Cartwright et al. | |

OTHER PUBLICATIONS

1 Invitation to pay additional fees for corresponding International Application No. PCT/US19/33015, dated Jul. 31, 2019.
International Search Report and Written Opinion for PCT/US19/33105 dated Sep. 20, 2019.
Extended European Search Report (EESR) for EP Application No. 19802591.8 dated Jan. 31, 2022 (12 pages).
Data Collection and Wireless Communication in IoT Using Economic Analysis and Pricing Models ; Nguyen; 2016; IEEE, see abstract. (Year: 2016).

* cited by examiner

APPARATUS AND METHOD FOR RESOURCE ALLOCATION PREDICTION AND MODELING, AND RESOURCE ACQUISITION OFFER GENERATION, ADJUSTMENT AND APPROVAL

CROSS-REFERENCE TO RELATED APPLICATIONS

This application claims the benefit of U.S. Provisional Patent Application No. 62/673,325, filed May 18, 2018, which is hereby incorporated by reference herein in its entirety as if fully set forth herein.

TECHNICAL FIELD

An example embodiment relates generally to the use of machine-learning, predictive models to implement the efficient allocation of time-sensitive resources. Example implementations are particularly directed to systems, methods, and apparatuses for predicting and modeling future demand for time-sensitive, depreciating objects in resource-constrained environments. Additional or alternative example embodiments relate to improved generation a resource offer set, and/or improved visualization and display of such resource offer set for analysis, adjustment, and approval.

BACKGROUND

Many of today's network environments are dynamically resource-constrained, at least in the sense that the need for resources, and the nature of the needed resources, can change rapidly and significantly over time and geography. Some of the technical challenges that hinder the effective and efficient allocation of resources in such environments are compounded in situations where the supply, utility, and/or value of the needed resources changes over time. Additionally, in this regard, acquisition of resources for a particular time and/or geography can change significantly. Technical challenges in data compilation, analysis, visualization, and manipulation associated with conventional systems hinder efficient resource acquisition planning. The inventors of the invention disclosed herein have identified these and other technical challenges, and developed the solutions described and otherwise referenced herein.

BRIEF SUMMARY

An apparatus, computer program product, and method are therefore provided in accordance with an example embodiment in order permit the efficient determining of one or more channels and/or related conditions through which a particular resource set may be effectively distributed. In this regard, the method, apparatus and computer program product of an example embodiment provide for the creation of predicted channel and condition data set that can be stored within a renderable object and otherwise presented to a user via an interface of a client device.

Moreover, the method, apparatus, and computer program product of an example embodiment provide for use of the machine learning model in connection with the determination and retrieval of a predicted channel and condition data set determined based at least in part on context data associated with a particular resource set to be distributed at a time in the future.

In an example embodiment, an apparatus is provided, the apparatus comprising a processor and a memory, the memory comprising instructions that configure the apparatus to: receive a request data object from a client device associated with a user; extract, from the message request data object, a request data set, wherein the request data set is associated with a first set of resources; receive a first context data object, wherein the first context data object is associated with one or more resource distribution channels; retrieve a predicted channel and condition data set, wherein retrieving the predicted channel and condition data set comprises applying the request data set and the first context data object to a first model; and generate a control signal causing a renderable object comprising the predicted channel and condition data set to be displayed on a user interface of the client device associated with the user.

In another example embodiment, a computer program product is provided, the computer program product comprising at least one non-transitory computer-readable storage medium having computer-executable program code instructions stored therein, the computer-executable program code instructions comprising program code instructions configured to: receive a request data object from a client device associated with a user; extract, from the message request data object, a request data set, wherein the request data set is associated with a first set of resources; receive a first context data object, wherein the first context data object is associated with one or more resource distribution channels; retrieve a predicted channel and condition data set, wherein retrieving the predicted channel and condition data set comprises applying the request data set and the first context data object to a first model; and generate a control signal causing a renderable object comprising the predicted channel and condition data set to be displayed on a user interface of the client device associated with the user.

In another example embodiment, a method for determining a predicted future demand for resources in a dynamic environment is provided, the method comprising: receiving a request data object from a client device associated with a user; extracting, from the message request data object, a request data set, wherein the request data set is associated with a first set of resources; receiving a first context data object, wherein the first context data object is associated with one or more resource distribution channels; retrieving a predicted channel and condition data set, wherein retrieving the predicted channel and condition data set comprises applying the request data set and the first context data object to a first model; and generating a control signal causing a renderable object comprising the predicted channel and condition data set to be displayed on a user interface of the client device associated with the user.

BRIEF DESCRIPTION OF THE DRAWINGS

Figure 1:
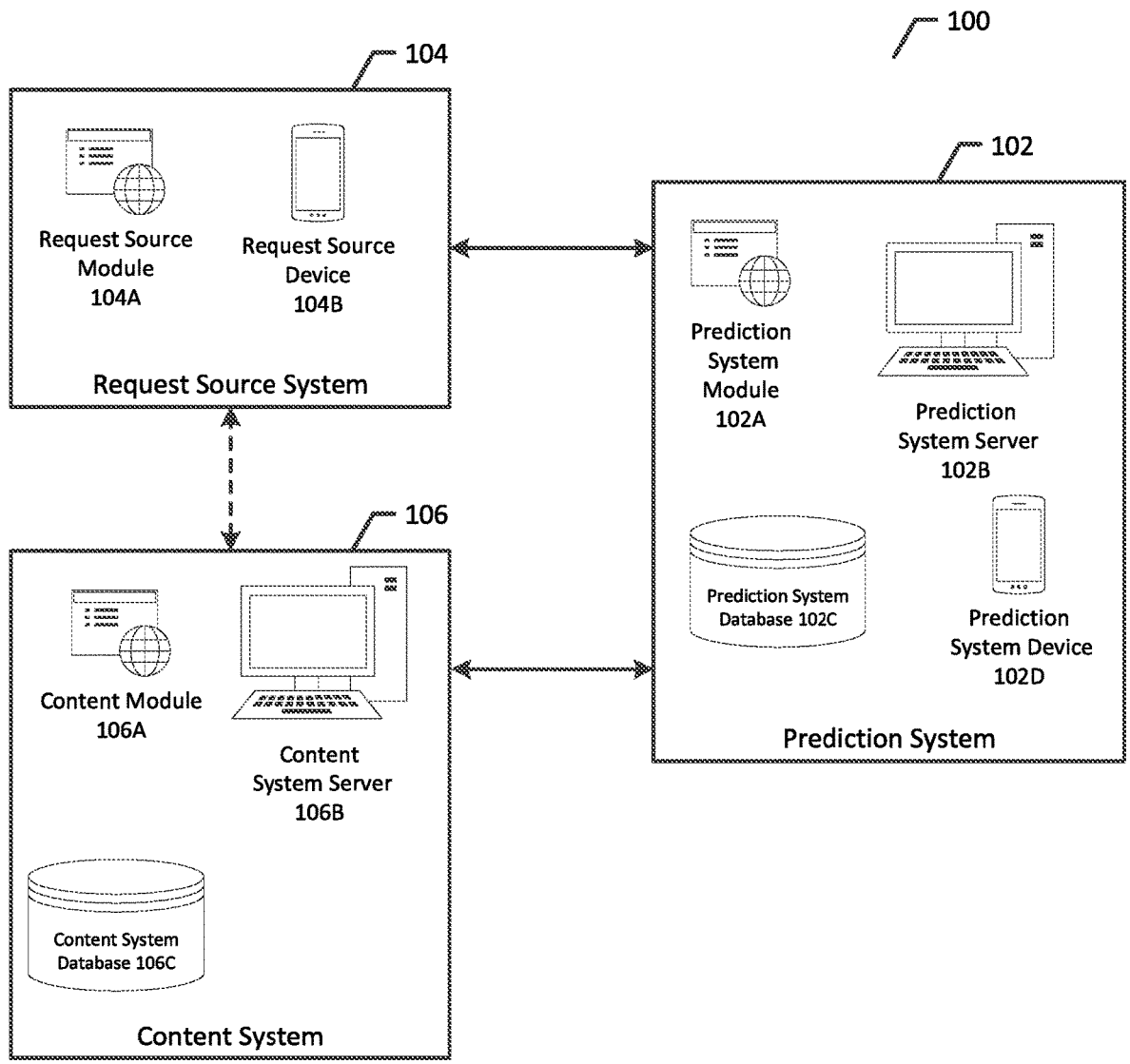
Figure 2:
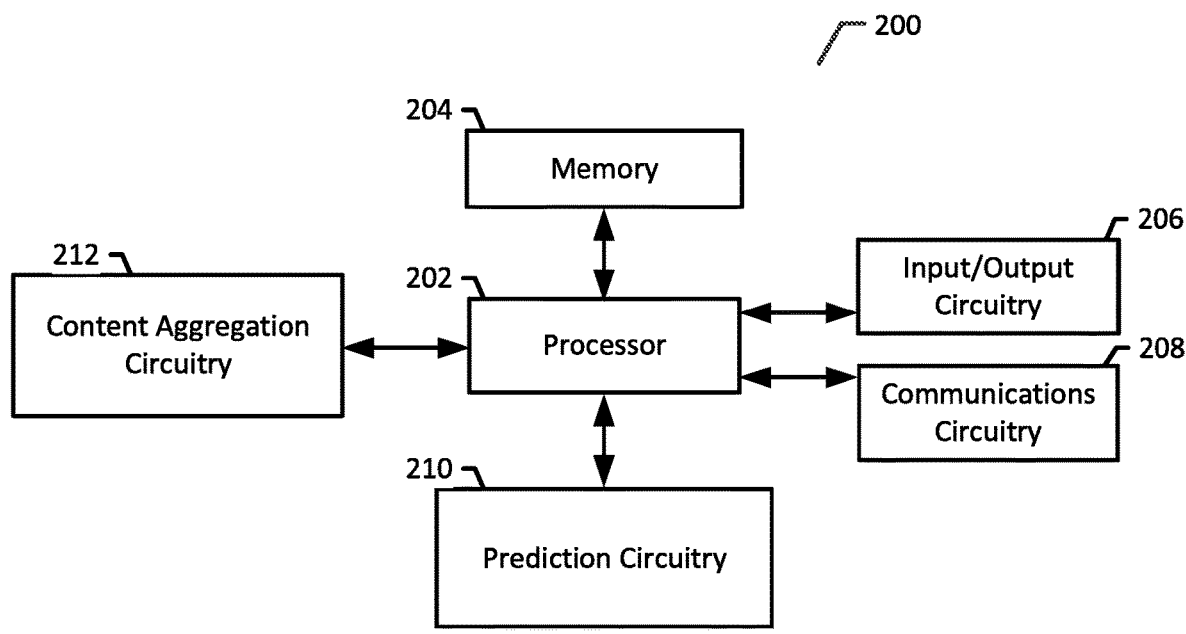
Figure 3:
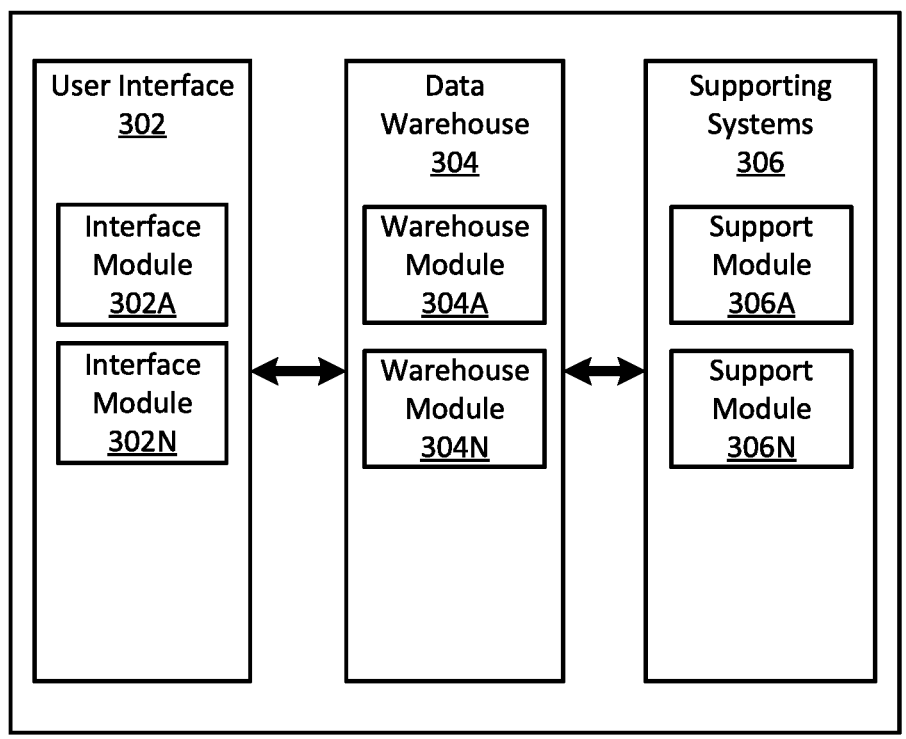
Figure 4:
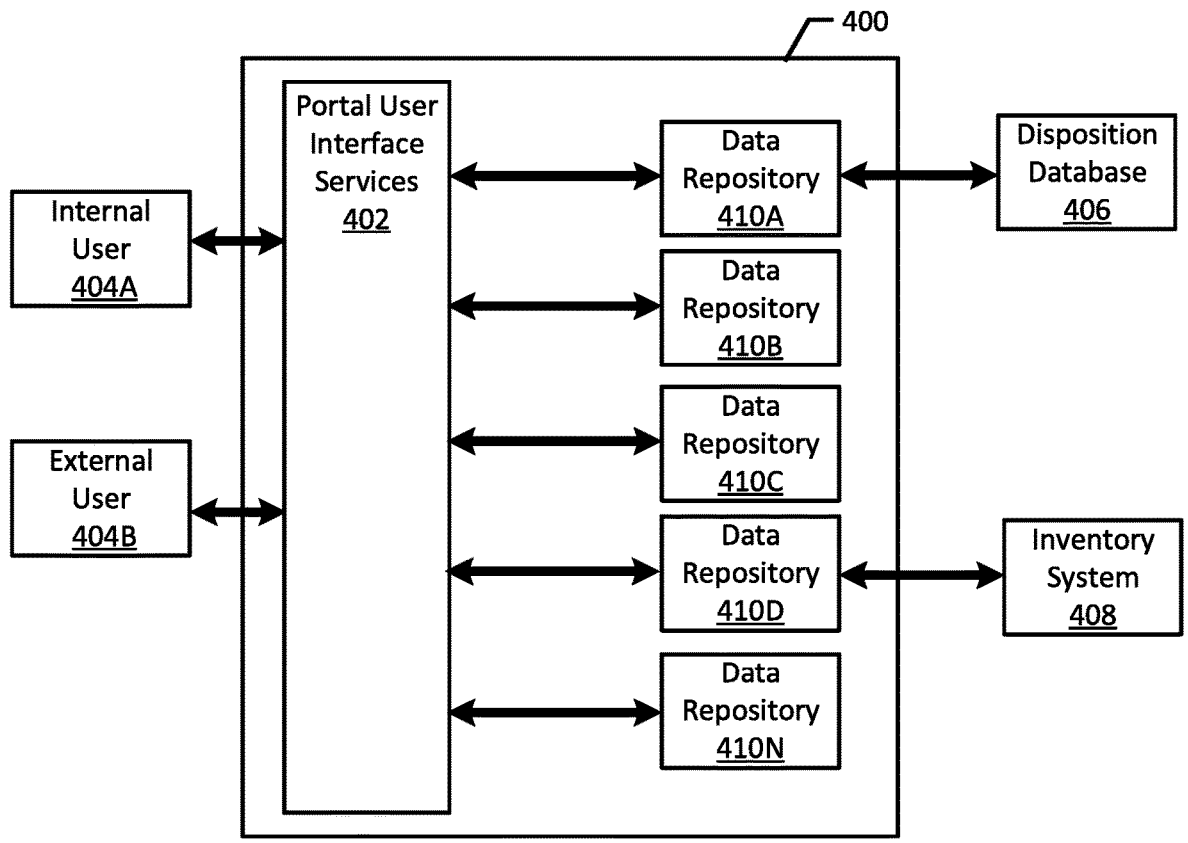
Figure 5:
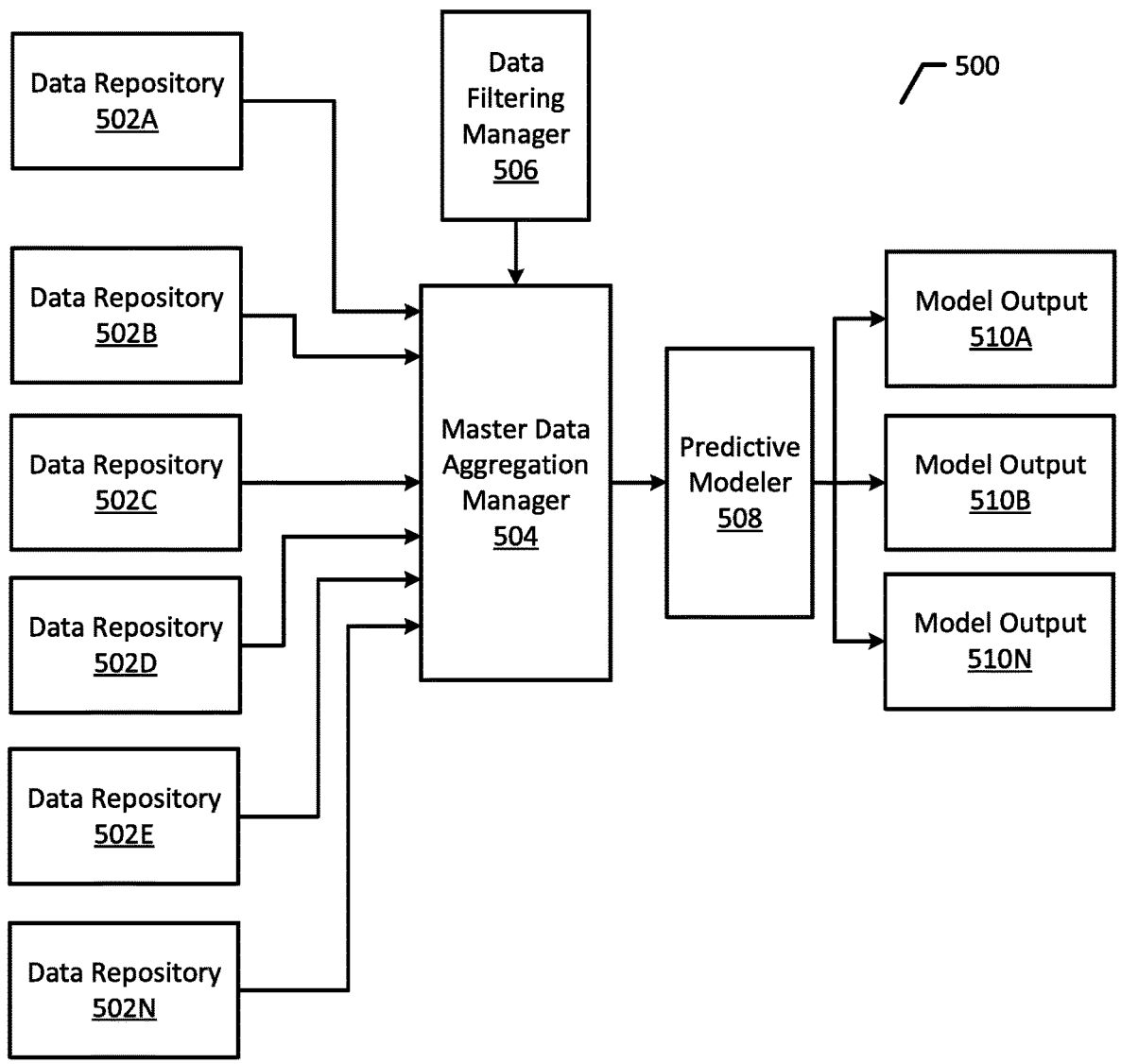
Figure 6:
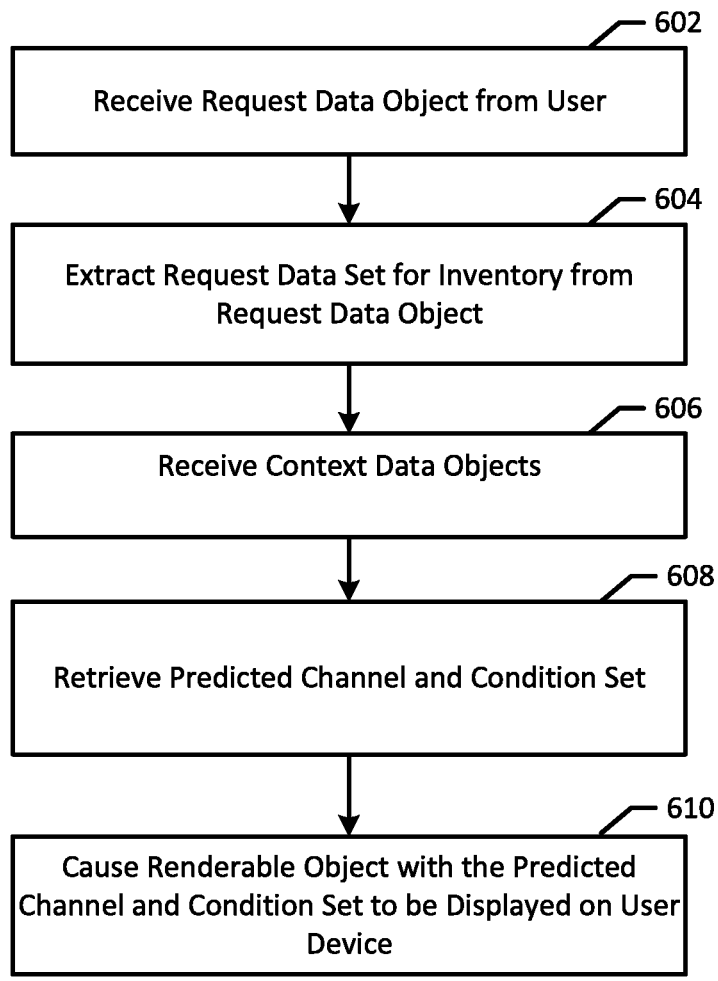
Figure 7:
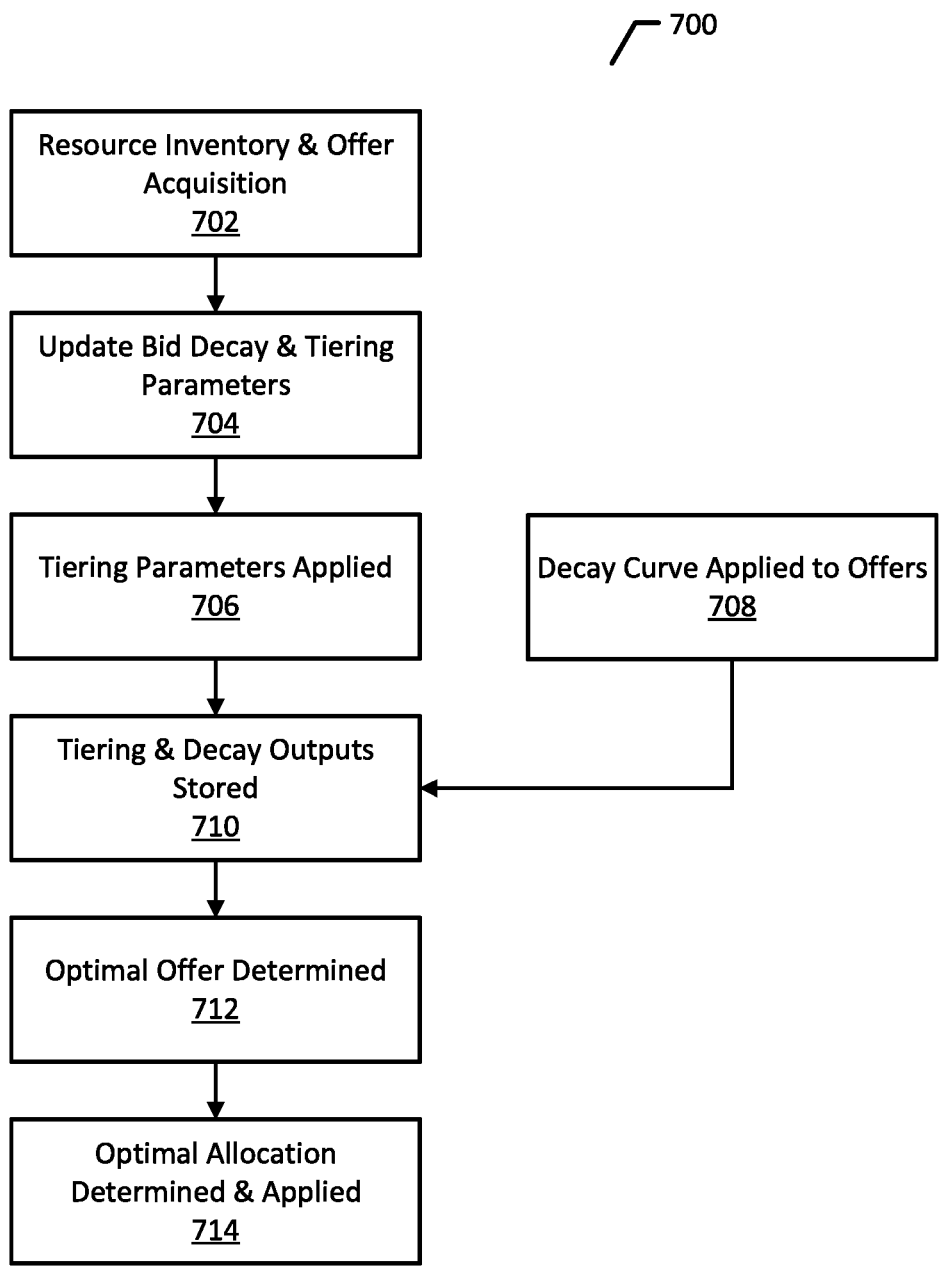
Figure 8:
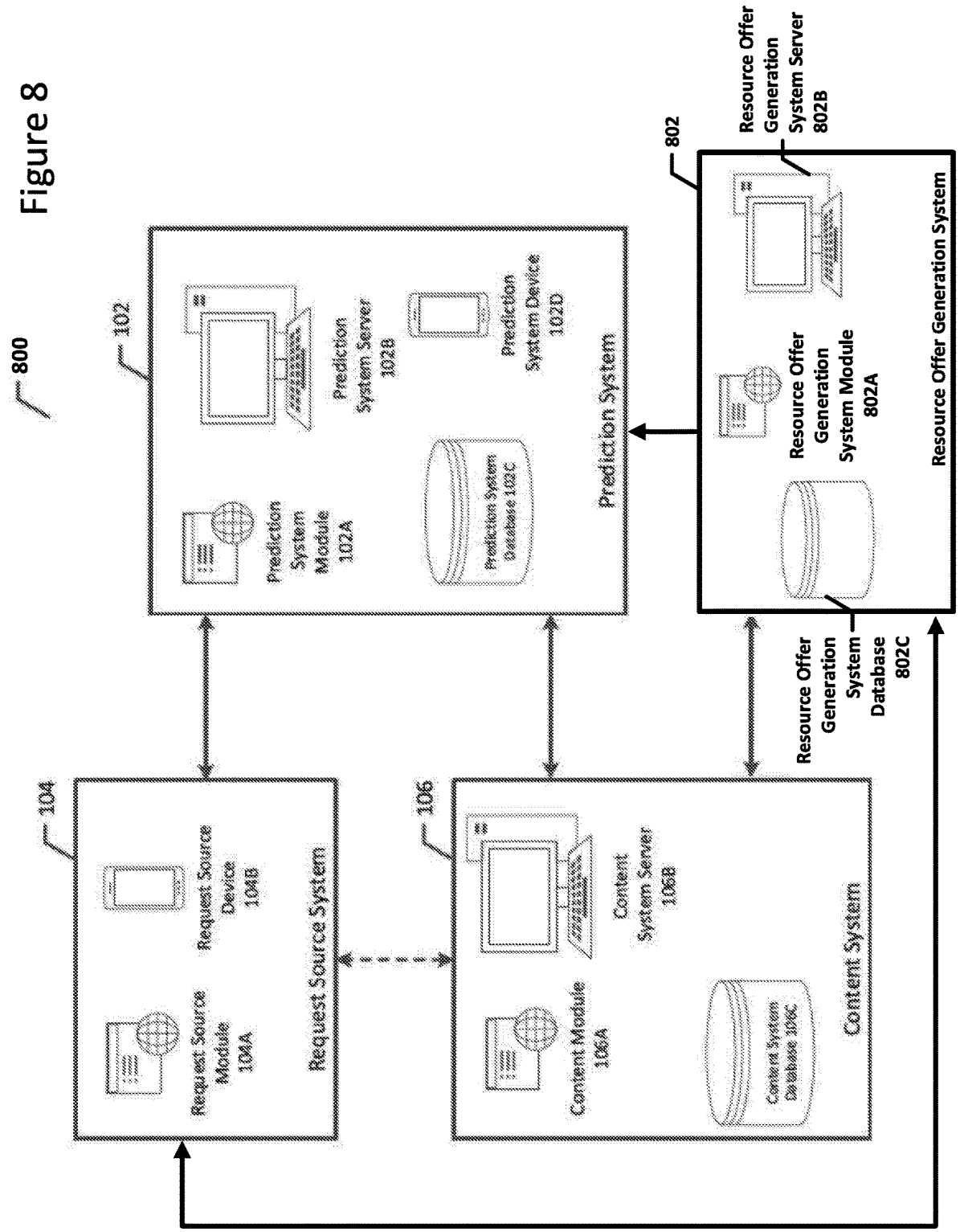
Figure 9:
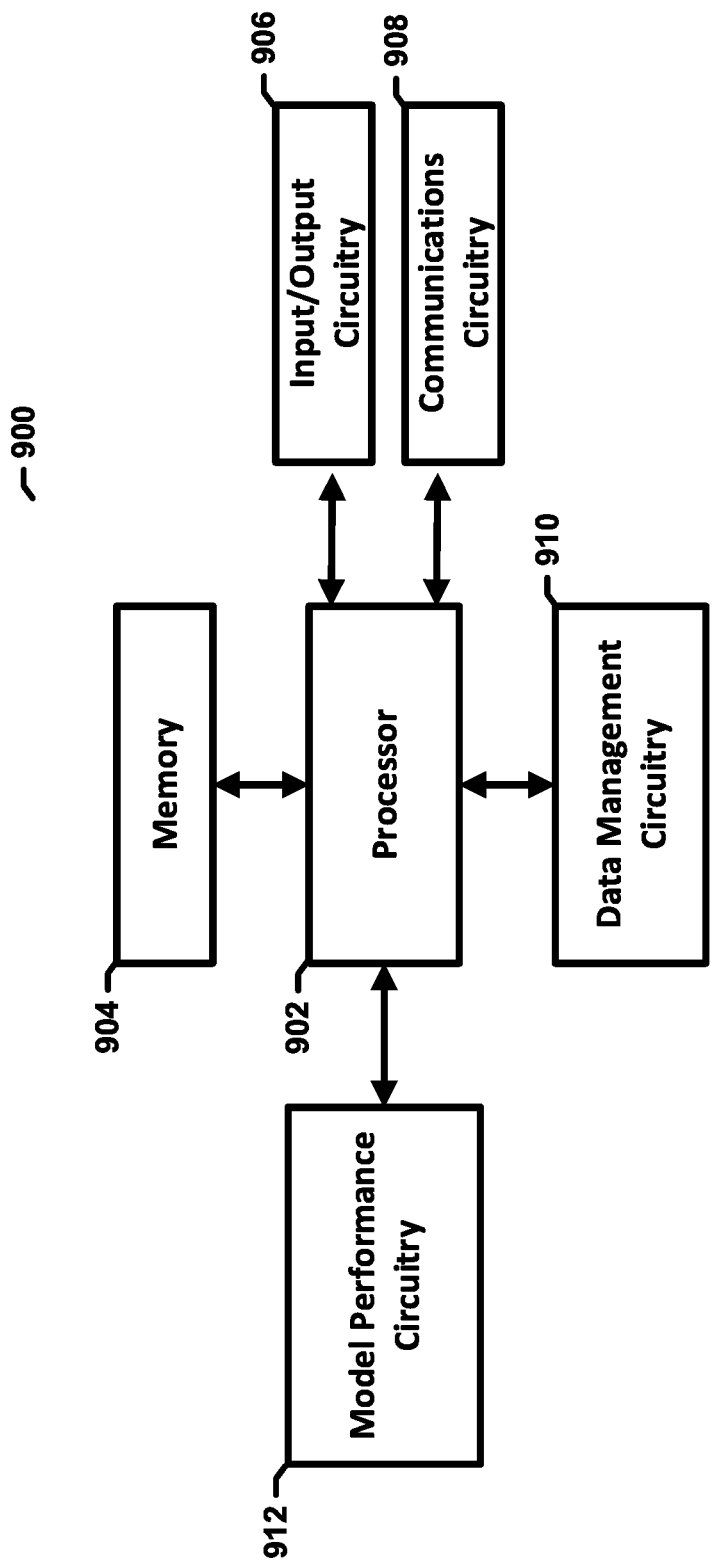
Figure 10:
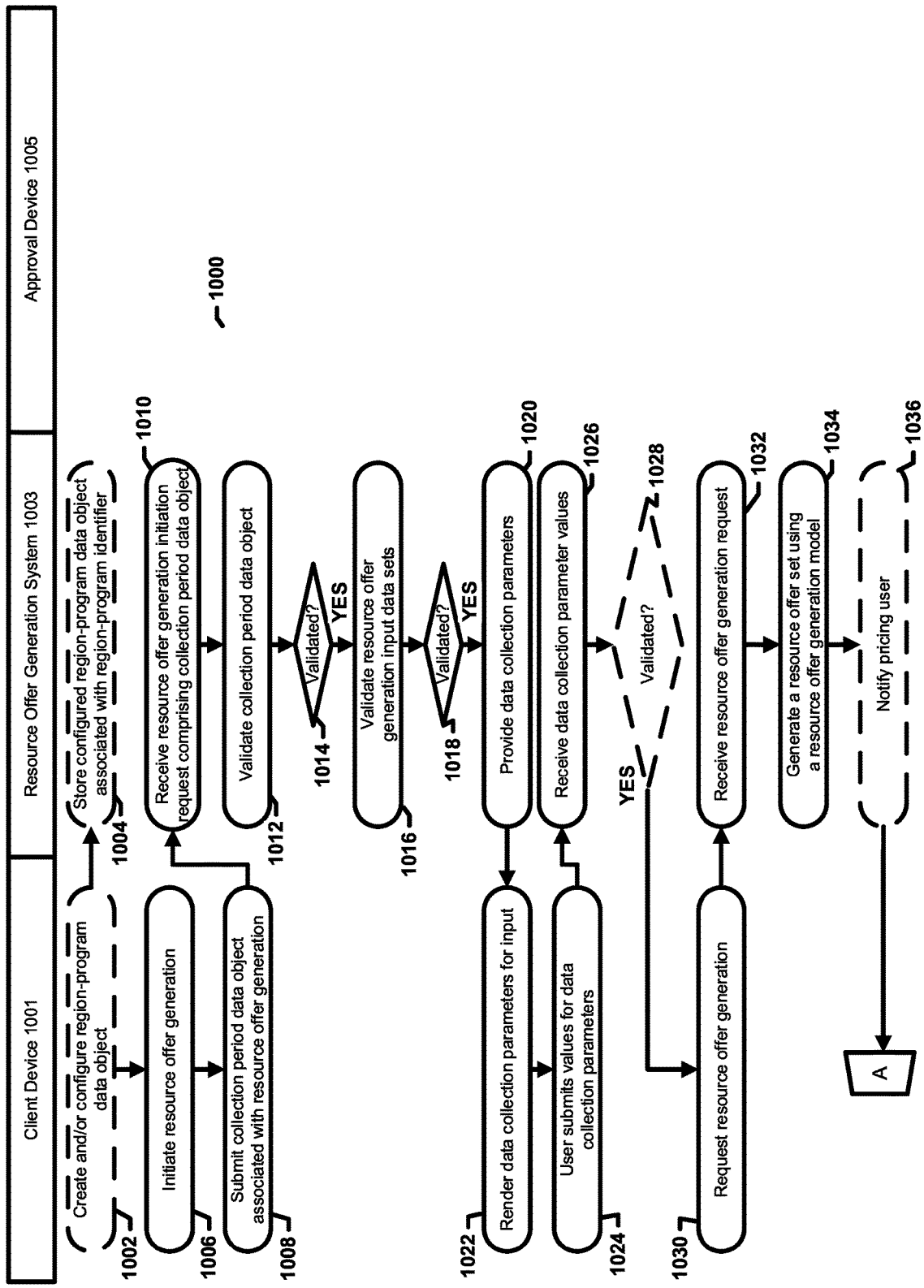
Figure 11:
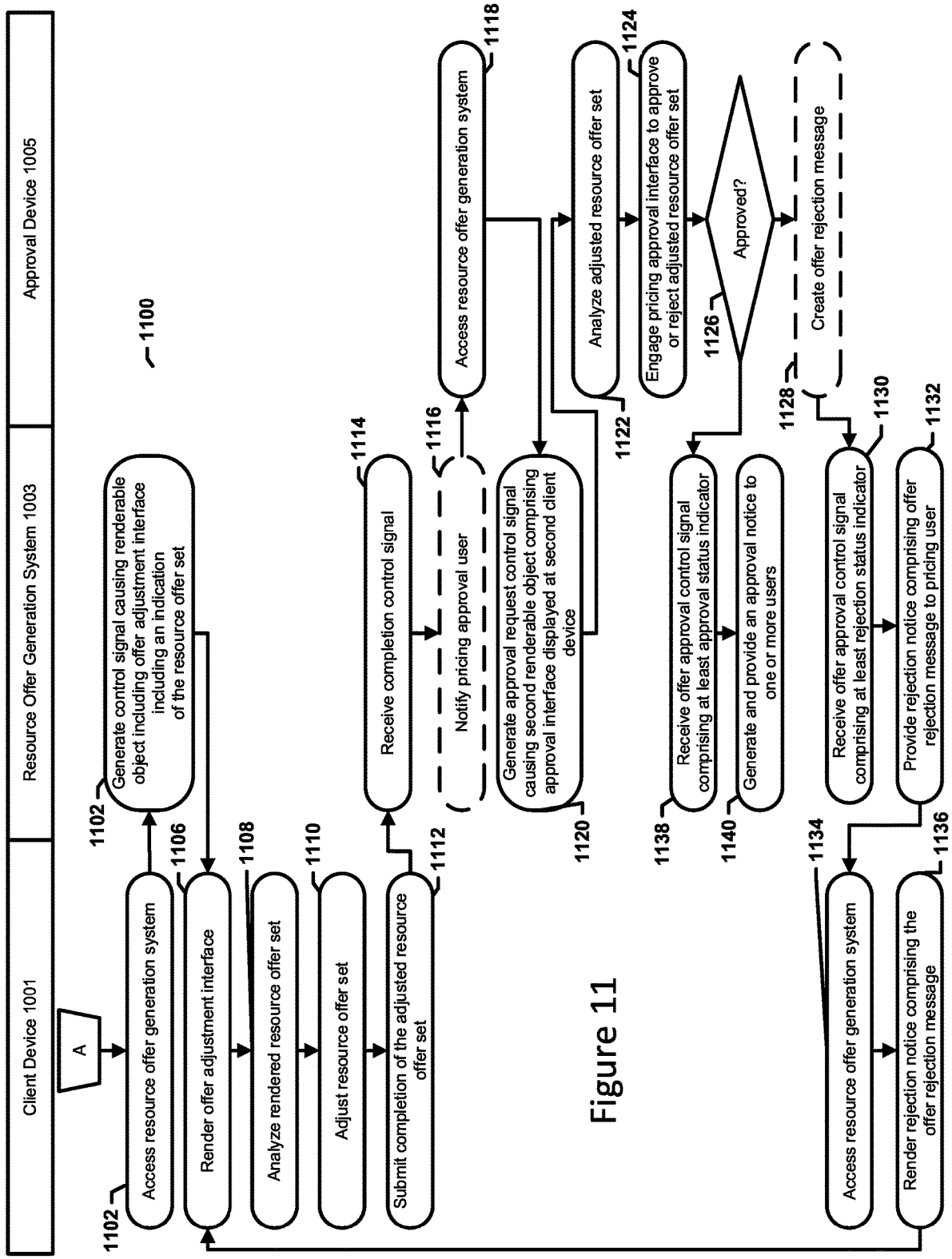
Figure 12A:
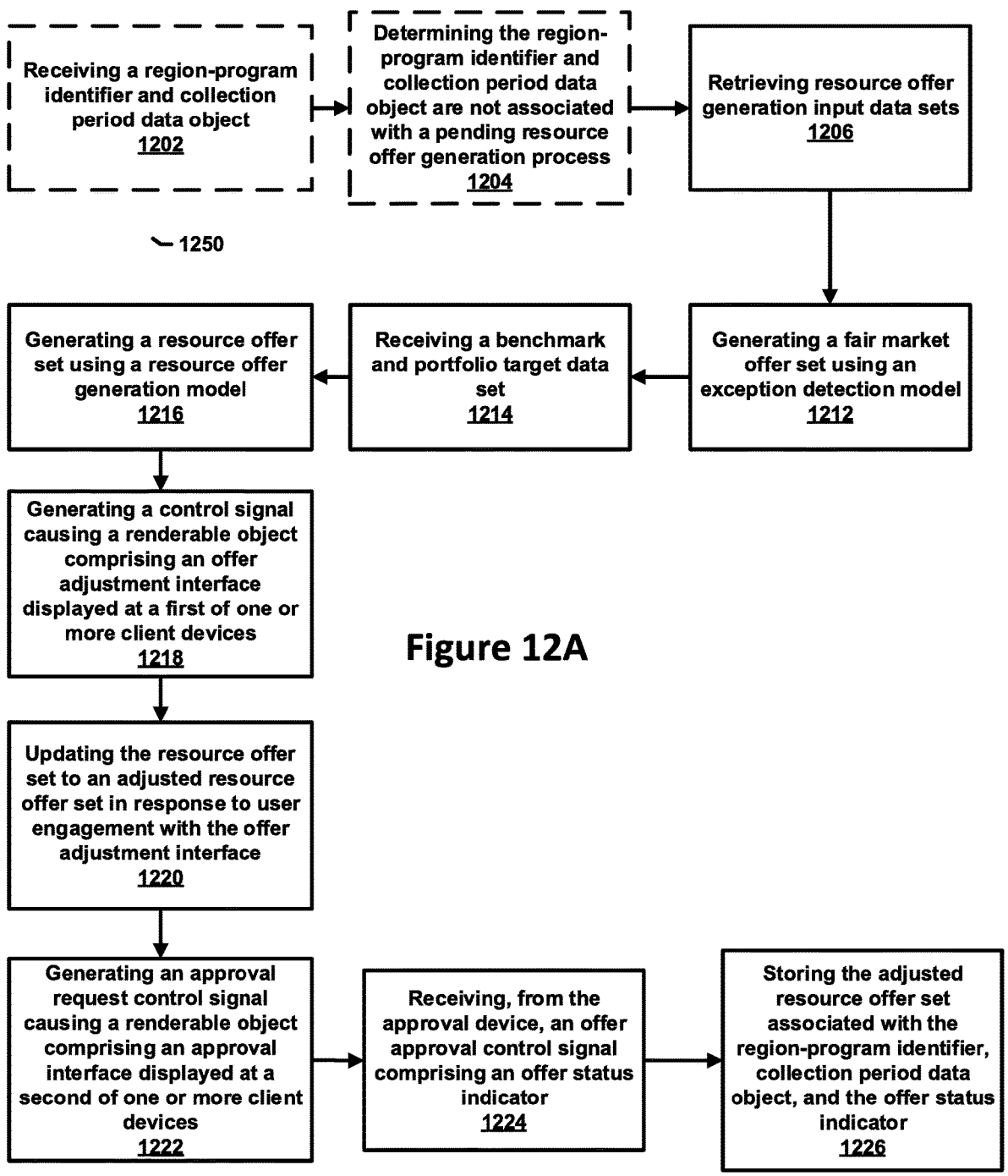
Figure 12B:
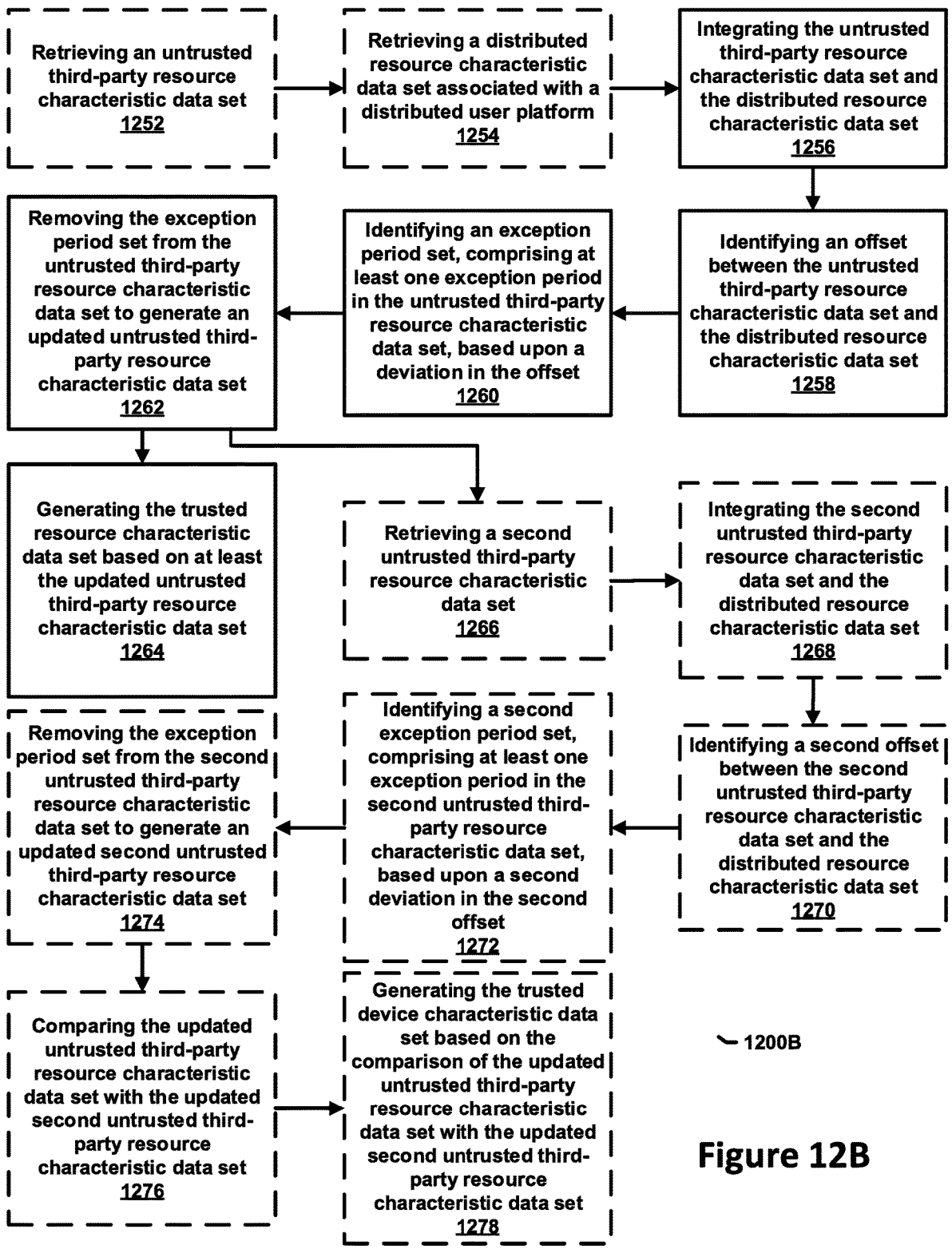
Figure 13:
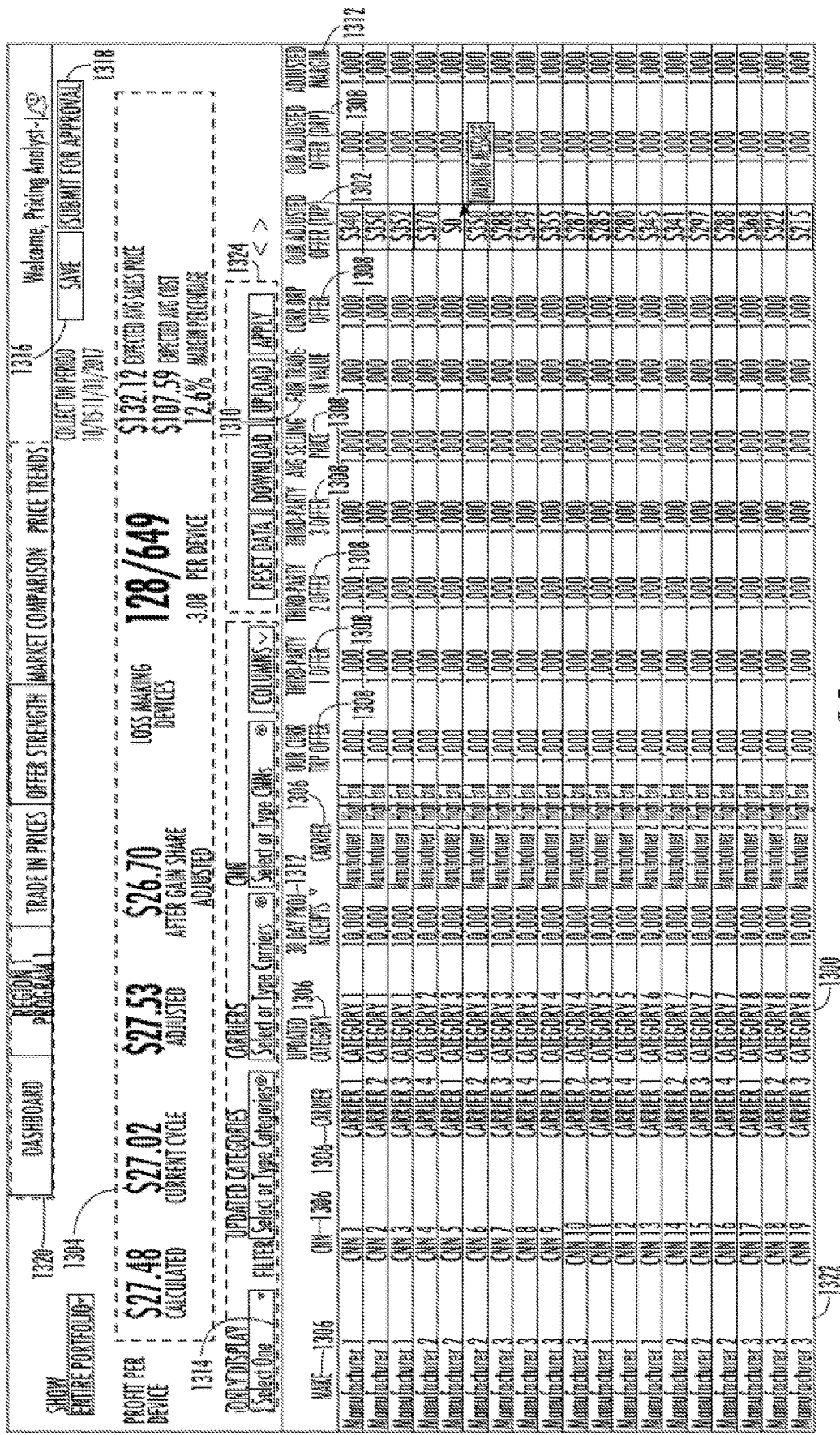
Figure 14:
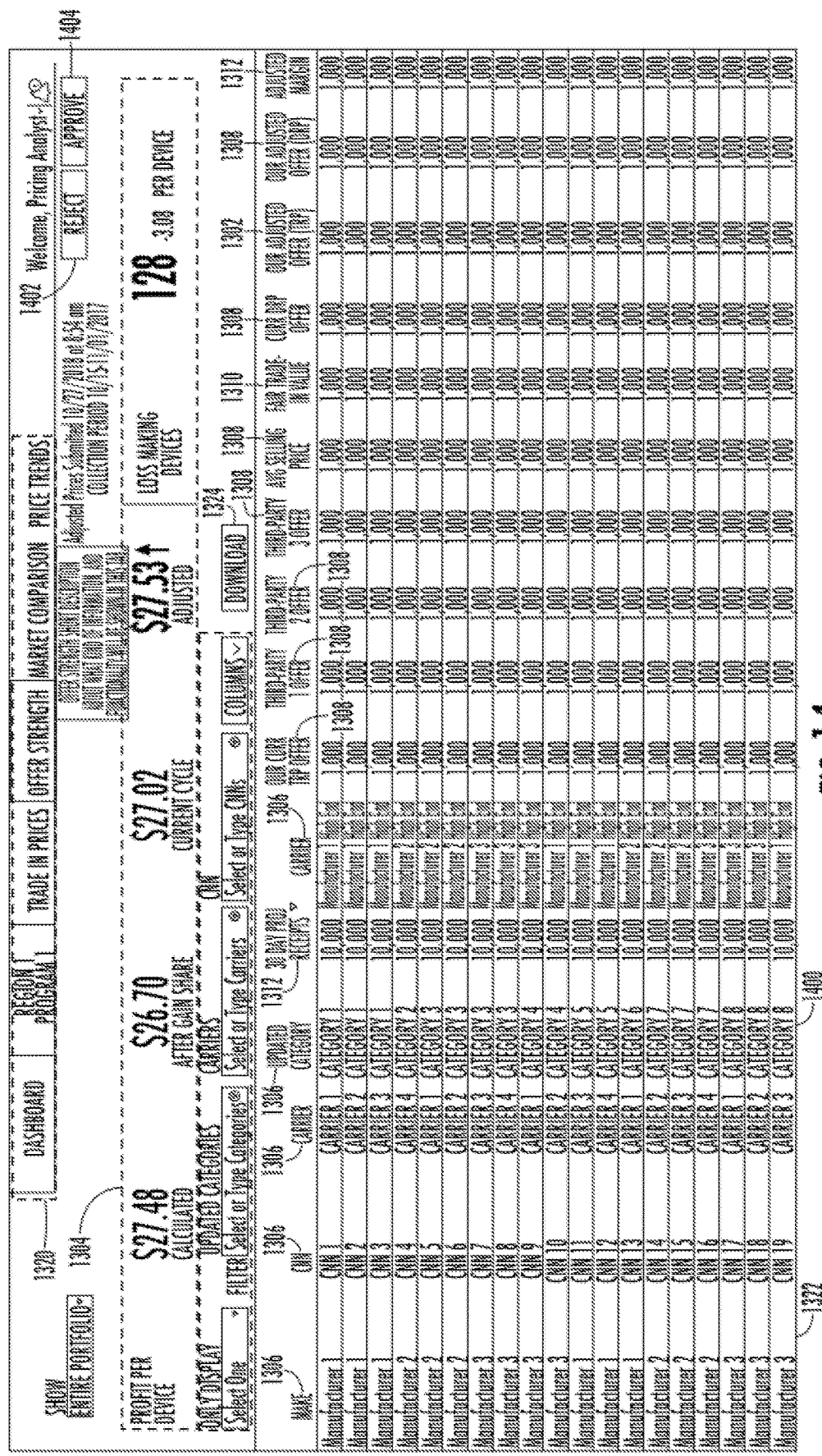
Figure 15:
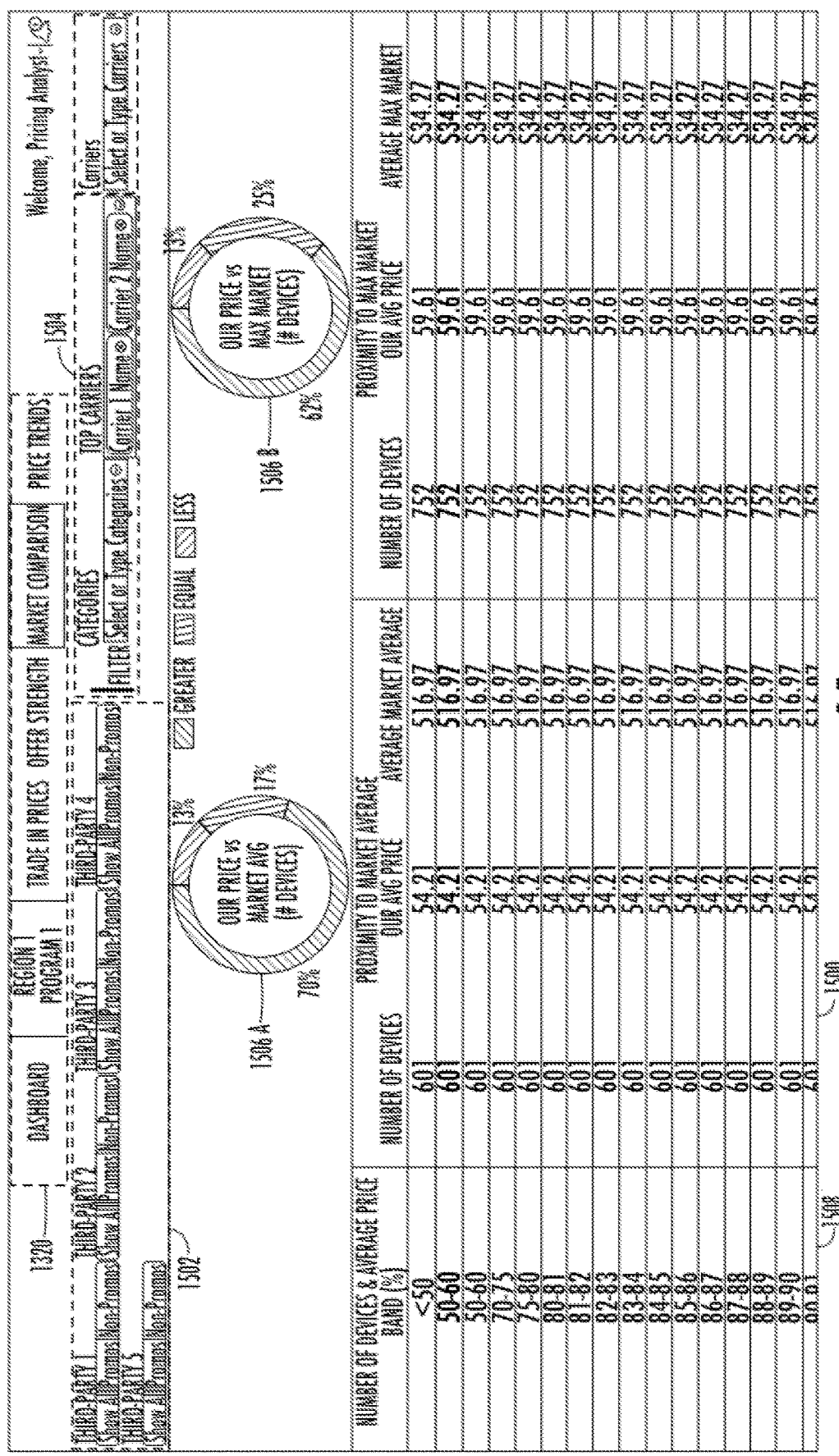

Having thus described certain embodiments of the present disclosure in general terms, reference will now be made to the accompanying drawings, which are not necessarily drawn to scale, and wherein:

FIG. 1 illustrates an example system within which some embodiments of the present disclosure may operate;

FIG. 2 illustrates a block diagram of an example device for implementing a prediction system using special-purpose circuitry in accordance with some embodiments of the present disclosure;

FIG. 3 illustrates a block diagram depicting a functional overview of a system in accordance with some embodiments of the present disclosure;

FIG. 4 illustrates a data flow model in accordance with some embodiments of the present disclosure;

FIG. 5 illustrates a block diagram depicting a functional overview of another aspect of a system in accordance with some embodiments of the present disclosure;

FIG. 6 illustrates a flowchart describing example operations for generating resource allocations based on predicted conditions in accordance with some embodiments of the present disclosure;

FIG. 7 illustrates a flowchart describing example operations for generating resource allocations based on predicted conditions in accordance with some embodiments of the present disclosure;

FIG. 8 illustrates another example system within which some embodiments of the present disclosure may operate;

FIG. 9 illustrates a block diagram of an example apparatus for implementing a resource offer generation system using special-purpose circuitry in accordance with some embodiments of the present disclosure;

FIG. 10 illustrates a data flow diagram depicting steps for generating an optimal resource offer set via a resource offer generation system in accordance with some embodiments of the present disclosure;

FIG. 11 illustrates a data flow diagram depicting steps for rendering and/or adjusting a resource offer set, submitting the adjusted resource offer set for approval, and approving or rejecting the adjusted resource offer set, in accordance with some embodiments of the present disclosure;

FIG. 12A illustrates a flowchart depicting operational blocks in an example process for generating a resource offer set, updating the resource offer set to create an adjusted resource offer set, and receiving an offer status indicator for the adjusted resource offer set, in accordance with example embodiments of the present disclosure;

FIG. 12B illustrates a flowchart depicting operational blocks in an example process for generating a trusted resource characteristic data set from one or more untrusted third-party resource characteristic data sets and a distributed resource characteristic set, in accordance with example embodiments of the present disclosure;

FIG. 13 illustrates an example analysis interface accessible via a dashboard, specifically offer adjustment interface in accordance with example embodiments of the present disclosure;

FIG. 14 illustrates another example analysis interface accessible via a dashboard, specifically an offer approval interface in accordance with example embodiments of the present disclosure; and FIG. 15 illustrates another example analysis interface accessible via a dashboard, specifically a market comparison interface in accordance with example embodiments of the present disclosure.

DETAILED DESCRIPTION

Some embodiments of the present disclosure will now be described more fully herein with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present disclosure are directed to improved apparatuses, methods, and computer readable media for predicting and determining an optimized allocation of resources in environments where resource demand, availability, utility, and/or value are dynamic. By modeling and predicting resource requirements, example implementations of embodiments of the invention are able to more rapidly and efficiently direct resources (which may be subject to depreciation, spoiling, and/or other dynamic changes in utility or value) to channels in which such resources may be optimally deployed. One environment recognized by the inventors where resource demand, availability, utility, and value are each dynamic is a market environment involving the acquisition and resale of used mobile devices. In such an environment, the demand for a particular mobile device varies with time and may vary widely with geography, such that one mobile device may be in higher demand in one location at a given time compared to another location at the same time, or the same location at a different time. Moreover, in such an environment, the supply of a given mobile device may vary based on a number of factors, while the user's requirements (such as on the required functionality of a mobile device) and the perceived value of a particular mobile device, may each vary independently with time. In particular, since the value of a particular mobile device tends to trend downward over time, delay in the allocation of a particular mobile device to a particular distribution channel tends to increase the likelihood that the used mobile device will become wasted through obsolescence, perceived lack of value, and/or other factors.

The inventors of the embodiments of the disclosure herein have recognized that one of the key factors in efficiently meeting demands for particularized mobile devices in a secondary market environment is the ability to predict and model user demand and perceived device value. Conventional approaches tend to react to existing conditions in the environment, rather than predicting future conditions. As a result, decisions to deploy resources into particular channeled tend to incur in satisfying user needs and demands. Moreover, under reactive approaches, delays are often injected into the process of acquiring the potentially desired devices and directing them to the users seeking such devices. Particularly in situations where devices tend to become more obsolete and less valuable over time, delays in the allocation of devices can result in the waste of devices that were directed to particular channels based on past conditions that cease to be relevant to the existing market conditions at the time when the resources are introduced into a given channel (the used mobile devices in this environment, for example) and a decrease in the value that can be realized from such devices.

As recognized by the inventors of the disclosure herein, the technical challenges associated with predicting and modeling user demand and perceived device value are compounded by a wide range of information occlusion factors. In the case of mobile devices, one of the information occlusion factors includes the wide range of similar, but potentially non-identical, devices in the market. For example, many mobile device manufacturers apply different identification numbers or other indicators on mobile devices based on the mobile network, retailer, cosmetic features, market, and/or other aspect associated with the original sale of the mobile device. For example, the identification number used to identify a mobile device that was originally sold from a retail outlet associated with one mobile network provider may differ from the identification number of a mobile device that was originally directed to a retail outlet associated with another mobile network provider, notwithstanding the fact that the two devices may have identical features and function equally well in a broad range of networks. In some environments, the number of device identifiers may number in the tens or hundreds of thousands.

The information that may be used to predict and model user demand and perceived device value may be further occluded by the high volume of unscaled and/or otherwise non-uniform data associated with each device and/or device identification number. For example, a predictive model that accurately and reliably identifies channels to which certain mobile devices should be directed to meet user demand at a given time may use a range of publicly and privately available data sets, including but not limited to resource disposition data, seasonality information, sales information (in business-to-business and/or business-to-customer contexts, for example), mobile device attribute information, market data, device claims data (such as information regarding insurance claims, warranty and/or other repair claims, or the like, for example), other macroeconomic indicators, equity information, and/or social media data. Since many of these data sets are mutually independent, the relevant components of such data sets may need to be extracted, normalized, scaled, and/or otherwise conditioned to allow for the use of such information in a predictive model.

In addition to the technical challenges imposed by the volume, complexity, and variability of the multiple data sets used in connection with the predictive model, the inventors of the invention described herein have also recognized technical challenges imposed by the conditions of a given environment (such as the capacity of any given channel to accept and distribute resources effectively, the existing resources available to be distributed, actions of external actors, and the like), along with the speed at which such conditions change within the technical environment. In particular, the inventors have recognized that the delays inherent in reactive systems often result in inefficiencies and waste associated with resource allocations that are incongruent with changed and/or shifting conditions in the given environment.

To address these, and other technical challenges associated with allocating dynamically variable resources under rapidly changing environmental conditions, users associated with requests for allocations of resources to channels able to efficiently distribute such resources may be able to interact with a resource allocation prediction system that uses a predictive, machine learning model. Through the use of a machine learning model, the system is able to identify, generate, and/or otherwise provide resource allocation guidance based on the contextual information associated with the environment within which the resources are to be distributed. In contexts involving the distribution of used mobile devices in a market environment, the system may draw on a wide range of information sources that can be supplied to the machine learning model to allow for the predicting and modeling of market conditions to identify the channels in which to allocate particular quantities and types of devices at a given time. Moreover, through the application of a decay curve and other aspects of the predictive model, changes in market conditions, resource demand, and other relevant factors can be predicted, allowing for resource allocations that are more time-aligned with the conditions at a given time than those available from conventional reactive approaches.

For example, in contexts where existing inventories of used mobile devices are to be distributed in an efficient manner, the system may access and process data sets that provide context and/or other information about one or more mobile devices and/or the channels through which such devices may be disposed, such as existing asset distribution information, historical sales information, competitive pricing information, other market information, device attribute information, device performance information (such as insurance claims data associated with one or more mobile device models, device use and device status data that may be acquired through self-service and/or customer service platforms and/or interfaces, or the like, for example), and/or other publicly and/or privately available data sets associated with a given mobile device, channel, and/or environment. The system may also access and process information associated with additional factors that may impact the conditions within a given environment. For example, in addition to and/or separately from any of the categories listed above, data indicative of seasonal and/or other time-based factors, macroeconomic conditions, social media data, and/or other information (such as manufacturer actions, plans, and/or statements, for example) may be used. The system may also access and process other information sources, including but not limited to feedback information generated by the system, decay curve information, training data and the like for use in connection with the machine learning model. Consequently, through the use of acquirable data, information developed through the use of the model, and data describing aspects of a mobile device and/or environment, one or more channels for distribution of resources (such as used mobile devices, for example) can be identified and selected based on predicted conditions, which in turn allows for the direction of resources in a manner that allows such resources to efficient arrive in a given channel at a time when the resources are needed and/or otherwise disposable through the channel.

To overcome these, and other technical challenges, example implementations of embodiments of the invention described herein use automated tools to acquire and scale diverse sets of information about the channels (such as aggregators, for example) through which mobile devices and/or other resources may be distributed. The scaled information can be used to assign groups of aggregators and/or other channels into tiers that generally reflect the ability of an aggregator and/or other channel to effectively distribute the relevant resources. In order to effectively predict pricing information and otherwise address time-sensitive and/or aged data, a decay function is modeled and otherwise applied to the pricing data received from the aggregators and/or other available channels (such as distribution channels where mobile devices may be directly sold, for example). This combined tiering and data decay allow for an identification and ranking of aggregators and/or other channels that are likely to be able to distribute a particular volume of specific devices at a predicted price at a time in the future. As, such, resources can be directed to the appropriate channels in time to take advantage of the optimum pricing and/or distribution opportunities available at the time when the resources are available to be distributed. In situations where inventory is acquired via a secondary market (such as through buy-back programs, for example) the pricing and related conditions under which a particular device and/or set of devices can be calculated in view of the available distribution channels and forecasted sales price.

Many of the example implementations described herein are particularly advantageous in situations and other contexts that involve the disposition of inventories of used mobile devices, such as the inventories acquired through insurance claims, buy-back programs, trade-in programs, and the like. In some such situations, the availability of distribution channels, the viability of such channels, the existing inventory of devices, the value of those devices, and the demand for such devise, all tend to vary with time. By predicting and modeling the ability of one or more channels to receive and distribute one or more sets of mobile devices (and the terms, speed, and other aspects of such receipt and distribution), resources (in the form of used mobile devices, for example) can be efficiently distributed to customers and/or other potential users in a manner that closely time-aligns device availability and demand. As such, and for purposes of clarity, some of the example implementations described herein use terms, background facts, and details that are associated with device acquisition and distribution, and may reference information and data objects associated with the receipt and distribution of such used mobile devices. However, it will be appreciated that embodiments of the invention and example implementations thereof may be applicable and advantageous in a broad range of contexts and situations outside of those related to event preparedness and planning.

Embodiments of the present disclosure are further directed to computer-implemented methods, apparatuses, systems, and computer program products for improved generation of resource offer sets, analysis and/or adjustment of generated resource offer sets, and/or approval of resource offer sets. More specifically, a predicted optimal resource offer set may be modeled using a resource offer generation model. Various disparate and unstructured data sets (e.g., resource price characteristics offered by third-party entities such as vendors and competitors, resource owner offered price characteristics, resource inventory data, resource-related social media data, seasonality data, resource launch data, and the like) may be retrieved from one or more disparate data sources, warehouses, datastores, and the like. The unstructured data sets may be cleaned, normalized, transformed, and otherwise synthesized for applying to the resource offer generation model. By modeling optimal resource offers based on various data sources, example implementations of embodiments of the present disclosure are able to rapidly provide one or more resource offer sets (which may be time-sensitive or require careful tuning to be effective in securing sufficient interest from resource owners) for purposes of resource acquisition and subsequent distribution. Specifically, for example in the environment of acquisition and distribution of used mobile devices, a resource offer data object associated with purchase of a used mobile device must be properly tuned so a corresponding price characteristic or resource offer value is set such that device owners are likely to take advantage of the offer (e.g., individual device owners may perform a trade-in via one or more device acquisition channels, such as a carrier), while ensuring that financial and/or benchmarking targets (such as profitability, margin, desired device acquisition distribution, and the like) are satisfied with regard to the acquisition and expected distribution of the used mobile devices associated with the generated resource offer sets.

Acquisition and/or distribution of resources, including used mobile devices, may change dynamically and significantly between regions and/or over time between regions or within a single region. For each region (e.g., country, city, or other defined geographic area) and collection period (e.g., a time interval for which an offer defined by an resource offer data object may be actively provided for the region), a used mobile device may be optimally associated with a particular resource offer data object in a generated resource offer set. For example, each resource may be mapped to a particular resource offer data object, as described herein, that represents a corresponding offer to be provided for acquisition of the resource.

Resources may be identified based on their resource attributes and/or a corresponding resource set identifier, such as a CNN. For any given resource associated with a corresponding CNN, an ideal resource offer value for resource offer data objects associated with particular resource set identifier may vary with time and/or region, such that a mobile device having certain attributes may be optimally associated with a first offer value at a first time and second offer value at a second time, or associated with a first offer value for a first region and a second offer value for a second region. The offer value may also vary dependent on various resource attributes associated with resource. For example, for a given mobile device, the functioning of the mobile device, in particular, may alter an ideal resource offer value for a resource offer data object associated with the resource. In an example environment, resources such as mobile devices that are only partially functioning may be associated with a lower offer value than a functional mobile device. Between two resources with differing functionality, the difference in resource offer value may be difficult to determine.

The inventors of the embodiments of the disclosure herein have recognized that to provide an optimal resource offer data object for a particular resource (e.g., associated with a particular resource set identifier), an offer data object may be modeled and predicted based on various data sets comprising various types of data. Conventional approaches do not accurately consider resource distribution allocation channels and expected distribution timeframes, promotional periods, and fair market offer values for a given resource, such as a used mobile device. Consequently, resource offer data objects may be generated associated with sub-optimal or inaccurately predicted offer values, and thus providing an offer defined by the resource offer data object is more likely to be unsuccessful in obtaining the volume of desired resources for distribution via various channels.

To address these and other technical challenges, users associated with requests to generate resource offers (e.g., offer control users) may interact with a resource offer generation system that uses one or more predictive, machine learning models. Through the use of the machine learning models, the system is able to generate a resource offer set comprising resource offer data objects for various resources associated with various resource set identifiers. The system may further optimize the resource offer set to be provided based on desired benchmarking and/or targets, such as financial and/or business parameters or goals, provided via a benchmark and portfolio target data set. The machine learning models may be based on outputs by the prediction model to improve generated resource offers meeting desired financial and/or benchmarking targets. The machine learning models may utilize other market information data set(s) retrieved and synthesized for various mobile devices having different attributes and characteristics, as described above, and offered by various third-party entities (such as competitors, business-to-consumer entities, and the like). The resource offer generation system may similarly access the extracted, normalized, scaled, and/or otherwise conditioned information conventionally unavailable due to data occlusion.

The inventors of embodiments of the present disclosure herein further recognize that technical challenges are presented with providing resource data object sets for analyzing and, if desired, efficiently and effectively adjusting resource offer data objects, for example to adjust corresponding resource offer value(s) to meet new desired financial or benchmark targets. A system user, for example an offer control user, may desire to analyze the generated resource offer set to gauge the relative strength of the resource offer set, visualizes the effects of adjustments on the strength of the resource offer set and/or the effects of adjustments on reaching benchmark and/or portfolio targets, for example based on gathered and standardized market information to determine whether the relative strength of the resource offer set (e.g., chance that offers defined by each resource offer data object will be accepted/utilized by a resource owner owners) of the generated resource offer set is sufficient and that the resource offer set will satisfy desired financial and benchmarking targets. Based on the analysis, the system user may desire to adjust one or more of the resource offer data objects in the resource offer set, such as to increase overall offer strength or to improve benchmark or portfolio target metrics (e.g., profitability).

In this regard, embodiments provide advantageous interfaces for viewing, analyzing, adjusting, and/or approving resource offer sets. Users may access an offer adjustment interface via embodiments of the present disclosure. The offer adjustment interface may be configured to enable a system user to view and analyze the resource offer set. The offer adjustment interface may further be configured to enable a system user to view and analyze additional information derived from or associated with the resource offer set. For example, the offer adjustment interface may include a dashboard for accessing various interfaces used in analyzing the resource offer set. Additionally, the offer adjustment interface may include an indication of an offer analytics data set indicating financial metrics for the generated resource offer set, and updated to reflect the current adjusted resource offer set as adjustments are made via the interface.

Further, a system user, such as an offer control user, may adjust the resource offers via the offer adjustment interface. Such adjustments may be performed to meet new financial and/or benchmarking targets. As a user adjusts one or more resource offer data objects, the dashboard interfaces and/or offer analytics data set associated with the resource offers is dynamically updated by the system to reflect calculations based on the adjusted resource offer set. Such embodiments provide technical advantages in visualizing changes to prospective resource offers and effects on offer strength, and/or financial and/or benchmark targets.

Submitted adjusted resource offer sets may be subject to approval by another user, such as an offer approval user. Embodiment system may facilitate an improved approval process by providing an improved offer approval interface. Via the offer approval interface, the offer approval user may effectively analyze the adjusted resource offer set submitted by the offer control user. The offer approval interface may include a dashboard, such as the dashboard rendered associated with the offer adjustment interface, to enable efficient and thorough analysis using specific, streamlined interfaces.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user", "client", and/or "request source" refer to an individual or entity that is a source, and/or is associated with sources, of a request for an identification of one or more channels for use in the distribution of resources and/or related content to be provided by a prediction control system and/or any other system capable of predicting and/or modeling the likely conditions of an environment in which the relevant resources may be distributed through one or more known channels. For example, a user and/or client may be the owner and/or entity that seeks information regarding the optimum channel or channels through which to distribute an inventory of certain used mobile devices and/or the likely conditions under which the inventory of certain used mobile devices may be efficiently distributed.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like. Client devices, as described herein, communicate with and otherwise access a prediction system and/or resource offer generation system, via one or more networks.

The term "offer control user" refers to a particular user of a resource offer generation system permissioned to perform one or more actions associated with the resource offer generation system via a client device communicable with the resource offer generation system. An offer control user is associated with an offer control user account permissioned to, via a resource offer generation system, generate a resource offer data set for a particular region-program identifier and collection period data object, view for analysis and adjust a resource offer data set for a particular region-program identifier and collection period data object via an offer adjustment interface, and/or submit a resource offer set, or adjusted resource offer set, for approval. An offer control user, in some embodiments, is associated with a corresponding user account permissioned to access the resource offer generation system for performing the actions described. The offer control user may authenticate user credentials associated with the user account to begin an authenticated session and perform the actions described via the resource offer generation system.

The terms "color neutral name" or "CNN" refer to a system standardized resource identifier that identifies resource associated with specific resource attributes. A CNN may be mapped to one or more third-party resource identifiers, for example maintained by third-party databases and/or devices. The term "resource attributes" refers to device specifications, characteristics, or identifying information associated with a particular resource. A resource may be categorized by its resource attributes, such that resources having the same resource attributes may be grouped and identified by a combination of the resource attributes. For example, in the context of distribution of mobile devices as resources, a mobile device resource may be associated with a make identifier, model identifier, storage size identifier, and/or carrier identifier. In some embodiments, resource attributes may include similar information associated with the specifications of the resource. A corresponding CNN may be associated with multiple country, region, or third-party specific identifiers used to characterize resources of the same device.

The term "resource set identifier" refers to a unique string, number, or other form of identification that is associated with one or more resources sharing at least one common attribute. In some embodiments, a resource set identifier is a CNN. In some embodiments, a resource set identifier is a SKU. In other embodiments, a resource set identifier is one or more resource attribute or several resource attributes in combination.

The term "digital content item" refers to any electronic media content item that is intended to be used in either an electronic form or as printed output and which may be received, processed, and/or otherwise accessible by a client device. A digital content item, for example, may be in the form of a text file conveying human-readable information to a user of a client device. Other digital content items include images, audio files, video files, text files, and the like.

As used herein, the term "data object" refers to a structured arrangement of data. A "request data object" is a data object that includes one or more sets of data associated with a request by a user for an identification of one or more channels and/or the conditions of one or more channels through which resources (such as mobile devices) may be distributed. A "channel context data object" is a data object that includes one or more sets of data that alone or in combination with other sets of data provide information about a channel and/or environment in which one or more channels may operate, such that aspects of the one or more channels may be predicted.

As used herein, the term "data set" refers to a collection of data. One or more data sets may be combined, incorporated into, and/or otherwise structured as a data object. A "context data set" is a data set that includes information regarding channel and/or environment in which one or more channels may operate. A "predicted condition data set" is a data set that contains one or more indications of a channel and/or related conditions through which resources (such as mobile devices, for example) may be distributed.

The term "third-party entity" refers to a company, individual, group, or the like, that associated with resource acquisition and/or distribution. Examples of a third-party entity include, but are not limited to, a competitor entity (an indirect or direct competitor entity) and a distributed user platform owner entity. Some third-party entities are commercial acquirers and/or resellers of resources. In some embodiments, each third-party entity is associated with a particular channel profile for distribution and/or acquisition of resources via the third-party entity.

The term "region-program data object" refers to an electronically managed structured arrangement of data associated with particular offerings associated with acquisition of resources for a particular region. Each region-program data object may be associated with a particular program for acquiring a set of resources based on an associated approved resource offer set. Each region-program data object may be associated with a "region-program identifier" that uniquely identifies the region-program data object. A region may be associated with one or more region-program data objects.

The term "collection period data object" refers to an electronically managed representation of a time interval defined by a collection period start timestamp and a collection period end timestamp. A resource offer set may be generated associated with a collection period data object, such that the resource offer set may be approved as valid associated with a region-program data object only during the time interval represented by the collection period data object. For example, a particular resource offer set may be associated with a particular program within a particular country for a two-week time interval represented by a particular collection period data object.

The term "data collection parameter" refers to one or more parameters associated with the acquisition of resources associated a particular region-program data object. Data collection parameters include business, portfolio-level, and resource acquisition target parameters associated with the acquisition of resources associated with the region-program data object. Non-limiting examples of data collection parameters include distribution channel mix percentages, activity costs, resource volume multipliers, promotional resource listings, commissions associated with resource offer data objects, offer ratios for functional and non-functional resources, desired profit per device, volume percentage desired by grade, time-based resource condition multipliers, and a minimum resource offer value for functional and/or non-functional resources. A region-program data object may include, or be associated with, a "data collection parameter set" including one or more data collection parameter(s) for that region-program data object.

The term "benchmark and portfolio target data set" refers to a collection of data representing or associated with target metrics for the distribution and/or procurement of resources. In some embodiments, the benchmark and portfolio target data set represents a subset of the data collection parameters. In some embodiments, a benchmark and portfolio target data set is associated with a region-program data object. In some embodiments, a benchmark and portfolio target data set defines boundary conditions input by an offer control user or offer approval user, such that a generated and/or submitted resource offer set must satisfy the boundary conditions defined by the benchmark and portfolio target data set. For example, in some embodiments, the benchmark and portfolio target data set includes at least a minimum expected profitability based on the resource offer set or a minimum expected margin based on the resource offer set. In some embodiments, a benchmark and portfolio target data set includes a target time interval for the distribution or acquisition of a number of resources.

The term "resource offer data object" refers to an electronically managed structured arrangement of data that includes at least a resource offer value for a particular resource set identifier. The resource offer data object may include a resource set identifier with which the resource offer value is associated. A resource offer data object is adjustable by a user, such as an offer control user, which alters the resource offer value associated with the resource offer data object. Each resource offer data object may be uniquely associated with a resource offer identifier.

The term "resource offer set" refers to a group of zero or more resource offer data objects. Each resource offer data object in a resource offer set may be associated with a different resource set identifier.

The term "adjustment data object" refers to an electronically managed structured arrangement of data that represents a change in one or more properties associated with one or more resource offer data object(s). In some embodiments, an adjustment data object includes an adjusted resource offer value for one or more resource offer data objects. One or more adjustment data objects may be used to update a resource offer set to create an adjusted resource offer set.

The term "adjusted resource offer set" refers to a resource offer set including one or more adjustments to one or more resource offer data objects by an offer control user. In some embodiments, an adjusted resource offer set is created by updating a resource offer set based on one or more adjustment data objects. An adjusted resource offer set may be further adjusted based on a second set of adjustment data objects to create a new adjusted resource offer set. In some embodiments, a stored resource offer set associated with a region-program identifier and collection period data object is embodied by an adjusted resource offer set, for example after one or more adjustments are performed by an offer control user.

The term "offer status record" refers to electronically managed data stored in a repository associated with managing approval of a resource offer set associated with a region-program identifier and collection parameter data object. In some embodiments, an offer status record is stored in an offer approval repository, which may be a sub-repository managed by a resource offer generation system. An offer status record is retrievable associated with, based on, or utilizing the region-program identifier and collection parameter data object. In some embodiments, the offer status record includes at least an offer status indicator. In some embodiments, the offer status record is associated with, or otherwise linked to, the resource offer set.

The term "offer status indicator" refers to data or information indicative of a process status for generation, adjustment, and approval of a resource offer set associated with a particular region-program data object and collection period data object. In some embodiments, an offer status indicator is represented by one of a plurality of possible status indicators. An example offer status indicator is a "requested status indicator," which indicates a resource offer generation process has been has been requested for a corresponding region-program identifier and collection period data object, but the resource offer set is not yet generated. In some embodiments, another example offer status indicator is a "pending adjustment status indicator," which indicates a resource offer set has been generated for the region-program identifier and collection period data object, but has not yet been submitted by an offer control user for approval. In some embodiments, another example offer status indicator is a "pending approval status indicator," which indicates an adjusted resource offer set has been submitted by an offer control user for approval or rejection by an offer approval user, but has not yet been approved or rejected by an offer approval user. In some embodiments, another example offer status indicator is an "approved status indicator," which indicates a submitted adjusted resource offer set has been analyzed and/or approved by an offer approval user. In some embodiments, another example offer status indicator is a "rejected status indicator," which indicates a submitted adjusted resource offer set has been analyzed and/or rejected by an offer approval user.

In some embodiments, an offer status indicator is stored in, or associated with, an offer status record corresponding to a region-program identifier and collection period data object. The offer status record may be stored in an offer approval repository. In some embodiments, the offer status record similarly includes, or is associated with, a stored resource offer set. In other embodiments, the stored resource offer set associated with the offer status record is stored in another repository or sub-repository.

The term "expected resource volume data set" refers to a collection of data associated with an expected channel-wise distribution of resources associated with particular resource set identifiers. In some embodiments, an expected resource volume set data is output, or parsed from output, by a prediction system. In some embodiments, for example, an expected resource volume data set includes, or is derived from, at least one resource allocation set generated by a prediction system associated with at least one channel profile. In some embodiments, an expected resource volume data set is generated by another system associated with the prediction system.

The term "average distribution term data set" refers to a collection of data associated with parameters associated with the distribution of resources identified by the expected resource volume data set. In some embodiments, the average distribution term data set includes at least an average selling price for which a resource is predicted to be distributed. In some embodiments, an average distribution term data set is output, or parsed from output, by a prediction system.

The term "market intelligence data set" refers to a collection of data that is associated with the acquisition and/or distribution of resources associated with one or more channels by various entities. For example, a market intelligence data set may include information regarding acquisition of resources associated with one or more channels, sentiment information associated with a resource, launch information associated with a resource, perceived value of a resource for distribution and/or acquisition. A market intelligence data set, or portions thereof, may be retrieved from one or more third-party systems, scraped from various data sources (e.g., web scraping), received from a third-party system (e.g., data updated at a regular interval), or the like. In some embodiments, a market intelligence data set includes one or more subsets, each associated with a particular resource set identifier, such as a CNN. In some embodiments, a market intelligence data set includes, for one or more particular resource set identifiers: distributed user platform pricing for the particular resource set identifier (e.g., average sales price for a particular resource set identifier via one or more distributed user platforms, such as eBay™ or similar channels), other third-party offer values for the particular resource set identifier, social media sentiment for the particular resource set identifier, seasonality information, launch information associated with the particular resource set identifier, and inventory data.

The term "exception period" refers to an untrusted timestamp interval during which a particular resource characteristic, for a particular resource in an untrusted third-party resource characteristic data set, is not within an expected operating range. In some embodiments, the expected operating range is embodied by an expected deviation of an offset between an untrusted third-party resource characteristic data set and a distributed resource characteristic data set. In some embodiments, an exception period begins at a first timestamp where a deviation in an offset for the value of a particular resource characteristic satisfies an exception deviation threshold, and ends at a second timestamp where the deviation in the offset for the value of the particular resource characteristic does not satisfy the exception deviation threshold. In some embodiments, an exception period for a particular untrusted third-party resource characteristic data set includes one or more records of the untrusted third-party resource characteristic data set associated with a timestamp that falls within the exception period.

The term "exception deviation threshold" refers to a normal operating range of a deviation of an offset between a resource characteristic of an untrusted resource characteristic data set and the resource characteristic of a distributed resource characteristic data set for a particular resource set identifier. In some embodiments, an exception period is indicated when the deviation of the offset satisfies the exception deviation threshold by exceeding the exception deviation threshold.

The term "exception detection model" refers to one or more machine learning, algorithmic, and/or statistical models, or a combination thereof, for generation of a trusted resource characteristic data set based on one or more untrusted third-party resource characteristic data set(s) applied to the model, and a distributed resource characteristic data set applied to the model. In some embodiments, an exception detection model is configured to identify an exception period set for the applied untrusted third-party resource characteristic set based on a deviation in an offset with respect to a distributed resource characteristic data set, remove the exception period set to create an updated untrusted third-party resource characteristic data set, and generate the trusted resource characteristic data set based on at least the updated untrusted third-party resource characteristic data set. In some embodiments, the exception detection model is configured to generate the trusted resource characteristic data set based on a comparison between two or more updated untrusted third-party resource characteristic data sets associated with different third-party entities.

The term "resource characteristic" refers to a particular attribute associated with a resource. One or more resource characteristics for a resources associated with a particular resource set identifier are represented in a record of a data set associated with the resource set identifier. For example, the terms "price characteristic" and "pricing characteristic" refer to an offer value for acquisition or distribution of resources associated with the corresponding resource set identifier.

The term "untrusted third-party resource characteristic data set" refers to a collection of one or more resource characteristics associated with a particular third-party entity, where the collection may include one or more resource characteristics associated with an exception period. Untrusted third-party resource characteristic data sets described herein are updated based on comparison to a distributed resource characteristic data set. In some embodiments, the untrusted third-party resource characteristic data set includes at least a price characteristic for a particular resource, such as a used mobile device.

The term "third-party resource pricing data set" refers to a particular, historical data set representing an untrusted third-party resource characteristic data set including at least a pricing characteristic for one or more resources of resource set identifiers. In some embodiments, the third-party resource pricing data set is associated with a third-party entity providing a third-party offer reflected as a record of the third-party resource pricing data set. In some embodiments, a third-party resource pricing data set is included in a market intelligence data set.

The term "distributed user platform" refers to a marketplace or other platform configured to enable individual users to generate offers for the purposes of resource acquisition and/or distribution. In some embodiments, a distributed user platform comprises one or more distributed third-party entity devices configured to enable access to the distributed user platform. In some embodiments, the offers include at least a price characteristic for a particular resource set identifier. The distributed user platform is associated with a corresponding third-party entity in control of the distributed user platform.

The term "distributed resource pricing data set" refers to a particular historical data set including at least a price characteristic for one or more resources or resource set identifiers. In some embodiments, the distributed resource pricing data set is associated with user-generated offers for resource acquisition available for one or more resources or resource set identifiers via a distributed user platform.

The term "alignment" refers to an organization and/or sorting of one or more data sets based on one or more characteristics of each record. The term "temporal alignment" refers to a particular organization of one or more data sets based on an associated timestamp characteristic. The term "resource set identifier alignment" refers to a particular organization of one or more data sets based on an associated resource set identifier.

The term "resource offer generation request" refers to a transmission by a client device associated with an offer control user to a resource offer generation system indicating a request to generate a resource offer set associated with a region-program identifier and collection period data object. In some embodiments, an offer request comprises at least the region-program identifier and collection period data object for which the resource offer set is to be generated. The resource offer set may be generated associated with various resource set identifiers determined based on the region-program data object associated with the region-program identifier.

The term "indication" refers to a data or information representing a visual presentation of data, a data object, a set of data, or a portion of any thereof, to a particular user interface. Examples of indications include, but are not limited to, a text indication, a graphical indication, a chart indication, a pictorial indication, and an encoded indication. It should be appreciated that an indication may cause displaying and/or rendering of the visual presentation of the data, data object, set of data, or a portion of any thereof, to the user interface.

Example System Environment

Turning now to the Figures, FIG. 1 shows an example system environment 100 in which implementations involving the efficient prediction and modeling of conditions and channels through which resources may be distributed may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the efficient prediction and modeling of conditions and channels through which resources may be distributed by receiving and parsing a request data object received from a user, retrieving and/or receiving a set of data objects and/or other data sets to be presented to a machine learning model (such as one or more channel context data objects, for example), retrieving a predicted condition data set by applying the received data objects to a machine learning model, and generating a control signal causing a renderable object associated with the predicted condition data set to be displayed on a user interface of a client device associated with the user. Some such implementations contemplate the use of channel context data objects and/or other data sets associated with distribution channels and/or the mobile device or other resource that is the subject of a given request data object. Some such embodiments leverage a hardware and software arrangement or environment for the efficient prediction and modeling of conditions and channels through which resources may be distributed and responsive message generation actions described, contemplated, and/or otherwise disclosed herein.

As shown in FIG. 1, a prediction system 102 includes an online prediction system module 102A which is configured to receive, process, transform, transmit, communicate with and evaluate request data objects, channel context data objects, the content and other information associated with such data objects, other data sets, and related interfaces via a web server, such as prediction system server 102B and/or prediction system device 102D. The prediction system server 102B and/or prediction system device 102D is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, prediction system 102 also includes a prediction database 102C that may be used to store information associated with request data objects, users, resources (such as used mobile devices, for example) and/or channels associated with request data objects, channel context data objects, other data sets, interfaces associated with any such data objects or data sets, request source systems, channel content systems, and/or any other information related to the efficient prediction and modeling of conditions and channels through which resources may be distributed and the generation of one or more related messages and/or digital content item sets. The prediction database 102C may be accessed by the prediction system module 102A, the prediction system server 102B, and/or the prediction system device 102D, and may be used to store any additional information accessed by and/or otherwise associated with the prediction system 102 and/or its component parts. While FIG. 1 depicts prediction system database 102C as a single structure, it will be appreciated that prediction system database 102C may additionally or alternatively be implemented to allow for storage in a distributed fashion and/or at facilities that are physically remote from the each other and/or the other components of prediction system 102.

Prediction system 102 is also shown as including prediction system device 102D which may take the form of a laptop computer, desktop computer, or mobile device, for example, to provide an additional means (other than via a user interface of the prediction system server 102B) to interface with the other components of prediction system 102 and/or other components shown in or otherwise contemplated by system environment 100.

Request data objects, request data object information and/or additional content or other information to be associated with one or more request data objects may originate from a request source system such as request source system 104. A user of request source system 104 may use a request source device 104B, such as a laptop computer, desktop computer, or mobile device, for example, to interface with a request source module 104A to create, generate, and/or convey a request data object and/or information to be included in a request data object, such as an identification of one or more resources (such as mobile device identification information, inventory information, timing information, and/or other request parameters, for example). The request source system 104 may (such as through the operation of the request source module 104A and/or the request source device 104B, for example) transmit a request data object to the prediction system 102. While only one request source system 104 is depicted in FIG. 1 in the interest of clarity, it will be appreciated that numerous other such systems may be present in system environment 100, permitting numerous users and/or other request sources to develop and transmit request data object and/or information associated with request data objects to prediction system 102.

As shown in FIG. 1, system environment 100 also includes content system 106, which comprises a content module 106A, a content server 106B, and a content system database 106C. While only one content system 106 is depicted in FIG. 1 in the interest of clarity, it will be appreciated that numerous additional such systems may be present in system environment 100, permitting numerous sources of channel context content and/or other information relevant to the efficient prediction and modeling of conditions and channels through which resources may be distributed to communicate and/or otherwise interact with the prediction system 102 and/or one or more request source systems 104. As shown in FIG. 1, the content system 106 is capable of communicating with prediction system 102 to provide information that the prediction system 102 may need when predicting and modeling conditions and channels through which resources may be distributed. For example, content system 106 may, such as via the capabilities and/or actions of the content module 106A, content system server 106B, and/or content system 106C, obtain and provide information associated with one or more mobile devices, distribution channels, mobile device data, disposition information, market condition information, macroeconomic data, and/or other device- or channel-related data, for example.

Content system 106 is also shown as optionally being capable of communicating with request source system 104. In some situations, such as when a given content system 106 is associated with content owned by and/or otherwise controlled by a user of a request source system, it may be advantageous for the content system 106 to interface with and/or otherwise be in communication with the request source system 104 in general and the request source device 104B in particular to capture and/or otherwise process such content.

Overall, and as depicted in system environment 100, prediction system 102 engages in machine-to-machine communication with request source system 104 and context content system 106, via one or more networks, to facilitate the processing of request data objects received from a user, the efficient prediction and modeling of conditions and channels through which resources may be distributed, the retrieval and/or generation of a digital content item set and/or other data set based at least in part on the request data object at, and the generation and/or transmission of a control signal causing a renderable object associated with the predicted channel and/or condition to be displayed on a user interface of a client device associated with the user.

Example Apparatus for Implementing Improved Channel Prediction and Modeling

It will be appreciated that the prediction system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, prediction circuitry 210, and content aggregation circuitry 212. The apparatus 200 may be configured to execute any of the operations described herein.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include prediction circuitry 210. The prediction circuitry 210 includes hardware configured to maintain, manage, and provide access to a predictive model and/or information used by the predictive model to predict and model conditions and channels through which resources may be distributed. The prediction circuitry 210 may provide an interface, such as an application programming interface (API), which allows other components of a system to obtain information associated with one or more resources and/or channels and/or information associated with the channels through which one or more sets of resources (such as mobile devices, for example) may be efficiently distributed. For example, the prediction circuitry 210 may facilitate access to and/or processing of information regarding certain inventory, its features, the relevant market environment, and/or other information that may be used to predict and model conditions and channels through which resources may be distributed, including but not limited to any of the information that may be obtainable from and/or otherwise associated with a content system 106.

The prediction circuitry 210 may facilitate access to the channel context information and/or other information used by the predictive model through the use of applications or APIs executed using a processor, such as the processor 202. However, it should also be appreciated that, in some embodiments, the prediction circuitry 210 may include a separate processor, specially configured field programmable gate array (FPGA), or application specific interface circuit (ASIC) to manage the access and use of the relevant data. The prediction circuitry 210 may also provide interfaces allowing other components of the system to add or delete records to the prediction system database 102C, and may also provide for communication with other components of the system and/or external systems via a network interface provided by the communications circuitry 208. The prediction circuitry 210 may therefore be implemented using hardware components of the apparatus configured by either hardware or software for implementing these planned functions.

The content aggregation circuitry 212 includes hardware configured to manage, store, process, cleanse, scale, normalize and analyze a channel context data object, as well as the data sets and other information that may contained in and/or used to generate a channel context data object. Because the information that may be accessed and used to create channel context data objects may change frequently and/or be subject to control by other systems, it may be desirable to maintain a content aggregation database separate from prediction database 102C and/or the memory 204 described above. It should also be appreciated though, that in some embodiments the prediction circuitry 210 and the content aggregation circuitry 212 may have similar and/or overlapping functionality. For example, both the prediction circuitry 210 and the content aggregation circuitry 212 may interact with one or more data objects associated with the context within which a channel resides. The content aggregation circuitry 212 may also provide access to other historical information, such as prior information sets presented to users with respect to a given set of mobile devices (or other resources) and the channel or channels used to efficiently distribute such devices or other resources.

Example Functional Implementation of Embodiments of the Present Disclosure

FIG. 3 is a block a block diagram depicting a functional overview of a system 300 in accordance with some embodiments of the present disclosure. As shown in FIG. 3, the system 300 incorporates three primary functional blocks, including a user interface block 302, a data warehouse block 304, and a supporting systems block 306, which are arranged such that each functional block is capable of communicating with the other functional blocks within system 300.

As shown in FIG. 3, the user interface block 300 includes one or more interface modules 302A-302N. In some example implementations, the system 300 is designed to interact with a range of internal and/or external (or third party, for example) users. In the context of a system designed to predictively identify one or more channels through which used mobile devices should be efficiently distributed, the system 300 may be used by one or more internal users (such as users associated with entities responsible for distributing the used mobile devices into the appropriate channel(s) and/or one or more external entities, such as aggregators responsible for collecting inventory for redistribution by the system 300. In such example implementations, one interface module, such as interface module 302A, may provide for the functions, access controls and/or other aspects of a user interface necessary for an internal user to operate and/or otherwise use the system 300 to predictively identify the appropriate channels through which to direct the mobile device and the conditions (such as capacity, pricing, and/or other factors) that apply to the one or more identified channels. Likewise, the user interface may use another module, such as interface module 302N, for example, to provide for the functions, access controls, and/or other aspects of a user interface necessary for an external user (such as an aggregator, for example) to interact with the system 300.

Similar to the user interface 302, the data warehouse block 304 and the supporting systems block 306 each incorporate one or more functional modules, shown as warehouse modules 304A-304N and support modules 306A-306N. In some example implementations, one of the modules provides functionality associated with resource demand planning and forecasting, which may involve the optimization of one or disposition channels based on information regarding available supplies of resources, demand for such resources, strategic parameters and/or other business rules, and other information associated with inventory and/or inventory visibility. In some such example implementations one or more modules associated with the data warehouse block 304 and/or the supporting systems block 306 may generate an expected device list containing information regarding the likely inventory of mobile devices to be held by the system 300 and information associated with the channels into which such inventory may be disposed.

In some example implementations, one of the modules provides functionality associated with aggregator management, which may include, but is not limited to, the management of aggregator-related applications, account profiles, purchase histories, tiered and/or other rankings, bidding and negotiation functions, purchase orders, tracking of financial transactions, and/or invoicing. In some such example implementations, one or more modules associated with the data warehouse block 304 and/or supporting systems block 306 may allow for on-boarding of potential aggregators, the ranking of aggregators, the receipt and processing of bids received from aggregators, the receipt and processing of purchase orders, and/or invoicing functions.

In some example implementations, one of the modules provides functionality associated with resource and/or other asset recovery and disposition, which may include, but is not limited to, the management of data sets and/or other information necessary to detect and document inventory, and manage the pricing and/or other aspects of inventory allocation. In some such example implementations, one or more modules associated with the data warehouse block 304 and/or supporting systems block 306 may facilitate the generation of periodic inventory updates, the initiation of pricing and allocation assignments for use with aggregators, the analysis of aggregator bids, and/or the analysis and approval of pricing and/or other offer conditions associated with aggregators.

In some example implementations, one of the modules provides functionality associated with materials management, which may include, but is not limited to, the management of inventory sorting operations, repair of bulk materials, aggregator skid reports, and/or materials shipping. In some such example implementations, one or more modules associated with the data warehouse block 304 and/or the supporting systems block 306 may facilitate the development, receipt, and/or transmission of inventory sorting instructions (such as instructions associated with inventory liquidation, for example), the uploading and/or other processing of aggregator skid reports, and/or processes associated with the shipping of resources (such as mobile devices and/or other merchandise, for example).

In some example implementations, one of the modules provides functionality associated with accounting and/or finance operations, which may include, but are not limited to, management of the determination of costs, pricing, and/or other conditions associated with the generation of invoices. In some such example implementations, one or more modules associated with the data warehouse block 304 and/or the supporting systems block 306 may facilitate the generation of entries for use in aggregator material allocation, logging of invoices, and/or other accounting operations.

In some example implementations, one of the modules provides functionality associate with enterprise sourcing operations, which may include, but are not limited to, the administration of the relationships between the system operator and the related aggregators. In some such example implementations, one or more modules associated with the data warehouse block 304 and/or the supporting systems block 306 facilitate the creation and management of documentation to be used in connection with the relationship between an entity operating the system and one or more aggregators or other third-party users.

Example Data Flow Diagram of Embodiments of the Present Disclosure

FIG. 4 is a block diagram depicting an example data flow through a system 400 that may be used in connection with example implementations of embodiments of the invention. As shown in FIG. 4, the system 400 includes a portal user interface services module 402 that is configured to send and receive information (such as request data objects associated with requests for identifications and/or allocations of channels through which mobile devices may be efficiently distributed) from an internal user 404A and/or an external user 404B. The portal user interface services module 402 is also configured to send and receive information from one or more data repositories 410A-410N, some of which may be configured to interact with a disposition database 406 and/or an inventory system 408.

In some example implementations, a user, such as internal user 404A and/or external user 404B transmits a request data object and/or other information associated with a request for an identification of one or more channels through which resources (such as mobile devices) may be disposed of, and the pricing and/or other conditions associated with directing the resources through the channel or channels. Upon receiving such a request, the portal user interface services module 402 may interact with one or more of the data repositories 410A-410N to send and receive information to be used in connection with fulfilling the parameters of the request data object.

For example, the portal user interface services module 402 may interact with a data warehouse, such as data repository 410A, which contains information associated with resource demand planning and forecasting. In some such example implementations, the portal user interface services module 402 and the relevant data repository may create, exchange, and/or modify material lists and details associated with the relevant resources. In some such example implementations, the data repository 410A may also interact with the disposition database 406 to acquire a list and/or related information regarding the expected resource inventory (such as an identification of the mobile devices expected to be in inventory at a given time, for example).

In some example implementations, the portal user interface services module 402 may interact with a data repository, such as data repository 410B, which contains information associated with asset distribution. In some such example implementations, the portal user interface services module 402 and the relevant data repository may create, exchange, and/or modify inventory lists and/or sale information associated with the relevant resources to be distributed.

In some example implementations, the portal user interface services module 402 may interact with a data repository, such as data repository 410C, which contains information associated with buyback pricing and/or other buyback parameters. In some situations arising in contexts involving used mobile devices, one source of mobile device inventory may include buyback systems and/or other arrangements where an entity buys a mobile device from a user pursuant to the conditions of an insurance coverage agreement, a buyback program, and/or other approach to acquiring used devices. In some such example implementations, the portal user interface services module 402 and the relevant data repository may create, exchange, and/or modify bids and/or other negotiation information to facilitate the acquisition of inventory.

In some example implementations, the portal user interface services module 402 may interact with a data repository, such as data repository 410D, for example, which contains information associated with material management functions. In some such example implementations, the portal user interface services module 402 and the relevant data repository may create, exchange, and/or modify information associated with the price, cost, and/or other conditions imposed on a given set of materials and/or other resources, including but not limited to invoices. In some such example implementations, the relevant data repository may also interact with inventory system 408 to exchange information associated with the grading and/or sorting of material to be allocated, lot skid reports, and/or lot shipping releases.

In some example implementations, the portal user interface services module 402 may interact with a data repository, such as data repository 410N, for example, which contains information associated with aggregator management functions. In some such example implementations, the portal user interface services module 402 and the relevant data repository may create, exchange, and/or modify information associated with aggregator application submissions, the management of aggregator profiles and/or accounts, and the submission of purchase orders.

Overall, as shown in FIG. 4, the system 400 is capable of leveraging a wide variety of data sets and data sources to acquire and process the information necessary to identify one or more channels through which resources may be efficiently distributed at a given time, and manage the functions necessary to ensure the efficient movement of resource inventory in accordance with the predicted and modeled channels.

Example Processes for Channel Prediction and Modeling

FIG. 5 is a block diagram showing an example data flow 500 that may be used in connection with the efficient prediction and modeling of conditions and channels through which resources may be distributed. In FIG. 5, a predictive modeler 508 is configured to receive a request data object from a user, such as via the interfaces shown and discussed in connection with FIGS. 2, 3, and 4. In some example implementations, upon receipt of a request data object, the predictive modeler 508 may, such as in connection with a master data aggregation manager 504, leverage data sets from a wide range of sources, shown as data repositories, 502A-502N.

One such repository from which the predictive modeler 508 and/or the master data aggregation manager 504 may receive channel context data and/or other information relevant to the efficient prediction and modeling of the distribution of resources, such as mobile devices, for example, through one or more channels is an asset disposition data repository, which may include, for example, information regarding how one or more sets of particular resources have been efficiently distributed in the past. Such a repository may include (or otherwise have access to) information scraped, extracted, and/or otherwise acquired from one or more records of past resource allocations and/or information regarding the outcomes of such allocations.

Another repository from which the predictive modeler 508 and/or the master data aggregation manager 504 may receive channel context data and/or other information relevant to the efficient prediction and modeling of the distribution of resources through one or more channels is data repository which may include, for example, information regarding seasonal changes and/or other time-related factors impact the demand, availability, utility, and/or perceived value of one or more sets of resources. Such a repository may include (or otherwise have access to) information scraped, extracted, and/or otherwise acquired from one or more records of past resource allocations and/or information regarding the outcomes of such allocations, and/or studies into such seasonal and/or other time-based effects.

Another repository from which the predictive modeler 508 and/or the master data aggregation manager 504 may receive channel context data and/or other information relevant to the efficient prediction and modeling of the distribution of resources through one or more channels is data repository which may include, for example, information regarding past sales and/or other distributions of resources. Such a repository may include (or otherwise have access to) information scraped, extracted, and/or otherwise acquired from one or more records of past business-to-business and/or business-to-customer sales.

Another repository from which the predictive modeler 508 and/or the master data aggregation manager 504 may receive channel context data and/or other information relevant to the efficient prediction and modeling of the distribution of resources through one or more channels is data repository which may include, for example, information regarding resource attributes. Such a repository may include (or otherwise have access to) information regarding the structure, function, operation, use, age, features, and/or other characteristics of the used mobile devices in inventory, and/or may also include information relevant to a determination of whether, and to what degree, the mobile devices can meet the functional expectations of one or more sets of potential customers.

Another repository from which the predictive modeler 508 and/or the master data aggregation manager 504 may receive channel context data and/or other information relevant to the efficient prediction and modeling of the distribution of resources through one or more channels is data repository which may include, for example, information regarding the market and/or other environment within which certain relevant channels may reside. Such a repository may include (or otherwise have access to) information scraped, extracted, and/or otherwise acquired from one or more records of activities conducted by competitors and/or other actors in the market and/or analyses of such activities.

Another repository from which the predictive modeler 508 and/or the master data aggregation manager 504 may receive channel context data and/or other information relevant to the efficient prediction and modeling of the distribution of resources through one or more channels is data repository which may include, for example, information regarding claims made in connection with one or more resources, such as mobile devices, for example. In contexts where all or a portion of the inventory of mobile devices to be distributed is acquired in connection with insurance coverage agreements and/or related programs, information regarding the claims made on an individualized and/or aggregated based may be useful in capturing the change in the utility and value of a mobile device as it ages. Such a repository may include (or otherwise have access to) information scraped, extracted, and/or otherwise acquired from one or more records of claims made with respect to one or more devices. This information may include, for example, troubleshooting data, device data, customer service data, and/or repair data used in connection with determining whether the device is eligible for certain insurance coverage and/or buyback.

Another repository from which the predictive modeler 508 and/or the master data aggregation manager 504 may receive channel context data and/or other information relevant to the efficient prediction and modeling of the distribution of resources through one or more channels is data repository which may include, for example, information regarding social media information and/or macroeconomic indicators. Such a repository may include (or otherwise have access to) information scraped, extracted, and/or otherwise acquired from social media sites, economic analyses, and/or other sources of information designed to capture individualized and/or aggregated views of the overall economy, particular devices, and/or other factors that may influence the perception of value held by one or more potential customers.

As shown in FIG. 5, the predictive modeler 508 and/or the master data aggregation manager 504 are capable of interacting with a broad range of data sets from a wide array of sources. In some example implementations, such as when the data sets are acquired in multiple different formats, for example, the master data aggregation manager 504 may work in conjunction with a data filtering manager 506 to scale, cleanse, normalize, and/or otherwise format the various data sets such that they can be processed by the predictive modeler 508. Upon receipt of aggregated data from the master data aggregation manager 504, the predictive modeler applies a predictive model to develop one or more model outputs, shown in FIG. 5 as model outputs 510A-510N. For example, in situations where a given inventory incorporates mobile devices from multiple different manufacturers, each of the model outputs 510A-510N may provide an identification of a particular channel in either or both of a business-to-business and/or business-to-customer contexts through which a given portion of the inventory may be distributed, and an indication of the pricing and/or other conditions that may apply.

In some example implementations of data flow 500, the prediction modeler 508 may employ a MARS model and/or another machine learning or a trainable model such that, over time, the prediction modeler 508, through receiving a plurality of user confirmations, may improve the determination of a one or more channels and/or conditions through which resources may be efficiently distributed.

In some such embodiments, the prediction modeler 508 may employ machine learning, or equivalent technology to improve the prediction and modeling of channels and conditions through which resources may be efficiently distributed. In some examples, the prediction modeler 508 may generally provide a trained model that is given a set of input features, and is configured to provide an output of a score (such as a reliability score, for example), a recommendation, or the like. In some embodiments, a trained model can be generated using supervised learning or unsupervised learning. In some examples, such learning can occur offline, in a system startup phase, or could occur in real-time or near real-time during performing the methods shown in the described figures (e.g., predicting and modeling an optimum channel for the distribution of resources). The trained model may comprise the results of clustering algorithms, classifiers, neural networks, ensemble of trees in that the trained model is configured or otherwise trained to map an input value or input features to one of a set of predefined output scores or recommendations, and modify or adapt the mapping in response to historical data returned from previous iterations (e.g., measured distributions, such as those derived from available data).

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd based input or the like (e.g., user confirmations).

In some examples, the prediction modeler 508 may be configured to apply a trained model to one or more inputs to identify a set of reliability scores. For example, if the input feature was competitive sales information, such as may be obtained from one or more data sources, the prediction modeler 508 may apply such data to the trained model to determine whether the resulting predicted channel and/or pricing is accurate. In some examples, the trained model would output a suggested reliability score based on other predictions and/or measurements using the same data.

Regardless of the precise configuration of the prediction modeler 508, upon receipt of a request data object (and any necessary extraction or parsing of data and/or other request-related data contained therein) the prediction modeler 508 retrieves and/or otherwise receives one or more data objects from the repositories 502A-502N and determines the channel, pricing, and/or other conditions that apply to the predicted disposition of the inventory referenced in the request data object.

FIG. 6 is a flow chart of an example process 600 for predicting and modeling one or more channels and/or conditions that allow for the efficient distribution of resources in a given environment. As shown at block 602, process 600 begins with receiving a request data object from a user. The request data object may incorporate a wide range of information and be expressed in any format that allows for the transmission of a request data object from a system associated with a user, such a request source system 104, for example, to a machine learning model and/or a system associated with such a model. In general, a request data object will incorporate information sufficient to identify the inventory and/or other resources associated with the request, and may further identify a time and/or other conditions that impact the likely disposition of the inventory at a future time. In some example implementations of block 602, the request data may also include an authenticated indication of the identity of the user.

As shown at block 604, process 600 continues with the extraction of a request data set for the relevant inventory from the request data object. As discussed herein, the request data set may include information sufficient to identify the relevant inventory, such as the mobile devices and/or quantity of such devices to be distributed. In some example implementations, the request data set includes a set additional information, such as the information that may be available from any of the data warehouses or other repositories discussed herein and/or other information related to the request itself.

In block 606, the process 600 involves the receipt of a series of context data objects. The context objects received in block 606 may include any of the data sets discussed and/or otherwise contemplated herein, including but not limited to the data sets that may be stored in one or more memories, data warehouses, and/or other data repositories. As set out in process 600, example implementations of block 606 involve context data objects and data sets associated with resources and channels through which such resources may be delivered and/or otherwise distributed. This data is used to drive the predictive model used to identify and model the channel and conditions that will allow for the efficient distribution of the relevant inventory and/or other resources at a time in the future.

As shown in block 608, process 600 also includes using a machine learning model (such as through the application of the received context data objects and data set, for example) to generate and/or otherwise retrieve a predicted channel and/or condition set. In some example implementations, the model may be a MARS model, and, upon the application of the relevant data sets to the model, one or more channels and the relevant conditions (such as pricing, capacity, and/or the like, for example) are predicted and modeled so as to identify channels and conditions that will allow for the efficient distribution of the relevant resources.

As shown at block 610, process 600 also includes causing a renderable object with the predicted channel and condition data set to be displayed on a user device. In some example implementations, the renderable object may be transmitted to a user device and cause the channel information, condition information, and/or other content contained in the predicted channel and condition data set to be presented to the user in a manner that allows the user to view and interact with the information.

Example Contextual Implementation for Channel Prediction and Modelling

As noted herein, some example implementations arise in contexts involving the resale of mobile devices received in connection with the fulfillment of insurance programs and/or other service contracts. In some such situations, mobile devices are directed to one or more aggregators that are capable of distributing mobile devices through various commercial channels. In connection with identifying and selecting the aggregators (or other channels) to which to direct one or more sets of mobile devices, numerous categories of disparate data are captured, scaled, and/or otherwise processed to allow for the algorithmic tiering of aggregators and the direction of resources to those aggregators.

In some example implementations, several processes are involved with identifying the available inventory to be distributed, receiving bids from aggregators for portions of that inventory, algorithmically tiering the aggregators, developing and applying a decay curve to the offers associated with the aggregator bids, determining the optimal offer and profit calculation from amongst the offers from the aggregators, and allocating the inventory amongst the available channels. These processes tend to occur in a periodic cycle (such as weekly, monthly, and/or on another periodic schedule. FIG. 7 is a flow chart of depicting an example process 700 that reflects these and other operations in accordance with some example implementations that may be used in the allocation of resources to aggregators.

As shown at block 702, the example process 700 includes acquiring resource inventory and one or more offers from aggregators. In a given cycle, upon receiving a list of the available inventory and/or expected inventory to be distributed, the system shares all or part of the available inventory information with the relevant group of aggregators. Based on this available inventory information, each aggregator prepares an offer, which may take the form of a request data object that contains a plurality of request parameters, such as the bid price for one or more SKUs, expected margin information, the quantities of the various inventory elements that the aggregator requests, and/or other information requested as part of the bid process, for example. In some example implementations, additional information about the aggregator may be supplied by the aggregator and/or determined by the system to build a channel profile, which reflects a set of properties associated with a given aggregator.

As shown at block 704, example process 700 includes updating the relevant decay parameters and the relevant tiering parameters. In addition to soliciting bids and/or other resource requests from the aggregators, the system updates the bid decay parameters and tiering parameters in advance of calculating tiers to which the aggregators are assigned and a decay curve to be applied to the collected bids. In some example implementations, the set of tiering parameters and/or the set of decay parameters may be received by the system as data objects, from which the relevant parameters may be extracted for use by the system.

Since the categories of disparate data used in connection with example implementations may come from multiple independent sources and/or may reflect quantities, values, and/or other metrics that are set at multiple different scales, one of the data processing steps used in connection with the algorithmic tiering of aggregators involves scaling the data, which may, for example result in a transformed numerical value, such as a limited set of integers, a scaled range of values, or the like, for example, that can be more readily combined and processed.

One of the factors that may be used in connection with tiering one or more aggregators is the volume, at a portfolio level, offered by a given aggregator. In some example implementations, the relevant volume is the sum of all volumes offered by an aggregator across all of the relevant skus for which the aggregator may be used to distribute. It will be appreciated that such a volume measurement can provide a gauge into the overall volume of mobile devices and/or other resources that the aggregator intends to buy, and further indicates the scale of business that the aggregator can provide. Since the information underlying the volume calculation is typically expressed as a actual number of units for each relevant sku, a scaled value may be achieved through the use of a scoring algorithm that ranks each aggregator based on their total expressed volume, assigns the highest score to the aggregator with the highest rank, and assigns incrementally lower scores to the other aggregators based on their rank.

Another factor that may be used in connection with tiering one or more aggregators is the portfolio-level profit margin projected by one or more aggregators. In some example implementations, the portfolio-level profit margin is calculated by summing the profit margin across all SKUs identified by a given aggregator. It will be appreciated that this aggregated, portfolio-level profit margin is representative of the total profit margin that may be available via a given aggregator. Since the information underlying the portfolio-level profit margin is typically expressed as a monetary value, a scaled value may be achieve through the use of a scoring algorithm that ranks the aggregators based on their respective profit margins, assigns the highest score to the aggregator with the highest projected margin, and assigns incrementally lower scores to the other aggregators based on their rank.

Another factor that may be used in connection with tiering one or more aggregators is the entropy, or measure of variety associated with a given aggregator. In some example implementations, the entropy measurement reflects the variability offered by an aggregator on the various unique SKUs that the aggregator is associated with. This information provides insight into how many types of devises an aggregator intends to buy and indicates the scale of business the aggregator is capable of providing. In one example implementation, an entropy measurement is determined and scaled by sorting the relevant CNNs according to their respective revenue potentials by multiplying the CNN volumes by their predicted average selling price. The sorted devices are then combined, or binned, into categories (such as ten categories, for example) according to their ranks. An aggregator-level entropy measurement can then be obtained using the formula $E=\Sigma n \ast \log n$, where n is the volume of devices bid in a given bid, divided by the total volume of devices bid. Entropy scores are then assigned an integer score based on an inverse ranking of entropy values. As such, a higher entropy score of an aggregator tends to signify that the aggregator is bidding on a large number of CNNs, and there is a potentially better customer to the provider of mobile devices from a perspective focused on variability.

Another factor that may be used in connection with tiering one or more aggregators is the specialty of the aggregator. In some example implementations, the identification of the geographic market in which an aggregator focuses its efforts is relevant to determining the extent to which the aggregator competes in a given market. For example, if a specialty in a domestic market would tend to unduly increase competition, the geographic focus of an aggregator may be assigned on a point scale that incorporates positive and negative numbers, such as the integers from $-2$ through 2, where a domestic-only aggregator received an $-2$, a mostly domestic aggregator received a $-1$, an aggregator with an equal domestic and international footprint received a zero, a mostly international aggregator received a 1, and a wholly international aggregator received a 2.

Another factor that may be used in connection with tiering one or more aggregators is the length of the relationship between the source of the mobile devices and/or other resources and the aggregator. In some situations, the length of the relationship tends to correlate to the stability of the business relationship. To translate a temporal measurement into a scaled value, a scoring algorithm may be used that calculates the length of the relevant relationship in days, and then supplies an inverse ranking to ensure that the longest relationship receive the most points.

Another factor that may be used in connection with tiering one or more aggregators is the determination of whether an aggregator has failed a relevant audit. In some situations, the failure of an audit would indicate that an aggregator should be subjected to additional scrutiny and/or a penalty before allocating mobile devices and/or other resources to the aggregator. Since the failure of an audit is a binary condition, a scoring algorithm may be used to apply a binary score to a given aggregator, such as a $-1$ score for an aggregator that failed an audit, and a zero score for a non-failing aggregator.

Another factor that may be used in connection with tiering of one or more aggregators is the invoice amount each business-to-business aggregator provided in a previous offer cycle. In some situations, a previous invoice amount is an indicator of the actual amount of business provided by a given aggregator, as opposed to a predicted level reflected in an offer or bid. Since the invoice amount is typically expressed in its native form as a monetary value, the invoice value may be scaled through the application of an algorithm that identifies the highest total invoice amount amongst a set of aggregators, provides the highest score to that aggregator, and then incrementally decreases the score applied to lower-ranked aggregators.

Other factors that may be used in connection with tiering one or more aggregators include ranking based on D&B Paydex scores, the extent to which the aggregator has an exclusive relationship with the source of mobile devices and/or other resources, the value and/or volume of return material authorizations sought by an aggregator over time, the timeliness of bids, and the timeliness of payments, for example.

As shown in block 706, example process 700 includes applying the tiering parameters to the relevant aggregators. Regardless of the precise factors used to generate scaled scores for use in tiering a group of aggregators, upon the compilation of scores, the aggregators may be automatically divided into multiple tiers. For example, based on scores built up over four or more (or another number, for example) bidding cycles, one set of aggregators may be assigned to the highest tier, while lower ranked aggregators may be assigned to lower tiers. For example, the top 40% of aggregators may be assigned to tier 1, the next 30% of aggregators may be assigned to tier 2, and the remaining 30% may be assigned to a lower, third tier. Regardless of the particular thresholds applied, the channel profile associated with an aggregator is assigned to a tier based at least in part on the application of one or more of the tiering parameters discussed herein and/or additional information received in a bid from an aggregator to a tiering algorithm. In some example implementations, the tier assigned to a given aggregator is used in connection with further algorithmic assessment of the bid or bids provided by a given aggregator and/or the allocation of inventory across a set of qualified aggregators.

One of the technical challenges that arises in example implementations that deal with the distribution of resources is the potential for high volatility in market and spot prices, which is further compounded by the potential for third-party data sets and other data sources to include errors. Since machine learning algorithms tend to be sensitive to the range and distribution of attribute values, addressing outlier data can be important in avoiding situations where the training process is unduly extended or altered due to outlier data. In some situations, such as where multiple data points are captured relatively closely in time, it may be advantageous to delete an outlier data point (such as a pricing value and/or rate-of-change value) that falls outside the expected range. In some situations, such as when data points are sparse, it may be advantageous to replace an outlier value with an interpolation between two or more adjacent data points, a weighted average, and/or a moving average.

As shown at block 708, the example process 700 includes applying a decay curve to offers received from one or more aggregators. As noted herein, in addition to assigning one or more aggregators to a given tier based on certain scaled parameters, example implementations further contemplate the application of a decay curve to the bid and/or bids associated with a given aggregator. As noted herein, some aspects of the assessment of aggregators, comparing bids received from aggregators, and allocating resources to various channels involve the use of multiple sets of data acquired over time. In order to prevent aged data from obscuring current trends and/or otherwise impairing the predictive power of the relevant model or models, some example implementations contemplate the use of a decay factor that is applied to bids and/or aged data to reduce the impact the aged data has over time and to ensure that the model retains its power to predict future pricing information and/or other information bearing on the ability to efficiently distribute inventory via one or more channels. One approach to developing a decay factor and/or otherwise processing the relevant data involves the use of a MARS (multivariate adaptive regression splines) model. MARS is a non-parametric regression technique (which some view as an extension of linear models) that automatically models nonlinearities and interactions between variables. In general, MARS build models of the form:

$$\hat{f}(x) = \Sigma_{i=1}^{k} c_i B_i(x)$$

In accordance with such a form, the model is a weighted sum of basis functions $B_i(x)$, where each $c_i$ is a constant coefficient. In such a model, each basis function may take one of the following forms: (1) a constant 1, where there is one such term, the intercept; (2) a hinge function that has the form max(0, x−const) or max(0, const−x), and where MARS automatically selects variables and values of those variables for knots of the hinge function; or (3) a product of two or more hinge functions, which can model the interaction between two or more variables. As such, through the application of the various model outputs and/or intermediate signals, a decay rate and/or decay function can be determined, incorporated into a larger model, and applied to one or more sets of data.

In some situations, the application of a MARS-based model to establish a decay function allows for pricing information provided by an aggregator and/or otherwise obtained (such as through the analysis of sales on a distributed user platform, such as eBay™ and/or other channels through which mobile devices may be directly sold to consumers, for example) to be fed to the decay model such that the prices at which customers are likely to purchase the mobile devices at a particular time in the future can be modeled. For example, the pricing estimates obtained from aggregators and market pricing information can be fed as inputs to the MARS-based model, along with other scaled data streams (such as those received in connection with the assessment of aggregators, included in a bid, and/or additional market data, for example) to create pricing curves that predict the likely decay in pricing for a given mobile device SKU over time. Using the combination of the tiered ranking of aggregators and the predicted decayed pricing curves, mobile device inventory can be directed to the aggregators that are most likely to be able to distribute the mobile devices at the time when the devices actually become available.

As noted herein, some example implementations arise in contexts where used mobile devices and/or other resources are acquired through buyback programs, insurance contracts, and/or other arrangements that prevent a central actor from having total control over the content and volume of the acquired inventory. However, the information used to tier the aggregators (such as the bids, expected pricing, and expected profit margin information, for example), coupled with the predicted pricing decay curves acquired through the use of the MARS-based model, can be combined and applied to a logistic regression model to set the prices and/or range of prices at which inventory can be appropriately acquired. This can be particularly advantageous in situations where inventory that is not being effectively distributed via one channel can be redirected to an alternate channel with capacity.

For example, the MARS-based model develops a pricing decay function that provides, as output, the predicted price for all of the relevant mobile devices and/or other resources for a given time window in the future. This pricing information can then be combined with the tiering information and a list of all devices that are to be allocated. For example, the pricing information provided in bids from aggregators, additional market data, data defining internal margin guidelines, and the like can be combined with the anticipated future pricing to calculate a price at which each available item in inventory is likely sell at during an interval of time in the future.

After the pricing decay function has been applied to the bids received from the aggregators, the system generally holds three categories of information that can be combined and otherwise applied to a model to identify the optimal offer(s) and profit(s) for the available inventory. This information, including but not limited to the results of the tiering and the application of the decay curve to any relevant offers, may be held in memory, as shown in FIG. 7 at block 710

As shown in blocks 712 and 714, the example process 700 includes determining one or more optimal offers, determining a resource allocation, and applying the resource allocation. It will be appreciated that not all aggregators, other channels, and their respective bids are created equal. As noted herein, a number of different data points are combined in connection with assigning a tier to an aggregator. In addition to the tiering approach, the system and/or other central actor may engage in different relationships bounded by different rules and/or other thresholds that govern at least a portion of the allocation of inventory. For example, one or more aggregators may be internal partners with the central actor and/or may have a whole or partial exclusivity arrangement that entitles the aggregator to at least a portion of the inventory regardless of the competitiveness of its bid and/or the tier into which the aggregator is assigned. In some example situations, such particularized relationships may be sufficient to allocate all or most of the available inventory.

In situations where inventory remains available after the rules associated with any particularized relationships are fulfilled, the bids from the aggregators are ranked. In some example implementations, the ranking may be performed across all aggregators for a given set of items in inventory. In other example implementations, the bids may be further subdivided based on the quantity requested in connection with the bid prior to ranking. After the bids have been ranked, one or more thresholds are applied in some example implementations to limit the number of bids under consideration. For example, a threshold may be set at three bids (or some other number of bids) such that the top three (and/or the group of aggregators submitting the three highest bids) are considered to have satisfied the threshold. In some such example implementations, the tier in which a high-bidding aggregator is assigned is considered to exclude bidders from disfavored tiers and/or include bidders from preferred tiers.

Upon identifying the three (or more) aggregators with the highest bids, the relevant resource inventory is allocated to the channel profiles. Based on the decayed pricing curve, the generated probabilities, and the calculated profitabilities associated with the highest bids that otherwise satisfy the relevant thresholds, an offer price for each relevant item in inventory is generated. This offer price is then used to calculate a profit margin from the perspective of the central actor, and, where the margin is positive, the inventory items can be algorithmically allocated based on the calculated margin, which may further be informed by the quantities requested by a given aggregator, and/or any of the intermediate calculations (such as the probability calculations) referenced herein. It will be appreciated that in some situations, other factors may be used in allocating the resources, particularly where considerations such as channel profile participation, perceptions of fairness, and/or other factors are permitted to have a bearing on allocations. For example, an allocation frequency attribute may be calculated by determining a ratio between the number of times a certain channel profile has submitted a bid and the number of time that the channel profile has received an allocation. In other example situations, a crowd and/or oracle may be consulted to adjust allocations.

Additional steps may also be performed. For example, after the inventory has been initially allocated in accordance with the tiering of aggregators and the predicted decayed pricing curves, requests by aggregators for additional inventory for distribution (along with bids for that inventory) are received and considered. The demand for given SKUs and/or other inventory items is identified and scaled, while the bid pricing received from the aggregators is extracted for the available additional inventory. Based on the bid pricing and requested inventory of the bids, the aggregator bids are re-ranked, such that the best bids for the additional inventory (which may be different than the initial rankings acquired through the tiering process described above, for example). In some example implementations, the bids are applied to another model that generates a set of probabilities that a given aggregator will be able to distribute a given allocation, and further multiplies the generated probabilities against the profitability associated with the highest bids.

In some example implementations, the various parameters associated with one or more channel profiles may vary, such that a direct comparison of one parameter to another may be inappropriate in situations where such a comparison is desired. For example, one channel profile may include a bid or other offer that is structured to be valid for 30 days or more, while a second channel profile may include a bid or other offer that is only structured to be open for one week. In such situations, the decay curve may need to be selectively applied and/or have timing considerations imposed to ensure that bids of different time durations are decayed such that the bids can be compared in a similar time window. For example, if one channel profile provides a bid that is valid for an entire month, while a second channel profile provides a series of bids on a weekly basis, the first weekly bid may be decayed over the course of a month to allow for an accurate comparison to the month-long bid. In such an example, the second weekly bid may be decayed for three weeks, the third weekly bid may be decayed for two weeks, and the fourth weekly bid may be decayed for one week.

Based on the available inventory and the underlying aggregator information, the probability that a given aggregator would accept updated terms associated with the additional inventory is calculated and used to set an offering price at which additional inventory may be acquired on the market and/or bought back from aggregators with slow-moving inventory. As such, discrepancies between the calculated device allocations based on the initial tiering and price decay models can be addressed through the redirection of inventory and/or the acquisition of additional inventory to satisfy demand in a given channel that exceeds the initial allocation.

Example System Environment for Resource Offer Generation

FIG. 8 shows another example system environment 800 in which implementations involving improved resource offer generation may be realized. The depiction of environment 800 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 8 and the environment 800 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 8 are shown as discrete, separate elements, other configurations may be used in connection with the methods, apparatuses, and computer programs described herein, including configurations that combine, omit, and/or add aspects and/or components. For example, in some embodiments, the resource offer generation system 802 may be partially or entirely combined with the prediction system 102 to form a single component configured to perform the operations disclosed herein with respect to both systems.

Embodiments implemented in a system environment such as system environment 800 advantageously provide, in addition to the efficient prediction and modeling of conditions and channels through which resources may be distributed, as described above, improved resource offer generation associated with a given region-program identifier by preparing and/or retrieving one or more resource offer generation input data sets, and/or an expected resource volume data set, an average distribution term data set, and a market intelligence data set, generating a fair market offer set based on the retrieved data sets using an exception detection model, receiving a benchmark and portfolio target data set, and generating a resource offer set by applying one or more of the retrieved and generated data sets to a resource offer generation model, and/or sub-models therein. Some such implementations contemplate rendering an offer adjustment interface to a client device associated with an offer control user, where the offer adjustment interface is configured to receive manual adjustments to the generated resource offer set for updating to create an adjusted resource offer set. Further, some such embodiments cause rendering of an approval interface to an approval device associated with an offer approval user, where the interface is configured for improved analysis of the adjusted resource offer set or generated resource offer set, and approval or rejection of the adjusted resource offer set or generated resource offer set. Some such embodiments leverage a hardware and software arrangement or environment for improved resource offer generation via the actions and operations described, contemplated, and/or otherwise disclosed herein.

As shown in FIG. 8, the system 800 may include a prediction system 102, request source system 104, and content system 106. These components may each function similarly to perform the operations described above with respect to FIG. 1. For example prediction system 102 may be include prediction system module 102A configured to receive, process, transform, transmit, communicate with and evaluate request data objects, channel context data objects, the content and other information associated with such data objects, other data sets, and related interfaces via a server, such as prediction system server 102B or prediction system device 102D, prediction system database 102C configured to store information associated with request data objects, users, resources (such as used mobile devices, for example) and/or channels associated with request data objects, channel context data objects, other data sets, interfaces associated with any such data objects or data sets, request source systems, channel content systems, and/or any other information related to the efficient prediction and modeling of conditions and channels through which resources may be distributed and the generation of one or more related messages and/or digital content item sets, and prediction system device 102D configured to provide an additional means (other than via a user interface of the prediction system server 102B) to interface with the other components of prediction system 102 and/or other components shown in or otherwise contemplated by system environment 100. The prediction system server 102B and/or prediction system device 102D may connect the prediction system via any of a number of public and/or private networks, including but not limited to the Internet, the public telephone network, and/or networks associated with particular communication systems or protocols, and may include at least one memory for storing at least application and communication programs.

Similarly, system environment 800 also includes content system 106, which comprises a content module 106A, a content server 106B, and a content system database 106C, where the content system 106 is configured for communicating with prediction system 102 to provide information that the prediction system 102 may need when predicting and modeling conditions and channels through which resources may be distributed. Additionally, system environment 800 includes request source system 104, which may originate one or more request data objects, request data object information and/or additional content or other information to be associated with one or more request data objects.

System environment 800 further includes resource offer generation system 802. The resource generation system 802 comprises resource offer generation system module 802A, resource offer generation system server 802B, and resource offer generation system database 802C. The resource generation system module 802A may be configured to receive, process, transform, transmit, communicate with, and evaluate offer requests, resource offer data objects, the content and other information associated with such data objects, other data sets, and related interfaces, to generate a resource offer set, facilitate adjustment of a resource offer set, and/or manage approval of submitted resource offer sets. The resource offer generation system module 802A may perform these operations, and/or additional or alternative operations, via a server, resource offer generation system server 802B, or corresponding device. The resource offer generation system server 802B may be connected to any number of public and/or private networks, including but not limited to the Internet, the public telephone network, and/or networks associated with particular communication systems or protocols, and may include at least one memory for storing at least application and communication programs.

Resource offer generation system 802 also includes a resource offer generation database 802C that may be used to store information associated with offer requests, users, resources (such as used mobile devices, for example), and/or offer requests or corresponding information associated with offer requests, region-program data objects or corresponding information, resource offer sets, adjusted resource offer sets, other data sets, interfaces associated with the offer requests, and/or any other information related to improved generation of resource offer set(s). The resource offer generation system database 802C may be accessed by the resource offer system module 802A and/or the resource offer system 802B. In some embodiments, the resource offer generation system database 802C may, additionally or alternatively, be accessed by the prediction system module 102A, prediction system server 102B, and/or prediction system device 102D, to store information received by, generated by, or accessed by the components of the prediction system 102. While FIG. 8 depicts resource offer generation system database 802C as a single structure, it will be appreciated that generation system database 802C may additionally or alternatively be implemented to allow storage in a distributed fashion and/or at facilities that are physically remote from each other and/or the other components of offer generation system 802. Additionally or alternatively, in some embodiments, some or all of the prediction system database 102C and the resource offer generation system database 802C may be embodied as a single, joint database or distributed repository.

It will be appreciated that all of the components shown FIG. 8 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

Overall, and as depicted in system environment 800, in addition to the processes and operations facilitated and described with respect to the systems 102-106, resource offer generation system 802 engages in machine-to-machine communication with request source system 104, prediction system 102, and context content system 106, via one or more networks, to facilitate the processing of offer requests received from a user, improved generation and management of resource offer sets and corresponding resource offer data objects, and the generation and/or transmission of control signals for causing rendering of interfaces for viewing the resource offer set and/or offer analytics data set and/or market information, adjusting the resource offer set, and/or approving submitted adjusted resource offer sets.

Example Apparatus for Implementing Improved Resource Offer Generation

It will be appreciated that the resource offer generation system 802 may be embodied by one or more computing systems, such as apparatus 900 shown in FIG. 9. As illustrated in FIG. 9, the apparatus 900 may include a processor 902, a memory 904, input/output circuitry 906, communications circuitry 908, data management circuitry 910, and model performance circuitry 912. The apparatus 900 may be configured to execute any of the operations described herein.

Regardless of the manner in which the apparatus 900 is embodied, the apparatus of an example embodiment is configured to include or otherwise be in communication with a processor 902 and a memory device 904 and optionally the input/output circuitry 906 and/or a communications circuitry 908. In some embodiments, the processor (and/or co-processors or any other processing circuitry assisting or otherwise associated with the processor) may be in communication with the memory device via a bus for passing information among components of the apparatus. The memory device 904 may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

As described above, the apparatus 900 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 902 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 902 may be configured to execute instructions stored in the memory device 904 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

In some embodiments, the apparatus 900 may optionally include input/output circuitry 906, such as a user interface that may, in turn, be in communication with the processor 902 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 904, and/or the like).

The apparatus 900 may optionally also include the communication circuitry 908. The communication circuitry 908 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wired and/or wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 9, the apparatus may also include data management circuitry 910. The data management circuitry 910 includes hardware configured to retrieve, receive, generate, or otherwise access information and data for use in generating a fair market offer set, generating a resource offer set, and/or optimizing a resource offer set. For example, the data management circuitry 910 may access one or more local and/or remote databases to create, retrieve, or otherwise prepare a base table for use by one or more models. The base table may be associated with one or more stored tables, data sets, or the like, comprising inputs to one or more models, such as a resource offer generation model. In some embodiments, the data management circuitry 910 is configured to prepare, such as via a base table associated with one or more database, one or more resource offer generation input data sets, including resource offer generation input data sets may include a historical offer data set, a resource list data set, a market intelligence data set, and a resource mapping data set.

The data management circuitry 910 may be configured to retrieve, access, or create, a mapping of various resource identifiers associated with various third-party entities, aggregators, and the like, to a standardized resource set identifier, such as a CNN. For example, using the example of used mobile phones as a resource, a used mobile phone having the same attributes or specification (e.g., carrier, memory size, model, make) may be associated with a different resource identifier for a first third-party entity and a second third-party entity. The resource mapping may be performed automatically, manually, or with a combination of both automatic and manual steps for mapping third-party resource identifiers to the standardized resource set identifier, such as a CNN. The mapping may be stored as a resource mapping data set in a database or repository.

In some embodiments, the data management circuitry 910 may receive, obtain, and/or prepare market intelligence data from various third-parties. A received market intelligence data set may be associated with a third-party system, and require standardization and/or sanitization for use by one or more data models using a resource mapping data set. The data management circuitry 910 may include means configured to perform one or more processing algorithms on a received market intelligence data set before storing it for use by one or more models.

In some embodiments, the data management circuitry 910 may receive, obtain, prepare, and/or otherwise access an expected resource volume data set. The expected resource volume data set may include stored channel profiles where resources are to be distributed as allocated another system, such as a prediction system 102. The expected resource volume data set may be generated by another system, such as a prediction system 102, and stored to a database accessible via the data management circuitry 910. For example, the expected resource volume data set may be a portion of the outputted data by a prediction system 102.

In some embodiments, the data management circuitry 910 may receive, obtain, prepare, and/or otherwise access an average distribution term data set. The average distribution term data set may include at least an average sales price for various resources associated with various resource set identifiers. In some embodiments, the average distribution term data set may be generated by another system, such as prediction system 102 or another system configured to generate an average distribution data set based on the output of prediction system 102, and stored to a database accessible via the data management circuitry 910.

The data management circuitry 910 may provide an interface, such as an application programming interface (API), which allows other components of a system to obtain, generate, or otherwise access the various data sets. In some embodiments, the data management circuitry 910 may obtain information about one or more resources or economic factors associated with the distribution of resources. For example, the data management circuitry 910 may retrieve and/or standardize data associated with previous distribution of similar resources by the system, distribution of the resource by one or more third-party entities (e.g., competitors), distribution of resources by neutral-competitor entities (e.g., business-to-consumer competitors), macroeconomic factors associated with a resource, promotion periods associated with distribution of a resource, and/or other information that may be used in generating improved resource offer generation, which includes but is not limited to any of the information that may be obtained from and/or otherwise associated with a content system 106.

The data management circuitry 910 may facilitate access to information for use by the one or more models for improved resource offer generation through the use of applications or APIs executed using a processor, such as the processor 902. However, it should also be appreciated that, in some embodiments, the data management circuitry 910 may include a separate processor, specially configured field programmable gate array (FPGA), or application specific interface circuit (ASIC) to manage retrieval, access, and/or use of the relevant data. The data management circuitry 910 may also provide interfaces allowing other components of the system to add, delete, or otherwise manage records to the resource offer generation system database 802C, and may also provide for communication with other components of the system and/or external systems (for example, a prediction system database 102C) via a network interface provided by the communications circuitry 908. The data management circuitry 910 may therefore be implemented using hardware components of the apparatus configured by either hardware, software, or a combination of both hardware and software for implementing these planned functions.

The apparatus further includes model performance circuitry 912. Model performance circuitry 912 includes hardware, software, or a combination thereof, configured to perform data validation for use with one or more models for improved resource offer generation, and maintain, utilize, and apply one or more models, such as algorithmic and/or machine learning models, for improved resource offer generation. The model performance circuitry 912 may validate and/or receive and validate, a collection period data object received by a client device (for example, a request source system 104), a data collection parameter value set, and prerequisite data record sets retrieved and/or otherwise accessed, such as utilizing data management circuitry 910, from an associated database. The model performance circuitry 912 may, additionally or alternatively, initiate a resource offer generation model, and/or apply one or more relevant data sets to the resource offer generation model. In some embodiments, model performance circuitry may communicate with an external system and/or server (e.g., a cloud server), alone or in conjunction with one or more of the other components of the apparatus, which is configured to manage and perform the resource offer generation model and/or associated models and sub-models.

Example Processes for Resource Offer Generation and Adjustment

FIG. 10 illustrates an example data flow diagram 1000 for generating an optimal resource offer set via a resource offer generation system. The data flow diagram 1000 includes data flow steps between components, such as of an subsystems of the system 800, including client device 1001, resource offer generation system 1003, and approval device 1005. The client device 1001 and admin device 1001 may each be embodied by a request source system, such as a request source system 104. The client device 1001 may be associated with an offer control user, such as an authenticated user that authenticates and accesses the resource offer generation system 1003 with permissions to originate offer requests and/or adjust generated resource offer sets. Similarly approval device 1005 may be associated with an offer approval user, such as an authenticated user that authenticates and accesses the resource offer generation system 1003 with permissions to review submitted adjusted resource offer sets. The resource offer generation system 1003 may be embodied by a resource offer generation system, for example the resource offer generation system 802 embodied by apparatus 900.

In data flow 1000, several steps illustrated may be optional. Optional steps are illustrated in FIGS. 10 and 11 in broken lines. In some embodiments, one or more of the optional steps may be performed. In some embodiments, all optional steps may be performed.

At optional step 1002, the client device 1001 may create and/or configure a region-program data object. In some embodiments, an offer control user (e.g., an analyst) may access an interface, via the client device 1001, to create a new region-program data object. Each region-program data object may be associated with at least a region identifier (e.g., identifying a particular country or sub-region within a country), and a program identifier (e.g., identifying a particular offering set within the country). The offer control user, via the client device 1001 for example, may input one or more parameter values associated with the region-program data object. For example, financial target parameters, pricing parameters, and/or business analytics associated with the particular region-program data object may be provided by the offer control user. In some embodiments, an offer control user may identify and manage an existing region-program data object, for example by editing one or more parameter values for an existing region-program data object.

At optional step 1004, the resource offer generation system 1003 may store the configured region-program data object. The region-program data object may be configured by an offer control user at step 1002, and received by the resource offer generation system 1003 upon submission by the offer control user via the client device 1001 (e.g., when the offer control user engages a save or submit button associated with the interface for configuring the region-program data object). The region-program data object may be stored associated with a corresponding region-program identifier. The region-program identifier may uniquely identify the region-program data object, and may be generated and/or determined by the resource offer generation system 1003.

At step 1006, client device 1001 may initiate resource offer generation. In some embodiments, the client device 1001 initiates resource offer generation when the offer control user, via the client device 1001, selects an existing region-program data object for which the offer control user desires to generate a resource offer set. In some embodiments, the resource offer generation system 1003 may cause rendering to the client device 1001 of an interface for selecting a region-program data object for which the offer control user desires to generate the resource offer set. For example, the resource offer generation system 1003 may generate and/or transmit one or more control signals causing a renderable object comprising an interface rendered for selecting a region-program data object from a list of existing region-program data objects.

At step 1008, the client device 1001 may submit a collection period data object, or corresponding collection period timestamps for defining a collection period data object, associated with the resource offer set to be generated. In some embodiments, the collection period data object is defined by, or includes, a collection period start timestamp and a collection period end timestamp. The collection period data object may represent a time interval for which the offer control user is seeking to provide resource offers based on the generated resource offer set. In some embodiments, the offer control user may input the collection period start timestamp and the collection period end timestamp, for generating a corresponding collection period data object, via an interface rendered to the client device 1001 (e.g., via a user interface component, such as a dropdown component, for inputting the collection start date timestamp and the collection end date timestamp).

At step 1010, the resource offer generation system 1003 may receive a resource offer generation initiation request. The resource offer generation request may be received in response to engagement, by the offer control user via client device 1001 after input of the collection period start timestamp and collection period end timestamp, of an interface component configured to transmit the resource offer generation initiation request. The resource offer generation initiation request may cause preparation of one or more resource offer generation input data sets for use by one or more models, such as a resource offer generation model and/or an exception detection model. In some embodiments, the resource offer generation initiation request comprises at least the collection period start timestamp and collection period end timestamp selected by the offer control user, which may be used by the resource offer generation system in creating and/or determining a collection period data object. Alternatively, in some embodiments, the resource offer generation initiation request comprises a collection period data object created and/or transmitted from the a client device, for example client device 1001.

At step 1012, the resource offer generation system 1003 may validate the collection period data object. The resource offer generation system 1003 may validate that the collection period start timestamp associated with the collection period data object represents a future timestamp (e.g., today or later). The resource offer generation system 1003 may also validate that the collection period end timestamp associated with the collection period data object represents another future timestamp with respect to the collection period start timestamp (e.g., the collection period end timestamp is the same date and/or time, or later, than the collection period start timestamp). In this respect, the resource offer generation system 1003 is configured to verify the collection period represents a valid future timestamp range defined by the collection period start timestamp and the collection period end timestamp.

Additionally or alternatively, the resource offer generation system 1003 may validate that time interval represented by the collection period data object does not overlap with another collection period data object for an existing request or stored resource offer set. For example, the resource offer generation system 1003 may query a repository, such as an offer approval repository, for all offer status records associated with a particular region-program identifier, where each offer status record is associated with a collection period data object, and determine that each of the collection period data objects for the stored offer status records does not overlap the input collection period. The resource offer generation system 1003 prevents multiple, conflicting If the collection period data object is not validated at step 1014, the resource offer generation system 1003 may provide an error message to the client device 1001. The error message may indicate that the selected collection period start timestamp and selected collection period end timestamp are invalid (e.g., the timestamps do not form a valid date timestamp range, or the interval embodied by the timestamp overlaps with another collection period for a pending or existing resource offer set). The error message may, additionally or alternatively, prompt the offer control user of the client device 1001 to input a new collection period start timestamp and/or new collection period end timestamp. The error message may be configured for rendering, by the client device 1001, to a corresponding interface. If the collection period data object is validated at step 1014, flow continues to step 1016.

At step 1016, resource offer generation system 1003 may validate one or more resource offer generation input data sets. The resource offer generation input data sets may be retrieved from a repository, or a plurality of repositories, maintained by and/or accessible to the resource offer generation system 1003. The resource offer generation input data sets may comprise data extracted from, or retrieved associated with, a plurality of disparate resources and/or repositories, and/or data retrieved by various data extraction and/or retrieval processes. For example, in some embodiments, the resource offer generation system 1003, and/or an associated system, generates and/or prepares one or more the resource offer generation input data sets via the various data extraction and/or retrieval processes. In some embodiments, for example, some or all of one or more of the resource offer generation input data sets may be obtained via scraping one or more tracked web resources, retrieval from public data repositories, retrieval from private data repositories, derived and/or tracked via the resource offer generation system 1003 and/or an associated system.

In some embodiments, the one or more resource offer generation input data sets are updated by the resource offer generation system (or an associated system) at one or more predefined intervals. For example, the resource offer generation input data sets may be updated daily, weekly, or the like, or some resource offer generation input data sets may be updated at a first interval and some resource offer generation input data sets may be updated at a second interval. Each of the resource offer generation input data sets may be associated with a particular region-program identifier and/or a collection period data object.

Additionally or alternatively, one or more of the resource offer generation input data sets may be updated in real-time. In some embodiments, one or more of the resource offer generation input data sets is updated automatically, in real-time, immediately prior to validation. In other embodiments, one or more of the resource offer generation input data sets is updated in real-time when validation is unsuccessful for one or more of the resource offer generation input data sets.

In some embodiments, each of the one or more resource offer generation input data sets is validated using one or more data sufficiency models. The data sufficiency models may determine whether the resource offer generation input data sets satisfy one or more predetermined requirements. For example, a data sufficiency check may determine whether one or more of the resource offer generation input data sets has been updated within a predetermined time interval (e.g., updated within the previous day, the previous week, or the another time interval). In some such embodiments, each of the resource offer generation input data sets may be associated with a last updated timestamp. Additionally or alternatively, in some embodiments, a data sufficiency check may determine whether one or more of the resource offer generation input data sets satisfies an expected accuracy threshold. For example, one or more data accuracy models may be used to determine an accuracy value for each of the resource offer generation input data sets based on expected data formats, missing data, and the like. It should be appreciated that, in other embodiments, additional or alternative data sufficiency checks may be performed in any combination to validate the resource offer generation input data sets.

The resource offer generation input data sets may be applied to one or more models, such as algorithmic or machine learning models, for use in generating a resource offer set. The resource offer generation input data sets may be input, and/or otherwise utilized by, the one or more models for use in generating the resource offer set. For example, the resource offer generation input data sets may include one or more data sets for applying to an exception detection model to generate a trusted resource characteristic data set, for example a fair market offer set, which may be applied to or otherwise used by a resource offer generation model. Additionally or alternatively, the resource offer generation input data sets may include one or more data sets for applying to a resource offer generation model to generate a resource offer set.

The resource offer generation input data sets may include a historical offer data set, a resource list data set, a market intelligence data set, and a resource mapping data set. Each of the resource offer generation input data sets may be obtained from a sub-system or device associated with the resource offer generation system 1003. In some embodiments, the resource offer generation system 1003 may communicate with one or more sub-systems and/or other associated devices to obtain the resource offer generation input data sets via a database accessible to resource offer generation system 1003. Each of the resource offer generation input data sets may be stored in a separate table within a database accessible to the resource offer generation system 1003, and/or may be stored associated with a base table linked to the tables corresponding to the resource offer generation input data sets.

The resource offer generation input data sets may include a historical offer data set. The historical offer data set may include at least information associated with previous generated offer data objects, resource acquisition information associated with the previous generated offer data objects, sales information associated with said resources, or the like. The historical offer data set may be used to retrieve and/or generate an expected resource volume data set, which may be associated with particular resource set identifiers for a particular region-program identifier.

The resource offer generation input data sets may include a resource list data set. The resource list data set may include resources present in inventory for a particular region-program identifier and grade level for each resource set identifier associated with the resources. The resource list data set may include warehouse details, which may comprise resource attributes, mapped to each resource set identifier for resources. For example, resource manufacture identifier and model identifier may be mapped to the resource set identifier and assigned a resource identifier. The resource list data set may also indicate whether an resource offer data object should be generated for the resource in the resource list data set. For example, the resource list data set may flag each resource for which a resource offer data object is to be generated, for example using a bit flag.

The mapping data set may include correlation information for linking various resource identifiers associated with various third-party entities, aggregators, and the like, to a standardized resource set identifier for use in analyzing the other resource offer generation input data sets including data records retrieved from or associated with a third-party system. The mapping data set may be manually and/or algorithmically created to map third-party resource identifiers to the standardized resource set identifier for each region and/or third-party. For example, third-party resource identifier information may be retrieved associated with a particular third-party system for a particular region. The third-party resource identifier information may include one or more resource attribute values (e.g., a manufacturer identifier, model identifier, storage size identifier, and the like). The system may algorithmically provide a mapping between the third-party resource identifier information and a standardized resource set identifier, and generate a mapping score indicative of the likelihood the generated mapping is correct. The mapping score may be based on matching of known resource attribute values associated with the resource set identifier to resource attribute values parsed from the third-party resource identifier information. The mapping score may then be compared to a mapping confirmation threshold, wherein mapping scores that satisfy the mapping confirmation threshold (e.g., by exceeding the threshold) are deemed accurately mapped. If third-party resource identifier information is mapped and assigned a mapping score that does not satisfy the mapping confirmation threshold, the third-party resource identifier information may then be marked and/or otherwise caused to be reviewed for manual mapping. The mapping data set may include the completed algorithmic and manual mappings.

The resource offer generation input data sets may include a market intelligence data set. The market intelligence data set may be collected, obtained, and/or otherwise retrieved from one or more third-party systems. In some embodiments, the market intelligence data system may include information and/or data stored by the resource offer generation system 1003, for example in a corresponding database. The resource offer generation system 1003 may be configured to alter the market intelligence data set using one or more processing algorithms for verifying the sufficiency and/or validity of the various records in the market intelligence data set. For example, one or more processing algorithms may be used to identify, and remove or flag for manual adjustment, data records not including required information for mapping the market intelligence data to a resource set identifier. The market intelligence data may be mapped as associated with a particular resource set identifier and/or specific resources based on the mapping data set. For example, a particular subset of the market intelligence data set may include or otherwise be associated with a resource set identifier to which that subset of market intelligence data applies.

Additionally or alternatively, the resource offer generation input data sets may include one or more data sets derived from and/or generated by a prediction system as described herein. For example, the resource offer generation input data sets may include an expected resource volume data set, an average distribution term data set, The resource offer generation input data sets may include a projected receipts data set derived from the expected resource volume set, average distribution term data set, and/or other data objects or data sets derived from or generated by the prediction system. The projected receipts data set may represent a projected resource volume for a given region-program identifier, and/or may include an expected or predicted price characteristic for each resource set identifier to be distributed associated with a particular channel profile.

If the one or more resource offer generation input data sets are not validated at step 1018, an error message may be provided to the client device 1001. The error message may indicate that one or more of the resource offer generation input data sets is/are not present in an associated database, such as resource offer generation system database 802C. For example, the resource offer generation input data sets may not be validated when one or more of the prerequisite data record sets has not been generated for the region-program identifier for which the resource offer generation process was initiated at step 1006. In some embodiments, the resource offer generation system 1003 may query a database, for example embodied by the resource offer generation system database 802C, using the region-program identifier selected by the offer control user, to determine whether all required resource offer generation input data sets exist and/or are updated as described above. If the resource offer generation input data sets are validated at step 1018, flow may continue to step 1020.

At step 1020, the resource offer generation system 1003 may provide data collection parameters to the client device 1001. The resource offer generation system 1003 may identify the data collection parameters to be provided based on the region-program data object configured by the offer control user and stored at an earlier step. For example, the collection parameters may include particular financial analysis metrics, goals, costs, or other parameters associated with the region program data object. Some, none, or all of the collection parameters may be associated with a default value configured by the offer control user at an earlier stage. Example collection parameters include a channel mix for distribution channels, one or more activity costs, commissions, minimum offer requirements, minimum offer profit requirements, minimum margin requirements, volume mixes for resources, and/or multipliers and/or adjustment indices for resources based on one or more resource attributes and/or conditions (e.g., a resource age multiplier, a resource functionality multiplier, a resource lock status multiplier, and the like).

The resource offer generation system 1003 may generate and/or transmit one or more control signals to the client device 1001, the control signal(s) causing a renderable data object comprising an interface displayed at one or more client devices, including the client device 1001. The interface may include components, or otherwise be configured, for rendering the data collection parameters for input by a user, such as an offer control user associated with the client device 1001. For example, the interface may include an input component associated with each data collection parameter for receiving a data collection parameter value for the corresponding data collection parameter.

At step 1022, client device 1001 may render the data collection parameters for input by an offer control user. In some embodiments, each of the data collection parameters provided at step 1020 is rendered to an interface provided via the client device 1001 in response to receiving the provided data collection parameters. For example, a renderable data object may be rendered by the client device 1001, where the renderable data object comprises an interface component for each data collection parameter. Each data collection parameter may be rendered associated with an interface component for changing the value associated with the corresponding data collection parameter. If provided, each data collection parameter may be rendered associated with a corresponding default value configured by the offer control user based on the associated region-program data object. The user may engage with the interface component associated with a data collection parameter to input a new data collection parameter value associated with that data collection parameter.

At step 1024, client device 1001 submits values for data collection parameters. In some embodiments, the offer control user may engage an interface component, such as a submit button, rendered to the interface, to submit the currently input values for the data collection parameters. The values submitted may include various values manually input and/or loaded by an offer control user via the client device 1001. In some embodiments, the values submitted may include one or more default values that the offer control user did not change. The client device 1001 may transmit an electronic data transmission including the data collection parameter values to the resource offer generation system 1003, which may receive the electronic data transmission and parse the electronic data transmission to extract the data collection parameter values.

At step 1026, resource offer generation system 1003 may receive and, in some embodiments, validate the submitted data collection parameter values. The data collection parameter values may be validated using a validation rule set stored by, and/or retrievable by, the resource offer generation system 1003. The validation rule set may ensure that one or more of the collection parameter values, alone or in combination with other collection parameter values, satisfies a predetermined rule. For example, in some embodiments, the validation rule set may include business rules associated with the profitability and/or distribution allocation of resources.

If the data collection parameter values are not validated at optional step 1028, an error message may be provided to the client device 1001. The error message may indicate that one or more validation rules of the validation rule set were not satisfied. Additionally or alternatively, the error message may specifically indicate the particular validation rule not satisfied, and/or suggestions associated with altering collection parameter values to satisfy the validation rule set. If the data collection parameter values are validated at optional step 1028, the data collection parameter values may be stored associated with the region-program identifier and/or collection period data object submitted by the offer control user. In some embodiments, the data collection parameter values may be stored as a benchmark and portfolio target data set associated with the region-program data object. In some embodiments, the data collection parameter values may be stored in a temporary or staging table of a database, such as the resource offer generation system repository 802C. Flow then continues to step 1030.

At step 1030, an offer control user requests resource offer generation via the client device 1001. In some embodiments, the offer control user may automatically request resource offer generation in response to submitting the collection parameter values. In other embodiments, upon submission and validation of the data collection parameter values, the offer control user may be prompted, via the client device 1001, to provide and submit an additional data set (e.g., values for one or more additional data collection parameters based on the originally submitted collection parameter values).

To request resource offer generation, the client device 1001 may transmit a resource offer generation request to the resource offer generation system 1003. The resource offer generation request may comprise, or otherwise be associated with, the region-program identifier associated with the region-program data object initiated by the offer control user at an earlier step, and the collection period data object. Additionally, in some embodiments, the resource offer generation request may comprise the data collection parameter values for the various data collection parameters.

At step 1032, the resource offer generation system 1003 may receive the resource offer generation request, for example transmitted by the client device 1001. The resource offer generation system 1003 may receive the region-program data object and/or corresponding region-program identifier, and receive the collection period data object. The resource offer generation request indicates the offer control user has finalized and submitted all parameter value inputs. In some embodiments, upon receiving the resource offer generation request from the client device 1001, the resource offer generation system 1003 may transfer the data collection parameter values from the temporary or staging table to an implementation table accessible by one or more models for resource offer generation. For example, in some embodiments, the data collection parameter values may be transferred to an attributes table accessible for applying to a resource offer generation model and/or exception detection model.

In some embodiments, the resource offer generation system 1003 may maintain one or more repositories, databases, or the like, for managing offer status records associated with resource offer sets generated for a particular region-program identifier and collection period data object. For example, in some embodiments, the resource offer generation system may maintain an offer approval repository comprising an offer status record for each region-program identifier and collection parameter data object for which resource offer generation has been requested. Each offer status record may be retrievable associated with the region-program identifier and collection parameter data object.

An offer status record may be created upon receiving a resource offer generation request. Once generated, the offer status record may be associated with a requested status indicator. At any given time, an offer status record for a particular region-program identifier and collection period data object may be associated with only a single resource offer set. The offer status record may first be associated with the resource offer set generated at a later step. The resource offer set may then be updated, or otherwise adjusted, to create an adjusted resource offer set, which then may be stored associated with the offer status record. Further, adjustments may be made to the stored resource offer set associated with the offer status record, such that an adjusted resource offer set may further be updated.

At step 1034, the resource offer generation system 1003 generates a resource offer set using a resource offer generation model. In some embodiments, the resource offer generation model may be embodied by one or more algorithms for generating one or more resource offer data objects having particular resource offer values. In other embodiments, the resource offer generation model may be an algorithmic model configured to generate the resource offer set based on one or more input parameter sets. For example, the resource offer generation model may be based on the resource offer generation input data sets. In other embodiments, the resource offer generation model may be a machine learning model configured to predict a resource offer set.

The resource offer generation model may be configured, and/or trained, to generate the resource offer set based on the one or more of the resource offer generation input data sets. The resource offer generation input data sets may, additionally or alternatively, include one or more data sets received from, or output from, a prediction system, or other data sets derived from data sets received from or output from the prediction system. For example, the resource offer generation model may generate the resource offer set based on, at least in part, an expected resource volume data set for the various channel profiles allocated by the prediction system. In a particular example of used mobile device acquisition and distribution, the expected resource volume data set may include an expected, or predicted, set of resources to be distributed associated with the efficient channel allocations of resources (e.g., a number of resources associated with various resource set identifiers). Additionally or alternatively, the resource offer generation model may generate the resource offer set based on, at least in part, an average distribution term data set. In the particular example of used mobile device acquisition and distribution, the average distribution term data set may include an expected sales price at which resources are to be distributed via the efficient channel allocations. The average distribution term data set may, for example, include price characteristics for various resource set identifiers, and/or may be based on, or include, a decay parameters data object associated with a decay curve to estimate changes in the expected price characteristic for the various resource set identifiers due to an expected time interval for distribution. In some embodiments, the resource offer generation model may retrieve, receive, or otherwise obtain the decay parameters data object for use in determining an expected price characteristic for distribution of resources associated with one or more resource set identifiers based on a distribution time delay input parameter included in the benchmark and portfolio target data set. For example, the average distribution term data set may be adjusted based on the decay curve and the distribution time delay input parameter. In some embodiments, the expected resource volume data set and average distribution term data set, a combination of these sets, or a portion or combination of portions thereof, and/or the market intelligence data set and/or portions of the market intelligence data set, may be used to derive a projected receipts data set for the distribution of expected resources, such as used mobile devices, through the efficient channel allocations associated with the conditions or characteristics, such as price characteristics, predicted by the prediction system. In some embodiments, resource offer generation model may be configured to generate the resource offer set based, at least in part, on the projected receipts data set applied to the resource offer generation model.

The resource offer generation system 1003 may be configured to access a database, for example embodied by the resource offer generation system database 802C, to retrieve and/or utilize the one or more resource offer generation input data sets. In some embodiments, the database may be updated, at least in part, by the prediction system. Alternatively, in some embodiments, the resource offer generation system 1003 may be configured to retrieve at least a portion of the resource generation input data sets from the prediction system and/or an associated database, such as the prediction system database 102C.

The resource offer generation model may be configured to generate the resource offer set where the resource offer set such that the resource offer set includes resource offer data objects for various resource set identifiers that satisfy a desired benchmark and portfolio target data set. The benchmark and portfolio target data set may include some or all of the data collection parameters input by an offer control user at an earlier step. For example, in some embodiments, a particular region-program data object having the input region-program identifier may be associated with one or more particular data collection parameters that define a benchmark and portfolio target data set (e.g., financial target parameters that a resource offer set must satisfy). Additionally, in some embodiments, one or more of the data collection parameters may be associated with a default parameter value, which may be altered via input by the offer control user, for example provided at step 1024.

In some embodiments, the resource offer generation model may utilize, or otherwise be associated with, one or more sub-models for generating the resource offer set. For example, the resource offer generation model may comprise at least an offer optimization model configured for optimizing a resource offer set, or generating an optimized resource offer set, based on one or more boundary conditions, such as a benchmark and portfolio target data set, and/or other applied data sets. Additionally or alternatively, for example, the resource offer generation model may be associated with, or utilize, an exception detection model configured to generate a fair market offer set for various resources, such as those to be acquired based on a resource list data set and/or expected resource volume data set. In some embodiments, the market intelligence data set, and/or one or more subsets thereof, may be utilized along with the fair market offer set generated by the exception detection model to generate the resource offer set. For example, the market intelligence data set may include a maximum third-party offer data object set comprising a maximum third-party offer data object associated with each resource set identifier for one or more third-party entities, and/or an average third-party offer data object set comprising an average third-party offer data object associated with each resource set identifier for one or more third-party entities. Each average third-party offer data object may comprise and/or otherwise represent an average price characteristic, associated with a particular third-party entity, for the resource set identifier In some embodiments, one or more data sets are applied to the resource offer generation model to generate the resource offer set. For example, in some embodiments, the maximum third-party offer data object set, the average third-party offer data object set, the fair market offer set, the benchmark and portfolio target data set, and/or one or more resource offer generation input data sets. The various applied data sets may be applied such that he resource offer generation model may generate the resource offer set comprising one or more resource offer data objects associated with a price characteristic, such as a resource offer value, such that the resource offer set satisfies the benchmark and portfolio target data set.

The resource offer generation model may generate an optimal resource offer set based on the various applied data sets. For example, the resource offer set may be generated to optimally satisfy the benchmark and portfolio target data set. In this regard, the resource generation model may be configured to utilize one or more algorithms, statistical models, and/or machine learning models for generating the resource offer set. In some embodiments, the resource offer generation model may utilize an expected resource volume data set and/or an average distribution term data set to generate a resource offer set. For example, in some embodiments, the resource offer generation model comprises at least a linear optimization model configured to, based on the various input data sets, generate the resource offer set to optimally satisfy the benchmark and portfolio target data set. For example, based on the expected channel profile allocations and price characteristic for the resource set identifiers to be distributed (e.g., as identified in an input expected resource volume data set and an average distribution term data set), the resource offer generation model may generate the resource offer set to maximize satisfaction of the benchmark and portfolio target data set. For example, in some embodiments, the benchmark and portfolio target data set may only include a minimum resource margin for resource offer data objects in the generated resource offer set. In other embodiments, the benchmark and portfolio target data set may include boundary conditions for the acquisition and distribution of specific resources, for example by maximizing the price characteristic of resource offer data objects associated with a subset of resources (e.g., resources associated with a particular resource set identifier). It should be appreciated that the benchmark and portfolio target data set may serve as any number of boundary conditions and any type of boundary conditions for optimizing the resource offer set, for example a minimum profit for the resource offer data set, a desired margin per resource, a minimum profit based on maximizing resource offer data objects associated with a particular subset of resources (e.g., resources associated with a promotion), distribution channel profile mixes, and/or other financial analysis targets.

In some embodiments, some or all of the resource offer generation model is maintained and performed via a sub-server and/or second server managed by, and/or otherwise associated with the resource offer generation system 1003. For example, a second server communicable and/or controlled by the resource offer generation system 1003 may be maintained to generate the resource offer set and/or optimize the resource offer set. The server managing the resource offer generation model may be configured for using to implement the model using any number of a myriad of programming implementations. For example, in some embodiments, the resource offer generation model may be configured using the R programming language, where the second or sub-server is configured with an environment for interfacing with the model.

The resource offer generation system 1003 may initiate the resource offer generation model, or one or more operations performed by the resource offer generation model, on the second or sub-server via one or more APIs and/or services for communicating with the second or sub-server. In some embodiments, the resource offer generation system 1003 may transmit one or more requests to initiate and/or apply one or more of the input data sets to the resource offer generation model on the second or sub-server. For example, in some embodiments, the resource offer generation system 1003 manages a database environment, such as a SQL environment for managing various data warehouse modules comprising the input data sets, and uses one or more SQL server integration services (SSIS) for pushing resource offer generation input data sets and/or generated data sets to the second or sub-server for applying to the resource offer generation model. Upon output of the resource offer by the resource offer generation model, the generated resource offer set (or corresponding data) may be pushed back from the second or sub-server, for example to the resource offer generation system 1003, for storage in the database environment (e.g., such as an SQL environment) using one or more APIs and/or services, such as the one or more SSIS associated with the SQL environment.

In some embodiments, the resource offer generation system 1003 directly controls and/or accesses the resource offer generation model to generate the resource offer set. For example, the resource offer generation system 1003 may perform all operations described with respect to the above steps on the same system (e.g., server or group of servers) as opposed to an separate system.

In some embodiments, the generated resource offer set is stored associated with an offer status record for the region-program identifier and collection period data object. Additionally or alternatively, the offer status indicator included in, or associated with, the offer status record may be updated to embody or represent a pending adjustment status indicator. For example, the offer status record may be retrieved, from an offer approval repository maintained or otherwise accessible to the resource offer generation system 1003 by querying the offer approval repository based on the region-program identifier and collection period data object, and receiving the offer status record as result data.

At step 1036, the resource offer generation system 1003 notifies the offer control user that the resource offer generation model has completed generation and/or optimization of the resource offer set, and pushed the generated resource offer set to the database for retrieval. In some embodiments, a notification may be transmitted associated with the user account of the offer control user utilized to access the resource offer generation system 1003 and perform the resource offer generation process. In some embodiments, the offer control user may be notified via an application, interface, or other service associated with the resource offer generation system 1003. In other embodiments, the offer control user may be notified via a third-party application, interface, or other services, such as via an email transmitted to an email account associated with the offer control user (e.g., an email associated with the user account associated with the offer control user).

FIG. 11 illustrates an example data flow diagram 1100 for rendering a resource offer set, adjusting the resource offer set, submitting the adjusted resource offer set for approval, and approving or rejecting the adjusted resource offer set. These operations are performed via a plurality of specific interfaces corresponding to, and configured for, enabling such operations. The data flow diagram 1100 includes data flow steps between components, such as of an sub-systems of the system 800, including client device 1001, resource offer generation system 1003, and approval device 1005. The data flow diagram 1100 may be performed after some or all of the steps described with respect to data flow diagram 1000 above.

In data flow 1100, several steps illustrated may be optional. Optional steps are illustrated in FIGS. 10 and 11 in broken lines. In some embodiments, one or more of the optional steps may be performed. In some embodiments, all optional steps may be performed.

At step 1102, the offer control user may access the resource offer generation system, such as resource offer generation system 1003. The offer control user may access the resource offer generation system 1003 the client device 1001, or another of a plurality of client devices. Upon re-accessing the resource offer generation system 1003, the offer control user may re-authenticate and/or otherwise begin a new authenticated session, or continue an existing authenticated session.

At step 1104, the resource offer generation system 1103 generates, and/or transmits, a control signal causing a renderable object comprising an offer adjustment interface displayed at one or more client devices, such as the client device 1001. In some embodiments, the control signal(s) may be transmitted to a second client device accessed by the offer control user associated with the client device 1001 (e.g., a second computer or mobile device with which the offer control user accessed the resource offer generation system 1003 and began an authenticated session). The offer adjustment interface comprises an indication of the resource offer set. For example, the offer adjustment interface may comprise the resource offer value for one or more resource offer data objects in the resource offer set (e.g., a portion of the resource offer set may be visible). In some embodiments, the resource offer set is retrieved from a storage or database. For example, the resource offer set may be the generated and/or optimized resource offer set from an earlier step, which was stored associated with the region-program identifier.

The offer adjustment interface may be configured to enable adjustment of resource offer set. For example, the offer adjustment interface may be configured to enable the offer control user to adjust the resource offer value associated with each resource offer data object in the resource offer set. In some embodiments, the offer control user may select a resource offer data object for adjusting, and input, via user engagement for example, an adjusted resource offer value for said selected resource offer data object. After adjusting a resource offer data object, the offer control user may continue to adjust other resource offer data objects, or adjust the same resource offer data object again. The offer adjustment interface may be dynamically rendered to reflect updates based on the adjustments performed by the offer control user.

The control signal causes rendering, to at least the client device 1001, of the offer adjustment interface including at least the indication of the resource offer set. In some embodiments, the offer adjustment interface further comprises an indication of data from the resource offer generation input data sets, or data derived therefrom. For example, in some embodiments, the offer adjustment interface comprises market intelligence data, or representations of the market intelligence data, for each resource offer data object in the resource offer set. For example, the market intelligence data rendered to the offer adjustment interface may include one or more third-party offers, such as competitor offers. The offer adjustment interface may further comprise an indication of an offer analytics data set associated with the resource offer set. For example, the offer analytics data set may include expected profit-per-resource, resource margin information, and/or summary information regarding the resource offer set (e.g., number of resources associated with a resource offer data object currently associated with a resource offer value). In some embodiments, the resource offer generation system 1103 may calculate, or otherwise determine, the offer analytics data set based on the resource offer set and one or more resource offer generation input data sets, such as the market intelligence data set. Alternatively, the resource offer generation model and/or exception detection model may be configured to generate the offer analytics data set associated with the resource offer set.

In some embodiments, the offer adjustment interface additionally comprises a dashboard for accessing and/or rendering various separate analysis interfaces for analyzing the resource offer set, and any adjustments. One or more of the analysis interfaces may provide indications of data for analyzing the adjusted resource offer set with regard to one or more third-party offers. For example, the analysis interfaces may provide data derived based on the currently adjusted resource offer data set and one or more portions of the resource offer generation input data sets.

At step 1106, the client device 1001 renders the offer adjustment interface. The offer adjustment interface may be rendered such that the offer control user can view the offer data objects associated with various resources. The offer adjustment interface may be configured to enable adjustment of each of the resource offer data objects in the resource offer set, for example in response to user engagement with the offer adjustment interface to change the offer value.

At step 1108, client device 1001, and/or the offer control user via the client device 1001, may analyze the rendered resource offer set. In some embodiments, the offer control user may view the resource offer values associated with each offer data object in the resource offer set. The offer control user may, additionally or alternatively, analyze one or more indications of an offer analytics data set rendered via the offer adjustment interface. For example, the price adjustment interface may comprise a dashboard for accessing various analysis interfaces, such as the interfaces illustrated by FIGS. 14 and 15, and an indication of an offer analytics data set which may be analyzed to determine whether to adjust the resource offer values for one or more resource offer data objects in the resource offer set. In some embodiments, the client device 1001 may be configured to analyze the resource offer set automatically. For example, the client device 1001 may be configured to perform one or more analysis algorithms based on the resource offer set and/or offer analytics data set to determine whether one or more of the resource offer data objects should be adjusted.

At step 1110, client device 1001, and/or the offer control user via the client device 1001, may adjust the resource offer set. In some embodiments, the offer control user may adjust the resource offer value for one or more resource offer data objects. For example, the offer control user may, via user engagement with the price adjustment interface, input an adjusted resource offer value for one or more resource offer data objects. The adjustments to the resource offer set may be performed based on the analysis of the information rendered to the offer adjustment interface.

In some embodiments, the offer control user may, via the client device 1001, save adjustments to the resource offer generation system 1003 after adjusting at least one resource offer data object. For example, the offer adjustment interface may include an offer saving component configured to, in response to user engagement, generate and/or transmit one or more control signals to the resource offer generation system 1003, the control signal(s) comprising at least one adjustment data object for each adjusted resource offer data object. The resource offer generation system 1003 may then update the stored resource offer set based on the received adjustment data objects to create an new adjusted offer set. In other embodiments, one or more control signal(s) are generated and/or transmitted automatically in response to input, by an offer control user, for adjusting a resource offer data object, for example in response to input of an adjusted resource offer value for a particular resource offer data object.

In some embodiments, the stored resource offer set to be updated is retrieved associated with the region-program identifier and collection period data object. For example, the stored resource offer set may be retrieved from an offer approval repository and associated with a corresponding offer status record, based on the region-program identifier and collection period data object, from another repository or sub-repository. If no adjustments have been saved previously, the stored resource offer set may be the resource offer set generated by the resource offer generation model. Alternatively, if one or more adjustments have been saved, the stored resource offer set may be an adjusted resource offer set created based on one or more previously saved adjustment data objects.

The created new adjusted resource offer set may then be stored, for example associated with the region-program identifier and the collection period data object, to replace the previously stored resource offer set. The new adjusted resource offer set may be retrieved and updated when subsequent updates are performed by an offer control user.

In some embodiments, components of the offer adjustment interface may be dynamically updated in response to the adjustment(s). For example, the adjusted resource offer set may include one or more offer resource data objects associated with an adjusted offer value, which may be dynamically updated via the offer adjustment interface. Additionally, an offer analytics data set may be recalculated or determined, and an indication of the offer analytics data set may be updated to render the updated offer analytics data set to the interface. For example, one or more offer analysis algorithms for determining, identifying, or otherwise calculating an offer analytics data set may be performed upon adjustment of one or more of the resource offer data objects, and an indication of the offer analytics data set rendered to the offer adjustment interface may be updated dynamically, in real-time, to reflect the output from said algorithm(s). In some embodiments, one or more analysis interfaces accessible via a rendered dashboard may be dynamically updated upon adjustment of one or more of the resource offer data objects. Dynamically updating rendering of the offer adjustment interface enables the offer control user to immediately visualize the effects of adjusting one or more offer data object(s), and continue to adjust the resource offer set in real-time.

At step 1112, client device 1001 submits completion of the adjusted resource offer set. In some embodiments, the client device 1001 generates and/or transmits a completion control signal to the resource offer generation system 1003 indicating that the adjusted resource offer set is finalized to submit for approval from an offer approval user. In other embodiments, the completion control signal comprises one or more adjustment data objects for updating the resource offer data set to create the adjusted resource offer set. In other embodiments, the completion control signal comprises the adjusted resource offer set itself, for example created by the user device 1001. The adjusted resource offer set may reflect all the adjustments made to resource offer data objects in the resource offer set. In some embodiments, the offer adjustment interface additionally comprises an interface component, such as an offer submitting component, that the offer control user may engage to cause generation and/or transmission of the completion control signal.

At step 1114, resource offer generation system 1003 may receive the completion control signal from the user device 1001. In some embodiments, in response to the completion control signal, the resource offer generation system 1003 may update and/or store the adjusted resource offer set. In some embodiments, the resource offer generation system 1003 retrieves an offer status record associated with the region-program identifier and collection period data object, for example from an offer approval repository, and updates an associated offer status indicator to represent a pending approval status indicator. In some embodiments, the resource offer generation system 1003 creates the adjusted resource offer, for example by updating the previously stored resource offer set based on one or more adjustment data objects. Alternatively, in some embodiments, the resource offer set stored associated with the region-program identifier and collection period data object, for example in an offer approval repository or another repository, may updated based on an adjusted resource offer set parsed and/or extracted from the completion control signal.

At optional step 1116, resource offer generation module 1003 notifies an offer approval user that the adjusted resource offer set has been submitted and stored. In some embodiments, a notification may be transmitted associated with the user account of the offer approval user, such that the offer approval user may access retrieve the notification by accessing the resource offer generation system 1003. In some embodiments, the offer approval user may be notified via an application, interface, or other service associated with the resource offer generation system 1003. In other embodiments, the offer approval user may be notified via a third-party application, interface, or other services, such as via an email transmitted to an email account associated with the offer approval user (e.g., an email associated with the user account of the offer approval user).

At step 1118, an offer approval user accesses the resource offer generation system, such as resource offer generation system 1003. The offer approval user may access the resource generation system 1003 via an approval device 1005. The approval device may be a second client device in communication with the resource offer generation system 1003. For example, the second client device may be embodied by a second request source system 104. The approval device 1005 may be configured to execute an application, interface, web/browser application, or the like for accessing the resource offer generation system 1003. The application, interface, web/browser application, or the like, for accessing the resource offer generation system 1003 as an offer approval user may be different from the application, interface, web/browser application, or the like, for accessing the resource offer generation system 1003 as an offer control user. Alternatively, the application, interface, web/browser application, or the like for accessing the resource offer generation system 1003 may be the same for offer approval users and offer control users. An offer control user may be associated with a user account that has permissions for creating and/or editing region-program data objects, requesting resource offer generation, accessing an offer adjustment interface, and submitting adjustment offer sets.

An offer approval user may be associated with a user account that has permissions for accessing submitted adjusted resource offer sets, accessing corresponding offer adjustment interfaces, and responding to submitted adjusted resource offer sets (e.g., approving or rejecting submitted adjusted resource offer sets). For example, the resource offer generation system 1003 may provide, to the admin device 1005, one or more adjusted resource offer sets stored associated with one or more offer status records including, or associated with, a pending approval status indicator, where each adjusted resource offer set and offer status record is associated with a particular region-program identifier and collection period data object. The offer approval user may then select an adjusted resource offer set for a particular region-program identifier and collection period data object that the offer approval user would like to view, analyze, and/or approve or reject.

At step 1120, resource offer generation system 1003 may generate, and/or transmit, an approval request control signal causing a second renderable object comprising an approval interface displayed at another of one or more client devices, such as the approval device 1003. The approval request control signal may be generated and/or transmitted in response to selection of an adjusted resource offer set for a particular region-program identifier and collection period data object. The approval interface comprises an indication of the adjusted resource offer set. The adjusted resource offer set may be retrieved from a storage upon access by an offer approval user, for example via admin device 1003. For example, the offer approval user may select to view an adjusted resource offer set submitted associated with a particular region-program data object having a particular region-program identifier.

In some embodiments, the approval interface comprises additional indications of data. The approval interface may comprise the same indications of data rendered to the offer adjustment interface provided to an offer control user via client device 1001. For example, additionally or alternatively, the approval interface may further comprise an indication of data from the resource offer generation input data sets, or data derived therefrom. The approval interface, in some embodiments, further comprises market intelligence data, or representations of the market intelligence data, for each resource data object in the resource offer set. For example, the market intelligence data rendered to the approval interface may include one or more third-party offers, such as competitor offers. The approval interface may further comprise an indication of an offer analytics data set associated with the adjusted resource offer set. For example, the offer analytics data set may include expected profit-per-resource, resource margin information, summary information regarding the resource offer set, and/or the like. The offer analytics data set may be calculated, or otherwise determined, based on the submitted adjusted resource offer set and one or more resource offer generation input data sets, and thus not modifiable by the offer approval user.

Additionally, the approval interface may include the same dashboard rendered to the offer adjustment interface. Accordingly, in such embodiments, the approval interface enables the offer approval user to analyze the submitted adjusted resource offer set based on the same indications of data and visualizations used by the offer control user to perform adjustments on the adjusted resource offer set.

At step 1122, the admin device 1005, and/or the offer approval user via the admin device 1005, may analyze the adjusted resource offer set. In some embodiments, the offer approval user may view the resource offer values associated with each resource offer data object in the adjusted resource offer set. The offer approval user may, additionally or alternatively, analyze an indication of an offer analytics data set rendered via the approval interface. For example, the approval interface may include an indication of an offer analytics data set (e.g., margin, resource profit, offer summary data, or other financial target information), which may be analyzed to determine whether to accept or reject the adjusted resource offer set. Additionally or alternatively, the approval interface may comprise a dashboard, for accessing various analysis interfaces for analyzing the adjusted resource offer set, for example in view of a benchmark and portfolio target data set. For example, the analysis interfaces may include one or more interfaces for visualizing offer strength for the adjusted resource offer set, price trends associated with the adjusted resource offer set, market comparison associated with the adjusted resource offer set, and the like.

The offer approval user may, via the various interfaces and indications therein, analyze the adjusted resource offer set based on an identified, received, or offline benchmark and portfolio target data set. The benchmark and portfolio target data set may include one or more profitability, margin, or other financial targets for the region-program identifier associated with the adjusted resource offer set. In some embodiments, the approval device 1005 may be configured to analyze the adjusted resource offer set automatically. For example, the approval device 1005 may be configured to perform one or more offer approval algorithms based on the adjusted resource offer set and/or offer analytics data set to determine whether the adjusted resource offer set should be approved or rejected.

At step 1124, the offer approval user may, via the admin device 1005, engage the approval interface to approve or reject the adjusted resource offer set. For example, in some embodiments, the offer approval user may engage a first interface component for approving the resource offer set, or a second interface component for rejecting the resource offer set. The resource offer set may be approved or rejected based on the analysis performed at step 1122.

At step 1126, the admin device 1005 may determine whether the offer approval user approved the adjusted resource offer set or rejected the adjusted resource offer set. In some embodiments, the determination depends on the user interface component engaged by the offer approval user at step 1124. In other embodiments, an offer approval control signal is transmitted to the resource offer generation system 1003 at or after step 1124, and the determination is based on a control signal received from the resource offer generation system 1003 in response to the offer approval control signal.

Flow may continue to optional step 1128 in a circumstance where the offer approval user rejected the adjusted resource offer set. At optional step 1128, the admin device 1005, and/or the offer approval user via the admin device 1005, may create an offer rejection message associated with the adjusted resource offer set. In some embodiments, a user interface, or a user interface component, is rendered to enable the offer approval user to input and submit an offer message to create it. In some embodiments, the interface may provide one or more predetermined offer rejection messages, and/or an free-text input to enable input of a custom offer rejection message. The offer rejection message may be created after the offer approval user rejects, or indicates a desire to reject, the resource offer set, for example by engaging a user interface component for rejecting the resource offer set. The offer rejection message may reflect the analysis of the adjusted resource offer set and/or determination of the adjusted resource offer set, an explanation defining why the adjusted resource offer set is rejected, and/or adjustment steps to be performed to improve the adjusted resource offer set for approval. Alternatively, in some embodiments, the offer rejection message may be created, and/or created and submitted by an offer approval user before rejecting the adjusted resource offer set. In some embodiments, a user interface component is provided for submitting the rejection of the adjusted resource offer set and the offer rejection message.

The admin device 1005 may transmit an offer approval response to the resource offer generation system 1003 in response to submission of the approval or rejection. For example, an offer approval response may be generated and/or transmitted in response to the engagement with the approval interface to approve or reject the adjusted resource offer set, or in some embodiments in response to engagement with a user interface component for submitting the offer rejection message. The offer approval response may include at least an offer approval status indicating the approval or rejection of the adjusted resource offer set. In some embodiments, if the offer approval status is a rejection status (e.g., the offer approval user rejects the adjusted resource offer set), the offer approval response may additionally include the created offer rejection message, if the offer approval user created one.

At step 1130, the resource offer generation system 1003 may receive an offer approval control signal comprising at least an offer status indicator, where the offer status indicator is represented or otherwise embodied by a rejection status indicator. Additionally or alternatively, in some embodiments, the offer approval control signal may include the offer rejection message created by the offer approval user. Upon receiving the offer approval control signal, the resource offer generation system 1003 may parse the control signal to identify the offer status indicator.

The resource offer generation system 1003 may additionally store the adjusted resource offer set associated with the region-program identifier, collection period data object, and the offer status indicator (e.g., the rejected status indicator). In some embodiments, the resource offer generation system 1003 may update a corresponding offer status record in an offer approval repository, sub-repository, or table. For example, the resource offer generation system 1003 may update an offer status record associated with the adjusted resource offer set to include the rejection status indicator. For example, the resource offer generation system 1003 may retrieve an offer status record from a repository, such as an offer approval repository, based on the region-program identifier and collection period data object. The offer status indicator associated with, or included in, the offer status record may be updated based on the received and/or identified offer status indicator, for example to represent the rejected status indicator.

At step 1132, the resource offer generation system 1003 may provide a rejection notice to the offer control user. The resource offer generation system 1003 may generate, retrieve, and/or otherwise configure the rejection notice. The rejection notice may comprise the offer rejection message received from the offer approval user via the approval device 1005. The rejection notice may be stored associated with the user account for the offer control user, such that the offer control user may access the rejection notice upon subsequent access of the resource generation system via the user account.

The resource offer generation system 1103 may generate and/or configure one or more control signals for causing rendering of the rejection notice to the client device 1001. The control signal(s) may be generated or configured to include a renderable data object associated with, or including, the rejection notice. The control signal(s) may be transmitted to the client device 1001 to cause rendering of an interface, or an interface component, including the rejection notice. In some embodiments, the control signal(s) are transmitted after subsequent access of the resource offer generation system 1003 by an offer control user, such as via client device 1001 or another client device.

At step 1134, the offer control user may access the resource offer generation system, such as resource offer generation system 1003. The offer control user may access the resource offer generation system 1003 via a client device, such as client device 1001. The offer control user may again access the resource offer generation system 1003 via the client device 1001 after a period of time since submitting the adjusted resource offer set for approval. In some embodiments, the offer control user may not have ended an authenticated session associated with accessing the resource offer generation system since beginning the resource offer generation process or submitting the adjusted resource offer set for approval, and thus may re-access the resource offer generation system 1003 without subsequent authentication. In other embodiments, the offer control user may re-authenticate themselves via the client device 1001 to begin another authenticated session for accessing the resource offer generation system 1003.

At step 1136, the client device 1001 may render the rejection notice. In some embodiments, the rejection notice may be rendered to an interface associated with the region-program data identifier and the collection period data object, for example rendered to an interface where the offer control user may view each region-program data object and/or associated information, each collection period data object for which a resource offer generation has been imitated, an associated offer status indicator, and/or, when available, the rejection notice for one or more rejected adjusted resource offer sets for a particular region-program identifier and collection period data object (e.g., based on offer status records including, or associated with, a rejected status indicator.

The offer control user may then access the rejected adjusted resource offer set to make further adjustments to resubmit a newly adjusted resource offer set for approval. Flow may then return to step 1106, where an offer adjustment interface is rendered to the client device 1001 for accessing by the offer control user via the client device. The offer control user may engage the offer adjustment interface to adjust the adjusted resource offer set and resubmit for approval. In some embodiments, the cycle defined by steps 1106-1136 may be repeated once, twice, or more times until the adjusted approval by an offer approval user.

Returning to step 1126, flow may continue to step 1138 in a circumstance where the offer approval user rejected the adjusted resource offer set. At step 1138, the resource offer generation system 1003 may receive an offer approval control signal comprising at least an offer status indicator, where the offer status indicator is represented or otherwise embodied by an approved status indicator. Upon receiving the offer approval control signal, the resource offer generation system 1003 may parse the control signal to identify the offer status indicator.

The resource offer generation system 1003 may additionally store the adjusted resource offer set associated with the region-program identifier, collection period data object, and the offer status indicator (e.g., the approved status indicator). In some embodiments, the resource offer generation system 1003 may update a corresponding offer status record in an offer approval repository, sub-repository, or table. For example, the resource offer generation system 1003 may update an offer status record associated with the adjusted resource offer set to include the approved status indicator. For example, the resource offer generation system 1003 may retrieve an offer status record from a repository, such as an offer approval repository, based on the region-program identifier and collection period data object. The offer status indicator associated with, or included in, the offer status record may be updated based on the received and/or identified offer status indicator, for example to represent the approved status indicator.

At step 1140, upon updating the offer status record based on the approved status indicator, the resource offer generation system 1003 may generate and provide an approval notice to one or more users of the resource offer generation system 1003. In some embodiments, for example, the region-program identifier associated with the approved adjusted resource offer set may be similarly associated with one or more user accounts, such as the user account for the offer control user that submitted the adjusted resource offer set, a user account associated with an executive leader for the region-program data object, and/or one or more user accounts associated with sales or distribution users for the region-program data object. In some embodiments, the approval notice includes an indication of the approved status indicator and/or the adjusted resource offer set as approved.

The approval notice may be generated and/or transmitted in a myriad of ways. In some embodiments, the approval notice may be embodied by a message stored by the resource offer generation system 1003 and accessible via a client device during an authenticated session (e.g., via a messenger or notification system accessible via the resource offer generation system 1003). In other embodiments, the approval notice may be an email data object generated and/or transmitted by the resource offer generations system 1003 to one or more associated email services associated with one or more email recipients of the approval notice.

After step 1140 is completed, the adjusted resource offer set may be distributed, for example by the resource offer generation system 1003 and/or one or more of the notified users, to one or more entities, such as one or more third-party entities associated with various resource acquisition and/or distribution channels within the region associated with the region component of the region-program identifier. The adjusted resource offer set may then be utilized for resource acquisition within that region, for example by offering to acquire resources associated with a particular resource set identifier at a predefined price characteristic defined by the resource offer value for the resource offer data object in the adjusted resource offer set associated with the particular resource set identifier.

FIG. 12A is a flow chart of an example process 1200 for generating a resource offer set, adjusting the resource offer set, and receiving an offer approval status for the adjusted resource offer set, in accordance with some embodiments of the present disclosure. The operations illustrated with respect to example process 1200 may be performed by a resource offer generation system, for example embodied by the apparatus 900.

At optional block 1202, the apparatus 900 includes means, such as model performance circuitry 912, input/output circuitry 906, communications circuitry 908, processor 902, and/or the like, or a combination thereof, for receiving a region-program identifier and collection period data object. The region-program identifier may be received from a client device to initiate resource offer generation associated with the region-program data object having the region-program identifier. The collection period data object may be received from the client device, and comprise a collection period start date timestamp and a collection period end date timestamp.

At optional block 1204, the apparatus 900 includes means, such as data management circuitry 910, model performance circuitry 912, processor 902, and/or the like, or a combination thereof, for determining the region-program identifier and collection period data object are not associated with a pending resource offer generation process. In some embodiments, the apparatus may query a repository, such as an offer approval repository embodied by resource offer generation system database 802C, based on the region-program identifier and collection period data object. If an offer status record is retrieved, for example as response data to the query, a resource offer generation process has been initiated and/or completed for the region-program identifier and corresponding collection period. If a record is retrieved, a second resource offer generation process should not be initiated, and the flow may terminate.

At block 1206, the apparatus 900 includes means, such as data management circuitry 910, communications circuitry 908, processor 902, and/or the like, or a combination thereof, for retrieving at least one resource offer generation input data sets. In some embodiments the resource offer generation input data sets may be retrieved from a repository, for example by retrieving a base table linked to a plurality of data tables representing each resource offer generation input data set in a particular database. In some embodiments, the resource offer generation input data sets include a historical offer data set, a resource list data set, a market intelligence data set, a resource mapping data set, an expected resource volume data set, an average distribution term data set, and/or a projected receipts data set. The expected resource volume data set may comprise, or otherwise be derived from, a subset of a predicted channel and condition data set output by a prediction system. For example, the expected resource volume data set may comprise the predicted volume condition data from a predicted channel and condition data set output by the prediction system for various channel profiles. The average distribution term data set may comprise, or otherwise be derived from, a subset of the predicted channel and condition data set output by the prediction system. For example, the average distribution term data set may comprise the predicted pricing characteristic condition data from a predicted channel and condition data set output by the prediction system. In some embodiments, combinations of these various data sets are retrieved from one or more repositories and/or databases accessible by the apparatus 900 directly or accessible via communications with one or more other systems (e.g., through communication with a prediction system).

In some embodiments, in generating a resource offer set, the resource offer generation model may utilize a trusted resource characteristic data set generated by an exception detection model. In one such example, the trusted resource characteristic data set may include a characteristic associated with the acquisition and/or distribution of resources, for example the acquisition and distribution of used mobile phones. A non-limiting example may include generating trusted pricing characteristics for resource set identifiers, in a fair market offer set, based on one or more untrusted third-party resource pricing data sets and one or more distributed resource pricing data set(s). In this regard, at block 1212, the apparatus 900 includes means, such as model performance circuitry 912, processor 902, and/or the like, or a combination thereof, for generating a fair market offer set using an exception detection model. It should be appreciated that, in some embodiments, the fair market offer set may not be generated.

Using acquisition of used mobile devices as an example, the one or more untrusted third-party resource pricing data sets and distributed resource pricing data sets may be applied to the exception detection model to generated a trusted resource characteristic data set, for example the fair market offer set. The fair market offer set may include a fair market offer data object for various resource set identifiers, each fair market offer data object having a pricing characteristic (e.g., a fair market offer value) for each of the resource set identifiers. For example, each third-party resource pricing data set may be associated with a particular third-party entity, for example a competitor entity, and include records for an average price characteristic for each resource set identifier offered by the third-party entity set over a particular time interval (e.g., a weekly pricing value at which the third-party entity will purchase and/or distribute the resource set identifier). The distributed resource pricing data set may include an average offer value for each resource set identifier offered by a user via a distributed user platform (e.g., a weekly value at which the resource associated with the resource set identifier can be purchased from an individual user via the distributed user platform). The exception detection model may generate the trusted resource characteristic data set embodied by the fair market offer set via the process described below with respect to FIG. 12B.

At block 1214, the apparatus 900 includes means, such as data management circuitry 910, model performance circuitry 912, communications circuitry 908, processor 902, and/or the like, or a combination thereof, for receiving a benchmark and portfolio target data set. The benchmark and portfolio target data set may be received from a client device, for example in response to user input and submission by an offer control user, or received from an approval device, for example in response to input a submission by an offer approval user. Alternatively, in some embodiments, the benchmark and portfolio target data set may be retrieved from a database, such as resource offer generation system database 802C.

In some embodiments, the benchmark and portfolio target data set may include one or more data collection parameter values for various data collection parameters. In some embodiments, additionally or alternatively, the benchmark and portfolio target data set includes default values associated with the region-program data object having the region-program identifier input at an earlier block. The benchmark and portfolio target data set may, for example, include various data objects representing boundary conditions for use in generating the resource offer set. For example, in one example context of used mobile device acquisition and distribution, the benchmark and portfolio target data set may include portfolio level financial targets such that the resource offer set is generated such that the resource offer values for the various resource offer data objects satisfy the boundary conditions represented by the benchmark and portfolio target data set.

At block 1216, the apparatus 900 includes means, such as data management circuitry 910, model performance circuitry 912, processor 902, and/or the like, or a combination thereof, for generating a resource offer set using a resource offer generation model. In some embodiments, the resource offer set is generated by applying at least one or more of the resource offer generation input data sets to the resource offer generation model. Additionally or alternatively, the benchmark and portfolio target data set may be applied to the resource offer generation model, for example such that the generated resource offer set must satisfy the applied benchmark and portfolio target data set. The resource offer set may include a resource offer data object associated with one or more resources to be acquired associated with the region-program data object. The resource offer value for said resource offer data objects may represent a price at which a particular resource is to be offered for acquisition from a resource owner through one or more device acquisition channel profiles. In some embodiments, the resource offer generation model comprises an algorithmic model configured to use the applied data sets to generate an output. In other embodiments, the resource offer generation model comprises one or more configured and trained machine learning models to use the applied data sets to generate an output.

In some embodiments, the resource offer generation model may comprise one or more algorithms and/or machine learning models for optimizing resource offer data objects for various resource set identifiers to generate the optimal resource offer set to satisfy the benchmark and portfolio target data set. The benchmark and portfolio target data set may serve as boundary conditions for optimizing the generated resource offer set. For example, in some embodiments, the benchmark and portfolio target data set may include a minimum profit, margin or profit per resource, and/or other financial analysis targets. The resource offer generation model may comprise a linear optimization model configured to maximize the resource offer set according to the benchmark and portfolio target data set. In some embodiments, the linear optimization model may be embodied by, or configured to execute, on a second apparatus, system, or server. Accordingly, the apparatus 900 may include means to transmit an optimization request to the server, for example via one or more APIs, and receive the optimized resource offer set in response.

Using acquisition of used mobile devices as another example, the resource offer set may comprise resource data objects having price characteristics for various resource set identifiers generated to optimally satisfy an applied benchmark and portfolio target data set. The resource offer generation model may, for example, generate device offer values for various user mobile devices associated with various resource set identifiers, for example a CNN, such that the overall device offer set for all devices satisfies the user input values and/or default values for the parameters associated with the benchmark and portfolio target data set (e.g., a desired profit margin, channel profile mix, device resource set identifiers or CNNs offered as promotions, and the like). The resource offer generation model may consider the efficient resource allocation to one or more channel profiles and/or corresponding predicted price characteristic associated with the distribution of a particular resource set identifier, for example generated by a prediction system, to generate optimal resource offer data objects for the various resource set identifiers.

The resource offer generation model may utilize one or more other data sets applied, for example one or more other resource offer generation input data sets (such as an offer history data set and/or market intelligence data set) and/or one or more data sets derived by an exception detection model, to identify price characteristic targets to attempt to exceed in generating the resource offer data objects included in the resource offer set while satisfying boundary conditions represented by the benchmark and portfolio target data set. For example, in some embodiments, the resource offer generation model may perform one or more algorithms, machine learning models, or the like, to first attempt to generate the resource offer set to include resource offer data objects associated with a price characteristic (e.g., a resource offer value) that satisfies, such as by exceeding, a maximum price characteristic for each resource set identifier, or one or more promotional resource set identifier. If the resource offer generation model determines the resource offer set cannot be generated to satisfy the maximum price characteristic for each resource set identifier, or one or more promotional resource set identifiers, the resource offer generation model may second attempt to generate the resource offer set to include resource offer data objects associated with a price characteristic that satisfies, such as by exceeding, an average price characteristic for each resource set identifier, or the one or more promotional resource set identifier. If the resource offer generation model determines the resource offer set cannot be generated to satisfy the average price characteristic for each resource set identifier, or the one or more promotional resource set identifier, the resource offer generation model may third attempt to generate the resource offer set to include resource offer data objects associated with a price characteristic that satisfies, such as by exceeding, a price characteristic for the resource set identifier associated with the fair market offer set.

At block 1218, the apparatus 900 includes means, such as data management circuitry 910, model performance circuitry 912, processor 902, and/or the like, or a combination thereof, for generating a control signal causing a renderable object comprising an offer adjustment interface displayed at a first of one or more client devices. The client device may be a particular client device associated with an offer control user authenticated with the apparatus 900 for an authenticated session. The control signal may cause rendering of the offer adjustment interface.

The offer adjustment interface may include each resource offer value for each resource offer data object in the resource offer set. The offer adjustment interface may, additionally, include an indication of an offer analytics data set, such as portfolio level financial values based on the adjusted resource offer set and market intelligence data. Further in some embodiments, the offer adjustment interface comprises dashboard for accessing one or more analysis interfaces, each analysis information comprising one or more indication(s) of data based on, or derived from, the resource offer set and/or various portions of market intelligence data. The apparatus may cause rendering of the offer adjustment interface by transmitting a renderable data object embodying the offer adjustment interface.

At block 1220, the apparatus 900 includes means, such as data management circuitry 910, communications circuitry 908, processor 902, and/or the like, or a combination thereof, for updating the resource offer set to an adjusted resource offer set. The adjusted resource offer set may include one or more resource offer data objects having adjusted offer values input by the offer control user.

In some embodiments, the apparatus 900 may receive one or more control signals from one or more client devices, the control signals including one or more adjustment data objects for use in updating the resource offer set. The resource offer set may be updated based on the one or more adjustment data objects to create the adjusted resource offer set. For example, the one or more adjustment data objects may embody, represent, or otherwise include one or more adjusted resource offer values for one or more resource offer data objects in the resource offer set.

In other embodiments, the adjusted resource offer set may be received from a client device. For example, a client device may update the resource offer set to create the adjusted resource offer set based on one or more adjustment data objects, where the apparatus 900 may receive the adjusted resource offer set from the client device after saving, and/or saving and submission, of the adjusted resource offer set by an offer control user via the client device.

At block 1222, the apparatus 900 includes means, such as communications circuitry 908, input/output circuitry 906, processor 902, and/or the like, for generating a control signal, or multiple control signals, causing a renderable object comprising an approval interface displayed at a second of the one or more client devices. The second of the one or more client devices may be an approval device associated with an offer approval user authenticated with the apparatus 900 for an authenticated session. The control signal(s) may be transmitted, for example over a network, to cause rendering of the approval interface.

The approval interface may include the adjusted resource offer set submitted received from the client device associated with the offer control user, and/or additional information (such as a dashboard) for analyzing the adjusted resource offer set. For example, the approval interface may additionally include an indication of an offer analytics data set calculated and/or otherwise determined based on the adjusted resource offer set. Additionally or alternatively, in some embodiments, the approval interface may include a dashboard for accessing one or more analysis interfaces based on the adjusted resource offer set. In some embodiments, the dashboard and indication(s) of the offer analytics data set of the approval interface may comprise the same elements rendered to the offer adjustment interface. The apparatus may cause rendering to an approval device upon access of the apparatus by an offer approval user via the approval device.

At block 1224, the apparatus 900 includes means, such as communications circuitry 908, processor 902, and/or the like, or a combination thereof, for receiving, from the approval device, an offer approval control signal comprising an offer status indicator. The offer approval control signal may be received from the approval device in response to user engagement with the approval interface. The offer status indicator may represent an approved status indicator (for example, when the offer approval user analyzes and/or approves the adjusted resource offer set) or a rejection status indicator (for example, when the offer approval user analyzes and/or rejects the adjusted resource offer set). The offer status indicator may be received in response to user engagement with the approval interface, for example in response to user engagement with an offer approval component or an offer rejection component of the approval interface.

At block 1226, the apparatus 900 includes means, such as data management circuitry 910, communications circuitry 908, processor 902, and/or the like, or a combination thereof, for storing the adjusted resource offer set associated with the region-program identifier, the collection period data object, and the offer status indicator. In some embodiments, the apparatus may store the adjusted resource offer set and/or the offer approval status associated with the adjusted resource offer set such that each is retrievable using the region-program identifier and collection period data object. The apparatus may store the adjusted resource offer set and/or offer approval status in a database, for example embodied by the resource offer generation system database 802C.

If the offer approval status is an approved status, the flow may end. If the offer approval status is a rejection status, the flow may return to block 1218 for adjustment by the offer control user via the client device. This cycle may continue until the offer control user an approved status is received for an adjusted resource offer set. The accepted resource offer set may be used to provide one or more offers to various third-party entities for purchase of such resources.

FIG. 12B illustrates a flow chart of an example process 1200B for generating a trusted resource characteristic data set based on applying one or more untrusted third-party resource characteristic data sets, and one or more characteristic data objects from a distributed user platform, to an exception detection model in accordance with some embodiments of the present disclosure. The operations illustrated with respect to example process 1200 may be performed by a resource offer generation system, for example embodied by the apparatus 900.

One non-limiting example use case for generating a trusted resource characteristic data set based on one or more untrusted third-party resource data sets and a distributed resource characteristic data set is for generating a fair market offer set for the acquisition of used mobile devices. Each untrusted third-party resource characteristic data set may include price characteristics for various used mobile devices associated with various resource set identifiers, where each untrusted third-party resource characteristic data set is associated with be associated with a different third-party entity. The untrusted third-party resource characteristic data set may include historical prices at which the third-party entity will purchase used mobile devices for various resource set identifiers. However, the untrusted third-party resource characteristic data set is not trustworthy as a fair price characteristic for each resource, as the price characteristic may be associated with an exception period (e.g., where third-party entity may offer a promotion such that prices for particular used mobile devices are elevated despite decreasing value of the device).

In this regard, a distributed resource characteristic data set is not affected by promotions because the price characteristics are for offers for resource acquisition and/or distribution by individual users of a distributed user platform. Unlike third-party entities that are commercial resellers, individuals do not apply exception periods (such as promotional periods for certain resources) to pricing characteristics for various resources. However, the distributed resource characteristic data set is not accurate for purposes of generating a fair market offer set, as trusted sellers of used mobile devices generally receive a higher price for a particular resource. Generating a trusted resource characteristic data set via an exception detection model removes the deficiencies of trusting either data set associated with the one or more third-party entity/entities and associated with the distributed resource characteristic data set.

At block 1252, the apparatus 900 includes means, such as data management circuitry 910, communications circuitry 908, processor 902, and/or the like, or a combination thereof, for retrieving an untrusted third-party resource characteristic data set. The untrusted third-party resource characteristic data set may include one or more records associated with one or more third-party offerings of a resource by a third-party entity. For example, in some embodiments, the untrusted third-party resource characteristic data set comprises a third-party resource pricing data set. The third-party resource pricing data set may include one or more records, each including or otherwise associated with an offer price, resource set identifier, and/or timestamp. Each record may represent an offer price for a particular resource set identifier offered by a third-party entity on a particular date. In some embodiments, the resources may be used mobile devices.

In some embodiments, the untrusted third-party characteristic data set may be scraped, for example from one or more web services accessible via communications with a third-party device, such as a server, associated with the third-party entity. The apparatus 900 may include means to perform the scraping, and/or be associated with one or more systems for performing the scraping, and retrieve the untrusted third-party characteristic data set from a repository updated upon completion of the scraping. In some embodiments, the untrusted third-party resource characteristic data set may be retrieved from a third-party device associated with the third-party entity. For example, via one or more APIs, the apparatus 900 may communicate with a server and/or accessible repository associated with the third-party entity to retrieve the untrusted third-party resource characteristic data set. In other embodiments, the untrusted third-party resource characteristic data set may be retrieved from a third-party device associated with a different third-party entity, for example a data aggregator.

At block 1254, the apparatus 900 includes means, such as data management circuitry 910, communications circuitry 908, processor 902, and/or the like, or a combination thereof, for retrieving a distributed resource characteristic data set associated with a distributed user platform. The distributed resource characteristic data set may include one or more records associated with one or more distributed user generated offerings of a resource provided via a distributed user platform. In some embodiments, a distributed user platform may be enable users to offer to buy and/or sell resources, at any price desired by the user, to other users of the distributed user platform. Examples include, but are not limited to, the distributed user platforms of eBay™, Craigslist®, Amazon Marketplace™, Facebook Marketplace™, or the like. Each record may represent prices for used mobile devices offered by a user on a particular date via a particular distributed user platform. Each record may include, or otherwise be associated with, for example, an offer price, resource set identifier, and/or timestamp.

In some embodiments, the distributed resource data set may be scraped, for example from one or more web services accessible via communications with a device associated with the distributed user platform, such as a server. The apparatus 900 may include means to perform the scraping, and/or be associated with one or more systems for performing the scraping, and retrieve the distributed resource characteristic data set from a repository updated upon completion of the scraping. In some embodiments, the distributed resource characteristic data set may be retrieved from a device associated with the distributed user platform. For example, via one or more APIs, the apparatus 900 may communicate with a server and/or accessible repository associated with the distributed user platform to retrieve the distributed resource characteristic data set. In other embodiments, the distributed resource characteristic data set may be retrieved from a device associated with a different third-party entity, for example a data aggregator.

The apparatus may generate a trusted resource characteristic data set by applying at least the untrusted third-party resource characteristic data set (or multiple untrusted third-party resource characteristic data sets) and the distributed resource characteristic data set to an exception detection model. The exception detection model may be designed, configured, and/or trained to detect outliers and/or other exceptions associated with a particular characteristic or characteristics. The exception detection model may, in some embodiments, be embodied by one or more algorithms or machine learning models. In this regard, applying at least the untrusted third-party resource characteristic data set and distributed resource characteristic data set to the exception detection model may comprise one or more of the blocks 1256-1278.

At block 1256, the apparatus 900 includes means, such as model performance circuitry 912, processor 902, and/or the like, or a combination thereof, for integrating the untrusted third-party resource characteristic data set and the distributed resource characteristic data set. Integrating the untrusted third-party resource characteristic data set and the distributed resource characteristic data set may comprise one or more pre-processing steps for aligning, organizing, and/or otherwise constructing the data sets for comparison.

In some embodiments, the untrusted third-party resource characteristic data set and the distributed resource characteristic data set are aligned based on a temporal alignment. Using a third-party resource pricing data set as an untrusted third-party resource characteristic data set and a distributed resource pricing data set as the distributed resource characteristic data set, for example, the third-party resource pricing data set may include, at least, a plurality records that each include a resource price offered by the third-party and an associated timestamp (e.g., representing the date on which the price was offered by the third-party). Similarly, the distributed resource pricing data set may include a plurality of records that each include, at least, a resource price offered via a distributed user platform and an associated timestamp (e.g., representing the date on which the price was offered via the distributed user platform). An example temporal alignment may align the third-party resource pricing data set and the distributed resource pricing data set based on the timestamps for each record, for example such that records associated with the same date may be compared.

In some embodiments, the untrusted third-party resource characteristic data set and the distributed resource characteristic data set are aligned based on a temporal alignment and a resource set identifier alignment. Continuing the example of the third-party resource pricing data set and the distributed resource pricing data set, each record in the third-party resource pricing data set and the distributed resource pricing data set may also include, or otherwise be associated with, a particular resource set identifier. Based on the resource set identifier in or associated with each record, the untrusted third-party resource data set and the distributed resource pricing data set may be aligned such that records associated with the same date and the same resource set identifier may be compared.

At block 1258, the apparatus 900 includes means, such as model performance circuitry 912, processor 902, and/or the like, or a combination thereof, for identifying an offset between the untrusted third-party resource characteristic data set and the distributed resource characteristic data set. In some embodiments, the apparatus includes means for comparing a first characteristic of a first resource in the untrusted third-party resource characteristic data set with the first characteristic of the first resource in the distributed resource characteristic data set from the distributed user platform to identify the offset. In some embodiments, the first characteristic may be a resource price, for example where the untrusted third-party resource data set comprises a third-party resource pricing data set and the distributed resource characteristic data set comprises a distributed resource pricing data set. In some such embodiments, the offset may represent a difference in price for a particular resource set identifier for a given time interval (e.g., for each day, each week, and the like) between the untrusted third-party resource characteristic data set and the distributed resource characteristic data set.

At block 1260, the apparatus 900 includes means, such as model performance circuitry 912, processor 902, and/or the like, or a combination thereof, for identifying an exception period set, comprising at least one exception period in the untrusted third-party resource characteristic data set, based upon a deviation in the offset. For example, the deviation may be a change in the offset from an expected, determined, or average level. In some embodiments, for example, each exception period may represent a time interval during which a particular resource set identifier is offered by the third-party entity at an elevated price (e.g., a promotional price). In this regard, each exception period may be defined by a first timestamp (e.g., an interval start timestamp) and a second timestamp (e.g., an interval end timestamp), where the exception period is flagged for all records associated with intermediate timestamps between the first and second timestamps.

In some embodiments, an exception period may be identified when the deviation in the offset satisfies an exception deviation threshold. In some embodiments, the apparatus 900 may identify, determine, retrieve, or otherwise be associated with the exception deviation threshold. In some embodiments, for example, the apparatus 900 may include means for identifying a first timestamp at which the deviation of the offset satisfies the exception deviation threshold. For example, in some embodiments, the deviation of the offset satisfies the exception deviation threshold when the deviation is greater than, or greater than or equal to, the exception deviation threshold. Using a price characteristic as an example, the exception deviation threshold may be satisfied when the deviation in the offset is above a certain value or percentage, and is due to the resource price associated with the untrusted third-party resource characteristic data set being above a set amount or a set percentage greater than the resource price associated with the distributed resource characteristic data set. The apparatus 900 may include means for identifying a second timestamp at which the deviation of the offset does not satisfy the exception deviation threshold. In some embodiments, for example, the deviation may be a desired standard deviation amount from an expected or average deviation based on historical pricing characteristics over a predetermined non-exception time interval (e.g., 15 weeks, not including exception periods).

Additionally, for example in some embodiments, the deviation of the offset does not satisfy the exception deviation threshold when the deviation is less than, or less than or equal to, the exception deviation threshold. Returning to the price characteristic as an example, the exception deviation threshold may not be satisfied when the deviation in the offset returns to, or falls below, a certain value or percentage, such as when the resource price associated with the untrusted third-party resource characteristic data set returns to a standard operating range from the resource price associated with the distributed characteristic data set. The price characteristic returning to within the standard operating range indicates the end an exception period, for example a promotional period.

At block 1262, the apparatus 900 includes means, such as model performance circuitry 912, processor 902, and/or the like, or a combination thereof, for removing the at least one exception period from the untrusted third-party resource characteristic data set to generate an updated untrusted third-party resource characteristic data set. In some embodiments, removing the untrusted third-party resource characteristic data set comprises marking each record associated with the exception period as an exception, such that these records may be ignored. By marking the exception periods, the untrusted third-party resource characteristic data set may be used for data analysis, for example by rendering indications of the untrusted third-party resource characteristic data set to one or more interfaces provided to an offer control user and/or offer approval user. In other embodiments, the records associated with the exception period may be deleted from the untrusted third-party resource characteristic data set.

At block 1264, the apparatus 900 includes means, such as model performance circuitry 912, processor 902, and/or the like, or a combination thereof, for generating the trusted resource characteristic data set based on at least the updated untrusted third-party resource characteristic data set. In some embodiments, for example, the trusted resource characteristic data set may comprise the updated untrusted third-party resource characteristic set. In other embodiments, the trusted resource characteristic data set may comprise at least an average resource price characteristic for a given resource set identifier by averaging the remaining price characteristic for each record associated with the resource set identifier. The trusted resource characteristic data set may include, for example, a maximum and/or average price characteristic for various resources or resource set identifiers associated with offers by the third-party entity associated with the updated untrusted third-party resource characteristic data set.

In some embodiments, multiple untrusted third-party resource characteristic data sets may be updated and compared, such that generating the trusted resource characteristic data set is based on the comparison of the multiple untrusted third-party resource characteristic data sets. In this regard, at block 1266, the apparatus 900 includes means, such as data management circuitry 910, communications circuitry 908, processor 902, and/or the like, or a combination thereof, for retrieving a second untrusted third-party resource characteristic data set. The second untrusted third-party resource characteristic data set may include one or more records associated with one or more third-party offerings of a resource by a second third-party entity. For example, in some embodiments, the second entity may be a second commercial entity that purchases used mobile devices.

In some embodiments, the second untrusted third-party characteristic data set may be scraped, for example from one or more web services accessible via communications with another third-party device, such as a second server, associated with the second third-party entity. The apparatus 900 may include means to perform the scraping, and/or be associated with one or more systems for performing the scraping, and retrieve the second untrusted third-party characteristic data set from a repository updated upon completion of the scraping. In some embodiments, the second untrusted third-party resource characteristic data set may be retrieved from a second third-party device associated with the second third-party entity. For example, via one or more APIs, the apparatus 900 may communicate with a second server and/or accessible second repository associated with the second third-party entity to retrieve the second untrusted third-party resource characteristic data set. In other embodiments, the second untrusted third-party resource characteristic data set may be retrieved from a second third-party device associated with a different third-party entity, for example a data aggregator. In some embodiments, the second untrusted third-party characteristic data set may be retrieved in the same manner as the earlier, first retrieved untrusted third-party characteristic data set. At block 1270, the apparatus 900 includes means, such as model performance circuitry 912, processor 902, and/or the like, or a combination thereof, for identifying a second offset between the untrusted third-party resource characteristic data set and the distributed resource characteristic data set.

At block 1272, the apparatus 900 includes means, such as model performance circuitry 912, processor 902, and/or the like, or a combination thereof, for identifying a second exception period set, comprising at least one exception period in the second untrusted third-party resource characteristic data set, based upon a second deviation in the second offset. For example, the second deviation may be a change in the offset from an expected, determined, or average level based on the distributed resource characteristic data set.

In some embodiments, an exception period in the second untrusted third-party resource characteristic data set is identified when the second deviation in the second offset satisfies the exception deviation threshold, or a second exception deviation threshold associated with the second untrusted third-party resource characteristic data set. It should be appreciated that the offset and the deviation may define an expected operating range for the characteristic, for example a price range for a price characteristic associated with a particular resource set identifier.

At block 1274, the apparatus 900 includes means, such as model performance circuitry 912, processor 902, and/or the like, or a combination thereof, for removing the exception period set from the second untrusted third-party resource characteristic data set to generate an updated second untrusted third-party resource characteristic data set. In some embodiments, removing the exception period set from the second untrusted third-party resource characteristic data set comprises marking as an exception each record in, or associated with, each exception period, such that these records may be ignored. By marking the exception periods, the second untrusted third-party resource characteristic data set may be used for data analysis. In other embodiments, the records in, or associated with, the exception periods may be deleted from the untrusted second third-party resource characteristic data set.

At block 1276, the apparatus 900 includes means, such as model performance circuitry 912, processor 902, and/or the like, or a combination thereof, for comparing the updated untrusted third-party resource characteristic data set with the updated second untrusted third-party resource characteristic data set. In some embodiments, the updated untrusted third-party resource characteristic data set and the updated second untrusted third-party resource characteristic data set may be compared to determine a greater characteristic, such as a greater price characteristic, for a particular resource set identifier between the two data sets. In other embodiments, multiple untrusted third-party resource characteristic data sets may be compared.

At block 1278, the apparatus 900 includes means, such as model performance circuitry 912, processor 902, and/or the like, or a combination thereof, for generating the trusted resource characteristic data set based on the comparison of the updated untrusted third-party resource characteristic data set with the updated second untrusted third-party resource characteristic data set. In some embodiments, the trusted resource characteristic data set may be generated to include certain resource characteristics from each of the data sets based on the comparison. For example, where the data sets including pricing characteristics for resources, the trusted resource characteristic data set may include the greatest pricing characteristic for each resource set identifier based on the comparison between the two or more updated untrusted third-party resource data sets.

For example, in some embodiments, the trusted resource characteristic data set includes a fair market offer data object for various resource set identifiers. The fair market offer data object may include a pricing characteristic, such as a fair market offer value, for each resource set identifier, where the pricing characteristic is generated based on the comparison. For example, the pricing characteristic for a particular resource set identifier may be a maximum pricing characteristic between the various updated untrusted third-party resource characteristic data sets for the resource set identifier. The updated untrusted third-party resource characteristic data set may include the maximum pricing characteristic for a particular resource set identifier associated with various third-party entities. For example, an average pricing characteristic may be determined, for a particular third-party entity and particular resource set identifier for example, by calculating the average pricing characteristic for the resource set identifier over a pre-determined time interval (e.g., 15 weeks) with exception periods removed. The average pricing characteristic for a distributed user platform may then be determined, for example based on the distributed resource characteristic data set. The maximum pricing characteristic for the particular resource set identifier and for the particular third-party entity may then be determined by multiplying the average pricing characteristic for the resource set identifier associated with the distributed user platform by the average pricing characteristic for the resource set identifier associated with the third-party entity as a percentage of the average pricing characteristic for the resource set identifier associated with the distributed user platform (e.g., the average pricing characteristic for the resource set identifier associated with the third-party entity divided by the average pricing characteristic for the resource set identifier associated with the distributed user platform).

The maximum pricing characteristic for each resource set identifier and each third-party entity, represented in each of the updated untrusted resource characteristic data sets, may then be used to calculate a fair market offer value for a resource set identifier, which may be embodied by a fair market offer data object and included in the trusted resource characteristic data set associated with the particular resource set identifier. For example, the fair market offer value (e.g., a trusted pricing characteristic) may be determined as the maximum pricing characteristic of the maximum pricing characteristics for each third-party entity. Continuing the example of used mobile device acquisition, if a first updated untrusted third-party resource characteristic data set for third-party entity A was associated with a pricing characteristic of 90 units (e.g., dollars for example) for a particular resource set identifier, a second updated untrusted third-party resource characteristic data set for a third-party entity B was associated with a pricing characteristic of 85 units for the particular resource set identifier, a third updated untrusted third-party resource characteristic data set for a third-party entity C was associated with a pricing characteristic of 87 units for the particular resource set identifier, and a fourth updated untrusted third-party resource characteristic data set for a third-party entity D was associated with a pricing characteristic of 93 units for the particular resource set identifier, the trusted resource characteristic data set may include a pricing characteristic for the particular resource set identifier of 93 units, as the maximum between all updated untrusted third-party resource characteristic data sets. This pricing characteristic may be embodied as a fair market offer data object for the particular resource set identifier, representing the fair market offer value for resources associated with the particular resource set identifier during non-exception (e.g., non-promotional) periods.

The process 1250B for generating a trusted resource characteristic data set similarly enables generation of a trusted characteristic set for other non-resource data sets from one or more untrusted data sets. For example, an untrusted characteristic data set may be retrieved, where the untrusted characteristic set is associated with an untrusted, third-party entity. A distributed characteristic data set may then be collected from, or associated with, a distributed user platform. An offset may then be identified between the untrusted third-party characteristic data set and the distributed characteristic data set. Exception periods may be identified based on a deviation in the offset, and the exception periods may be removed from the untrusted characteristic data set to generate an updated untrusted resource characteristic data set. The updated untrusted resource characteristic data set may then be used to generate the trusted characteristic data set, and/or multiple updated untrusted resource characteristic data sets may be generated such that the trusted characteristic data set may be generated based on a comparison between the multiple updated untrusted resource characteristic data sets. The use of resource pricing in the above description should not be considered to limit the scope and spirit of the disclosure herein.

Example User Interfaces

FIGS. 13-15 illustrate example embodiment user interfaces. For example, some systems, methods, and computer program products may be configured to render, or otherwise cause rendering, of one or more of the example interfaces. It should be appreciated that, in some embodiments the various components illustrated in each interface could be embodied by a number of known interface components configured to receive a myriad of user input types. All interface components, alone and in combination, are illustrative and not to limit the scope and spirit of the disclosure herein.

In some embodiments, each of the interfaces may be rendered by a client device in response to receiving a control signal comprising a renderable data object. The control signal may be generated and/or configured by a resource offer generation system, for example, for transmission to one or more client device. In some embodiments, the renderable data object is generated and/or configured by the resource offer generation system, for example, to include the interface to be rendered.

FIG. 13 illustrates an example offer adjustment interface 1300 in accordance with embodiments of the present disclosure. The offer adjustment interface 1300 may be rendered, for example caused by a resource offer generation system upon generation of a resource offer set, to a client device associated with an offer control user. The offer adjustment interface 1300 comprises an offer analysis table 1322. The offer analysis table 1322 may comprise a row for each resource offer data object in a generated resource offer set. The offer analysis table 1322 comprises a plurality of columns of information associated with, and including, the generated resource offer set. The offer analysis table comprises the resource offer value column 1302 comprising the resource offer values for each resource offer data object in the generated resource offer set. Each row of the resource offer column 1302 is configured to receive user input for adjusting the corresponding resource offer value of the resource offer data object. For example, an offer control user may engage a particular row to input a new resource offer value for the particular resource offer data object.

An offer analysis table may further include one or more additional columns of information associated with analyzing the resource offer set. For example, the offer analysis table 1322 includes resource attribute data columns 1306, market intelligence data 1308, and system generated data columns 1310. The system generated data columns, such as system generated data columns 1310, include data generated and outputted by one or more of a prediction system, such as prediction system 102 embodied by apparatus 200, and/or a resource offer generation system, such as resource offer generation system 802 embodied by apparatus 900. In some embodiments, one or more system generated data columns may include information derived and/or calculated based on data generated and outputted by one or more of a prediction system, such as prediction system 102 embodied by apparatus 200, and/or a resource offer generation system, such as resource offer generation system 802 embodied by apparatus 900, for example in combination with market intelligence data, such as an expected margin associated with each resource offer data object.

The offer adjustment interface 1300 includes an indication of an offer analytics data set 1304, specifically at least a portion of the offer analytics data set rendered as text. The indication of an offer analytics data set may be rendered non-overlapping from the offer analysis table 1322 and dashboard 1320, to enable dynamic and efficient visualization and analysis while navigating the offer analysis table 1322 and/or performing adjustments. The offer analytics data set may include various information associated with the generated resource offer set and/or adjusted resource offer set as currently adjusted. For example, the offer analytics data set may include a profit-per-resource derived from the generated resource offer set. Additionally or alternatively, in some embodiments, the offer analytics data set further includes a profit margin for the adjusted resource offer set as currently adjusted. Additionally or alternatively, the offer analytics data set may include a resource loss indicator representing the number of resource offer data objects currently associated with a negative margin value (e.g., associated with an expected sale price that does not exceed the resource offer value). In some embodiments, at least a portion of the offer analytics data set is dynamically updated as an offer control user adjusts one or more resource offer values for various resource offer data objects in the resource offer set. The indication of the offer analytics data set may also be updated to reflect the updated offer analytics data set.

The offer analysis interface 1300 includes analysis table management components 1314. Each of the analysis table management components 1314 may be configured to filter, adjust, or otherwise affect the data rendered via offer analysis table 1322. For example, one or more analysis table management components may be provided to filter the rows based on a particular value for a particular column, such as based on a resource set identifier or other resource attribute (e.g., carrier, make, model/category type, and the like).

The offer analysis interface includes offer saving component 1316. The offer saving component 1316 may be configured to enable saving of an adjusted resource offer set without submitting it for approval. For example, the offer saving component 1316 may be configured to cause transmission, for example to a resource offer generation system 802, of a request for storing the adjusted resource offer set accessible by the offer control user. When saved, the adjusted resource offer set may be later retrieved and used when rendering the offer adjustment interface (e.g., in another session).

The offer analysis interface includes offer submitting component 1318. The offer submitting component 1318 may be configured to enable submitting of an adjusted resource offer set for approval by an offer approval user. The adjusted resource offer set may comprise the resource offer data objects as adjusted by the offer control user via the offer adjustment interface. The adjusted offer set may include one or more resource offer data objects having an adjusted resource offer value. To enable submitting of the adjusted resource offer set, the offer submitting component 1318 may, for example, be configured to cause transmission, such as to a resource offer generation system 802, of the adjusted resource offer set. The adjusted resource offer set may be transmitted as part of, or otherwise associated with, a request for storing the submitted adjusted resource offer set.

The offer analysis interface includes external management components 1324. The external management components may be configured for generating and/or managing one or more files representing modifying the offer analysis table 1322. For example, external management components 1324 may include one or more components for uploading a file comprising at least a resource offer set, such as a Microsoft Excel™, for rendering via an offer analysis table. External management components 1324 may additionally or alternatively include one or more components for downloading the offer analysis table 1322, or a portion thereof, to a file. For example, the offer analysis table 1322 may, if needed, be converted to an external file type (e.g., Microsoft Excel™) and downloaded.

Offer adjustment interface 1300 further includes a dashboard portion 1320. The dashboard portion 1320 may be rendered non-overlapping from the indication of the offer analytics data set 1304, and the offer analysis table 1322 and dashboard 1320, to enable efficient visualization and analysis while navigating the interfaces offered by dashboard portion 1320. The dashboard portion 1320 may include one or more components for accessing one or more other interfaces associated with the resource offer set and/or market intelligence data. The dashboard portion 1320 specifically includes a user interface component for accessing, or otherwise causing rendering of, an offer strength interface, market comparison interface, and price strength interface.

FIG. 14 illustrates an example offer approval interface 1400 in accordance with embodiments of the present disclosure. The offer approval interface 1400 may be rendered, for example caused by a resource offer generation system upon submission of an adjusted resource offer set by an offer control user, to an approval device associated with an offer approval user. The offer approval interface 1400 comprises the offer analysis table 1322, which includes the resource offer value column 1302 and remaining columns 1306-1312. The resource offer value column 1302 may be rendered such that it is not adjustable. For example the resource offer value column 1302 may not be configured to receive user input. The offer approval interface 1400 may additionally include the dashboard portion 1320, for accessing one or more of the various other interfaces described, and the price analytics information 1304 based on the adjusted resource offer set.

The offer approval interface 1400 includes offer approval component 1402 and offer rejection component 1404. The offer approval component 1402 enables approval of the adjusted resource offer set. For example, in response to user engagement by an offer approval user with the offer approval component 1402, the approval device may transmit an offer approval response comprising an offer approval status representing an approved status. The offer rejection component 1404 enables rejection of the adjusted resource offer set. For example, in response to user engagement by an offer approval user with the offer rejection component 1404, the approval device may transmit an offer approval response comprising an offer approval status representing a rejected status. In some embodiments, in response to user engagement by an offer approval user with the offer rejection component 1404, the approval device may cause rendering of an interface component (not shown) configured to create and submit an offer rejection message. For example, a text box configured to enable the offer approval user to create the offer rejection message, and message submit button where, upon user engagement with the message submit button, the admin device transmits an offer approval response including at least an offer approval status representing a rejected status, and the created offer rejection message.

FIG. 15 illustrates an example market comparison interface 1500 in accordance with embodiments of the present disclosure. The market comparison interface 1500 may be rendered, for example caused by a resource offer generation system, to a user device or an approval device upon engagement with an interface component associated with the dashboard portion 1320. The market comparison interface 1500 includes the dashboard portion 1320, for accessing one or more of the various other interfaces described.

Market comparison interface 1500 comprises competitor selection components 1502. The competitor selection components may be configured for toggling between summarizing market data based on comparison to resource set identifiers marked as in a promotion period, comparison to resource set identifiers market not market as in a promotion period, or all resource set identifier. The component status of each of the competitor selection components 1502 may filter market intelligence data used to generate the market summary visualization components 1506 and market summary table 1508.

Market comparison interface 1500 comprises data management components 1504. Data management components 1504 may include one or more interface components for receiving user input for one or more resource attributes. The input resource attribute values may be used to filter, or further filter, market intelligence data used to generate the market summary visualization components 1506 and market summary table 1508.

Market comparison interface 1500 includes market summary visualization components 1506. The market summary visualization components 1506 may provide a summary of the resource offer values for resource offer data objects of a particular adjusted resource offer set. For example, market summary visualization component 1506A may provide a summary of all resource offer values compared to the market average for the corresponding resource set identifier, based on the market intelligence data for all competitor entities. Market summary visualization component 1506B may provide a summary of all resource offer values compared to the market maximum for the corresponding resource set identifier (e.g., for a particular resource offer data object having a resource offer value for a particular resource set identifier, the highest offer value associated with a competitor entity for that resource set identifier), based on the market intelligence data for all competitor entities' visualization component.

The market comparison interface 1500 comprises market summary table 1508. The market summary table 1508 may comprise aggregated summaries of market intelligence data associated with all competitor entities. For example, the market summary table 1508 may include the number of resources within predefined bands compared to a reference metric. For example, the number of resources associated with resource offer data objects having resource offer values within a predefined range, represented by the predefined band, may be displayed. The bands may be determined based on the region-program identifier for the selected region-program data object.

The dashboard, such as dashboard 1320 in FIGS. 13, 14, and 15, may also provide access to a price trends interface. The price trends interface may include various visual indications, such as graphs, associated with third-party offer values associated with a third-party compared to the average sales price for a particular channel profile associated with a distributed user platform, such as eBay™ or the like. The price trends interface may include such indications for any number of third-parties (e.g., one or more third-parties, one or more competitors, or the like). Further, the price trends interface may render indications for promotion periods.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many embodiments of the subject matter described may include all, or portions thereof, or a combination of portions, of the systems, apparatuses, methods, and/or computer program products described herein. The subject matter described herein includes, but is not limited to, the following specific embodiments:

1. A method for allocating a constrained resources set in a dynamic environment, the method comprising:
receiving, from a client device associated with a channel profile, a request data object;
receiving a tiering parameters data object;
receiving a decay parameters data object;
extracting, from the request data object, a resource request set, wherein the resource request set comprises a plurality of request parameters;
extracting, from the tiering parameters data object, a plurality of tiering parameters;
extracting, from the decay parameters data object, a plurality of decay parameters;
assigning the channel profile to a first tier from amongst a plurality of tiers, wherein assigning the channel profile to the first tier comprises applying the plurality of tiering parameters and a first request parameter from the plurality of request parameters to a first model;
generating an adjusted resource request set associated with the user by applying a decay curve to a second request parameter from the plurality of request parameters, wherein the decay curve is based at least in part on the plurality of decay parameters;
determining, based on the assigned first tier and the adjusted resource request set, if the channel profile satisfies each of plurality of threshold conditions;
in response to determining that the channel profile satisfies each of the plurality of threshold conditions, applying the adjusted resource request set and the assigned tier to a second model to generate a resource allocation set for the channel profile; and
generating a control signal causing a renderable object comprising an indication of the resource allocation set to be displayed on a user interface.

2. The method of embodiment 1, wherein the plurality of tiering parameters comprises a portfolio-level volume associated with a channel profile.

3. The method of embodiment 2, further comprising scaling the portfolio-level volume associated with the channel profile based at least in part on assigning the portfolio-level volume associated with the channel profile to a position in a ranked list of portfolio-level volumes.

4. The method of any one of embodiments 1-3, wherein the plurality of tiering parameters comprises a projected portfolio-level profit margin associated with a channel profile.

5. The method of embodiment 4, further comprising scaling the projected portfolio-level profit margin associated with the channel profile based at least in part on assigning the projected portfolio-level profit margin associated with the channel profile to a position in a ranked list of projected portfolio-level profit margins.

6. The method of any one of embodiments 1-5, wherein the plurality of tiering parameters comprises an entropy parameter associated with a channel profile.

7. The method of embodiment 6, wherein the entropy parameter associated with the channel profile is expressed by the formula $E=\Sigma n*\log n$, where $E$ is the entropy parameter and $n$ is the volume of devices bid in a given bid, divided by the total volume of devices bid.

8. The method of embodiment 7, further comprising scaling the entropy parameter associated with the channel profile based at least in part on assigning the entropy parameter associated with the channel profile to a position in a ranked list of entropy parameters.

9. The method of any one of embodiments 1-8, wherein the plurality of tiering parameters comprises an indication of a geographic location associated with a channel profile.

10. The method of any one of embodiments 1-9, wherein the plurality of tiering parameters comprises a timing parameter associated with a relationship between a channel profile and a first entity.

11. The method of embodiment 10, further comprising scaling the timing parameter based at least in part calculating a number of days reflected by the timing parameter and assigning the calculated number of days to a position in a ranked list of timing parameters.

12. The method of any one of embodiments 1-11, wherein the plurality of tiering parameters comprises an indication of an audit status of a channel profile.

13. The method of embodiment 12, further comprising scaling the indication of the audit status of the channel profile by at least converting the indication of the audit status of the channel profile to a single-digit binary value.

14. The method of any one of embodiments 1-13, wherein the plurality of tiering parameters comprises an indication of an exclusivity status of a channel profile.

15. The method of embodiment 14, further comprising scaling the indication of the exclusivity status of the channel profile by at least converting the indication of the exclusivity status of the channel profile to a single-digit binary value.

16. The method of any one of embodiments 1-15, wherein the plurality of decay parameters comprises a set of historical pricing information associated with a plurality of channel profiles.

17. The method of any one of embodiments 1-16, wherein the plurality of decay parameters comprises a set of historical pricing information associated with a public auction market.

18. The method of any one of embodiments 1-17, wherein the plurality of request parameters comprises a requested quantity of an inventory element.

19. The method of any one of embodiments 1-18, wherein the plurality of request parameters comprises a first requested quantity of a first inventory element.

20. The method of any one of embodiments 1-19, wherein the plurality of request parameters comprises a plurality of requested quantities of a plurality of inventory elements.

21. The method of any one of embodiments 1-20, wherein the plurality of request parameters comprises a list of SKU identifiers associated with a plurality of inventory elements.

22. The method of any one of embodiments 1-21, wherein the plurality of request parameters comprises a first bid price for a first inventory element.

23. The method of any one of embodiments 1-22, wherein the plurality of request parameters comprises a plurality of bids associated with a plurality of inventory elements.

24. The method of any one of embodiments 1-23, wherein the plurality of request parameters comprises a set of properties associated with a channel profile.

25. The method of any one of embodiments 1-24, wherein assigning the channel profile to the first tier from amongst a plurality of tiers, wherein assigning the channel profile to the first tier comprises applying the plurality of tiering parameters and the first request parameter from the plurality of request parameters to a first model comprises:
- determining whether a parameter within the plurality of tiering parameters comprises an outlier; and
- removing the outlier from the plurality of tiering parameters.

26. The method of any one of embodiments 1-25, wherein generating the adjusted resource request set associated with the user by applying the decay curve to the second request parameter from the plurality of request parameters, wherein the decay curve is based at least in part on the plurality of decay parameters comprises applying the plurality of decay parameters to a multivariate adaptive regression splines (MARS) model.

27. The method of any one of embodiments 1-26, wherein the second model is configured to determine a plurality of probabilities associated with the channel profile and the resource allocation set.

28. The method of any one of embodiments 1-27, further comprising generating a control signal causing the renderable object comprising the indication of the resource allocation set to be displayed on a user interface of the client device.

29. An apparatus for determining a predicted future demand for resources in a dynamic environment, the apparatus comprising at least one processor and at least one memory comprising computer program code, the at least one memory and the computer program code configured to, with the at least one processor, cause the apparatus to:
- receive, from a client device associated with a channel profile, a request data object;
- receive a tiering parameters data object;
- receive a decay parameters data object;
- extract, from the request data object, a resource request set, wherein the resource request set comprises a plurality of request parameters;
- extract, from the tiering parameters data object, a plurality of tiering parameters;
- extract, from the decay parameters data object, a plurality of decay parameters;
- assign the channel profile to a first tier from amongst a plurality of tiers, wherein assigning the channel profile to the first tier comprises applying the plurality of tiering parameters and a first request parameter from the plurality of request parameters to a first model;
- generate an adjusted resource request set associated with the user by applying a decay curve to a second request parameter from the plurality of request parameters, wherein the decay curve is based at least in part on the plurality of decay parameters;
- determine, based on the assigned first tier and the adjusted resource request set, if the channel profile satisfies each of plurality of threshold conditions;
- in response to determining that the channel profile satisfies each of the plurality of threshold conditions, apply the adjusted resource request set and the assigned tier to a second model to generate a resource allocation set for the channel profile; and generate a control signal causing a renderable object comprising an indication of the resource allocation set to be displayed on a user interface.

30. The apparatus of embodiment 29, the at least one memory and the computer program code configured to, with the at least one processor, cause the apparatus to:
- assign the channel profile to the first tier from amongst a plurality of tiers, wherein assigning the channel profile to the first tier comprises applying the plurality of tiering parameters and the first request parameter from the plurality of request parameters to a first model comprises:
  - determining whether a parameter within the plurality of tiering parameters comprises an outlier; and
  - removing the outlier from the plurality of tiering parameters.

31. The apparatus of any one of embodiments 29 or 30, the at least one memory and the computer program code configured to, with the at least one processor, cause the apparatus to:
- generate the adjusted resource request set associated with the user by applying the decay curve to the second request parameter from the plurality of request parameters, wherein the decay curve is based at least in part on the plurality of decay parameters comprises applying the plurality of decay parameters to a multivariate adaptive regression splines (MARS) model.

32. A computer program product comprising at least one non-transitory computer-readable storage medium having computer-executable program code instructions stored therein, the computer-executable program code instructions comprising program code instructions configured to:
- receive, from a client device associated with a channel profile, a request data object;
- receive a tiering parameters data object;
- receive a decay parameters data object;
- extract, from the request data object, a resource request set, wherein the resource request set comprises a plurality of request parameters;
- extract, from the tiering parameters data object, a plurality of tiering parameters;
- extract, from the decay parameters data object, a plurality of decay parameters;
- assign the channel profile to a first tier from amongst a plurality of tiers, wherein assigning the channel profile to the first tier comprises applying the plurality of tiering parameters and a first request parameter from the plurality of request parameters to a first model;
- generate an adjusted resource request set associated with the user by applying a decay curve to a second request parameter from the plurality of request parameters, wherein the decay curve is based at least in part on the plurality of decay parameters;
- determine, based on the assigned first tier and the adjusted resource request set, if the channel profile satisfies each of plurality of threshold conditions;
- in response to determining that the channel profile satisfies each of the plurality of threshold conditions, apply the adjusted resource request set and the assigned tier to a second model to generate a resource allocation set for the channel profile; and
- generate a control signal causing a renderable object comprising an indication of the resource allocation set to be displayed on a user interface.

33. The computer program product of embodiment 32, the computer-executable program code instructions comprising program code instructions configured to:
- assign the channel profile to the first tier from amongst a plurality of tiers, wherein assigning the channel profile to the first tier comprises applying the plurality of tiering parameters and the first request parameter from the plurality of request parameters to a first model comprises:

determining whether a parameter within the plurality of tiering parameters comprises an outlier; and removing the outlier from the plurality of tiering parameters.

34. The computer program product of any one of embodiments 32 or 33, the computer-executable program code instructions comprising program code instructions configured to:

generate the adjusted resource request set associated with the user by applying the decay curve to the second request parameter from the plurality of request parameters, wherein the decay curve is based at least in part on the plurality of decay parameters comprises applying the plurality of decay parameters to a multivariate adaptive regression splines (MARS) model.

35. A method for determining a predicted future demand for resources in a dynamic environment, the method comprising:

receiving a request data object from a client device associated with a user;

extracting, from the request data object, a request data set, wherein the request data set is associated with a first set of resources;

receiving a first context data object, wherein the first context data object is associated with one or more resource distribution channels;

retrieving a predicted channel and condition data set, wherein retrieving the predicted channel and condition data set comprises applying the request data set and the first context data object to a first model; and generating a control signal causing a renderable object comprising the predicted channel and condition data set to be displayed on a user interface of the client device associated with the user.

36. An apparatus for determining a predicted future demand for resources in a dynamic environment, the apparatus comprising at least one processor and at least one memory comprising computer program code, the at least one memory and the computer program code configured to, with the at least one processor, cause the apparatus to:

receive a request data object from a client device associated with a user;

extract, from the message request data object, a request data set, wherein the request data set is associated with a first set of resources;

receive a first context data object, wherein the first context data object is associated with one or more resource distribution channels;

retrieve a predicted channel and condition data set, wherein retrieving the predicted channel and condition data set comprises applying the request data set and the first context data object to a first model; and generate a control signal causing a renderable object comprising the predicted channel and condition data set to be displayed on a user interface of the client device associated with the user.

37. A computer program product comprising at least one non-transitory computer-readable storage medium having computer-executable program code instructions stored therein, the computer-executable program code instructions comprising program code instructions configured to:

receive a request data object from a client device associated with a user;

extract, from the message request data object, a request data set, wherein the request data set is associated with a first set of resources;

receive a first context data object, wherein the first context data object is associated with one or more resource distribution channels;

retrieve a predicted channel and condition data set, wherein retrieving the predicted channel and condition data set comprises applying the request data set and the first context data object to a first model; and generate a control signal causing a renderable object comprising the predicted channel and condition data set to be displayed on a user interface of the client device associated with the user.

38. A computer-implemented method for generating a resource offer set, the method comprising:

retrieving at least one resource offer generation input data set;

receiving a benchmark and portfolio target data set in response to an input by an offer control user via one or more client devices;

generating a resource offer set by applying at least one of the at least one resource offer generation input data set and the benchmark and portfolio target data set to a resource offer generation model, wherein the generated resource offer set satisfies the benchmark and portfolio target data set;

generating a control signal causing a renderable object comprising an offer adjustment interface displayed at a first of the one or more client devices and configured for updating the resource offer set to create an adjusted resource offer set, the offer adjustment interface comprising an indication of the resource offer set;

receiving a completion control signal from the first of the one or more client devices;

in response to the completion control signal, generating an approval request control signal causing a second renderable data object comprising an approval interface to be displayed at a second of the one or more client devices, wherein the approval interface comprises an indication of the adjusted resource offer set;

receiving, from the second of the one or more client devices, an offer approval control signal comprising an offer status indicator; and storing the resource offer set associated with the offer status indicator.

39. The computer-implemented method of embodiment 38, the method further comprising:

receiving a region-program identifier via one or more client devices;

receiving a collection period data object associated with the region-program identifier via the one or more client devices; and validating the collection period data object by comparing the collection period data object to a valid timestamp range object, wherein storing the resource offer set is associated with the offer status indicator, the collection period data object, and the region-program identifier.

40. The computer-implemented method of any one of embodiments 38 or 39, the method further comprising:

receiving control signals, from the first of the one or more client devices, comprising one or more adjustment data objects; and updating the resource offer set based on the one or more adjustment data objects to create the adjusted resource offer set.

41. The computer-implemented method of any one of embodiments 38-40, wherein the adjusted resource offer set comprises the resource offer set.

42. The computer-implemented method of any one of embodiments 38-41, wherein retrieving the at least one resource offer generation input data set comprises:
retrieving at least one updated resource offer generation input data set, wherein the at least one resource offer generation input data set comprises the at least one updated resource offer generation input data set.

43. The computer-implemented method of any one of embodiments 38-42, wherein retrieving the at least one resource offer generation input data set comprises:
determining at least one resource offer generation input data set satisfies an untrustworthiness threshold; and
retrieving an updated resource offer generation input data set for the at least one resource offer generation input data set for including in the resource offer generation input data set.

44. The computer-implemented method of any one of embodiments 38-43, wherein the benchmark and portfolio target data set comprises at least one data object representing a boundary condition, and wherein the resource offer set satisfies the benchmark and portfolio target data set by satisfying the at least one boundary condition.

45. The computer-implemented method of any one of embodiments 38-44, wherein the offer adjustment interface further comprises an indication of an offer analytics data set generated based on the resource offer set and at least one of the at least one resource offer generation input data set.

46. An apparatus for generating a resource offer set, the apparatus comprising at least one processor and at least one memory comprising computer program code, the at least one memory and the computer program code configured to, with the at least one processor, cause the apparatus to:
retrieve at least one resource offer generation input data set;
receive a benchmark and portfolio target data set in response to an input by an offer control user via one or more client devices;
generate a resource offer set by applying at least one of the at least one resource offer generation input data set and the benchmark and portfolio target data set to a resource offer generation model,
wherein the generated resource offer set satisfies the benchmark and portfolio target data set;
generate a control signal causing a renderable object comprising an offer adjustment interface displayed at a first of the one or more client devices and configured for updating the resource offer set to create an adjusted resource offer set, the offer adjustment interface comprising an indication of the resource offer set;
receive a completion control signal from the first of the one or more client devices;
in response to the completion control signal, generating an approval request control signal causing a second renderable data object comprising an approval interface to be displayed at a second of the one or more client devices, wherein the approval interface comprises an indication of the adjusted resource offer set;
receive, from the second of the one or more client devices, an offer approval control signal comprising an offer status indicator; and
store the resource offer set associated with the offer status indicator.

47. The apparatus of embodiment 46, the at least one memory and the computer program code further configured to, with the at least one processor, cause the apparatus to:
receive a region-program identifier via one or more client devices;
receive a collection period data object associated with the region-program identifier via the one or more client devices; and
validate the collection period data object by comparing the collection period data object to a valid timestamp range object,
wherein the apparatus is configured to store the resource offer set associated with the offer status indicator, the collection period data object, and the region-program identifier.

48. The apparatus of any one of embodiments 46 or 47, the at least one memory and the computer program code further configured to, with the at least one processor, cause the apparatus to:
receive control signals, from the first of the one or more client devices, comprising one or more adjustment data objects; and
update the resource offer set based on the one or more adjustment data objects to create the adjusted resource offer set.

49. The apparatus of any one of embodiments 46-48, wherein the adjusted resource offer set comprises the resource offer set.

50. The apparatus of any one of embodiments 46-49, wherein, to retrieve the at least one resource offer generation input data set, the computer program code configures the apparatus to:
retrieve at least one updated resource offer generation input data set, wherein the at least one resource offer generation input data set comprises the at least one updated resource offer generation input data set.

51. The apparatus of any one of embodiments 46-50, wherein, to retrieve the at least one resource offer generation input data set, the computer program code configures the apparatus to:
determining at least one resource offer generation input data set satisfies an untrustworthiness threshold; and
retrieving an updated resource offer generation input data set for the at least one resource offer generation input data set for including in the resource offer generation input data set.

52. The apparatus of any one of embodiments 46-51, wherein the benchmark and portfolio target data set comprises at least one data object representing a boundary condition, and wherein the resource offer set satisfies the benchmark and portfolio target data set by satisfying the at least one boundary condition.

53. The apparatus of any one of embodiments 46-52, wherein the offer adjustment interface further comprises an indication of an offer analytics data set generated based on the resource offer set and at least one of the at least one resource offer generation input data set 54. A computer-implemented method for generating a trusted resource characteristic data set based on at least one untrusted third-party resource characteristic data, the method comprising:
generating a trusted resource characteristic data set by applying at least an untrusted third-party resource characteristic data set and a distributed resource characteristic data set from a distributed user platform to an exception detection model,
wherein applying the exception detection model comprises:
integrating the untrusted third-party resource characteristic data set and the distributed resource characteristic data set from the distributed user platform;

identifying an offset between the untrusted third-party resource characteristic data set and the distributed resource characteristic data set from the distributed user platform;

identifying an exception period set, comprising at least one exception period in the untrusted third-party resource characteristic data set, based upon a deviation in the offset;

removing the exception period set from the untrusted third-party resource characteristic data set to generate an updated untrusted third-party resource characteristic data set; and generating the trusted resource characteristic data set based on at least the updated untrusted third-party resource characteristic data set.

55. The computer-implemented method of embodiment 54, wherein integrating the untrusted third-party resource characteristic data set and the distributed resource characteristic data set comprises:

aligning the untrusted third-party resource characteristic data set and the distributed resource characteristic data set based on a temporal alignment.

56. The computer-implemented method of any one of embodiments 54 or 55, wherein integrating the untrusted third-party resource characteristic data set and the distributed resource characteristic data set comprises:

aligning the untrusted third-party resource characteristic data set and the distributed resource characteristic data set based on a temporal alignment and a resource set identifier alignment.

57. The computer-implemented method of any one of embodiments 54-56, wherein identifying the offset between the untrusted third-party resource characteristic data set and the distributed resource characteristic data set from the distributed user platform comprises:

comparing a first characteristic of a first resource in the untrusted third-party resource characteristic data set with the first characteristic of the first resource in the distributed resource characteristic data set from the distributed user platform to identify the offset.

58. The computer-implemented method of embodiment 57, wherein the first characteristic of the first resource in the untrusted third-party resource characteristic set comprises a first average characteristic for the first characteristic based on the untrusted third-party resource characteristic set over a predefined timestamp interval, and wherein the first characteristic of the first resource in the distributed resource characteristic data set comprises a second average for the first characteristic of the first resource based on the distributed resource characteristic data set associated with the predefined timestamp interval, and wherein the comparing comprises:

comparing the first average characteristic of the first resource based on the untrusted third-party resource characteristic data set with the second average for the first characteristic of the first resource based on the distributed resource characteristic data set from the distributed user platform to identify the offset, wherein the offset is associated with the predefined timestamp interval.

59. The computer-implemented method of any one of embodiments 54-58, wherein identifying the at least one exception period in the untrusted third-party resource characteristic data set based upon the deviation in the offset comprises:

identifying a first timestamp at which the deviation of the offset satisfies an exception deviation threshold;

identifying a second timestamp at which the deviation of the offset does not satisfy the exception deviation threshold; and generating a first exception period based on the first timestamp and the second timestamp.

60. The computer-implemented method of any one of embodiments 54-59, wherein the untrusted third-party resource characteristic data set comprises a third-party resource pricing data set.

61. The computer-implemented method of any one of embodiments 54-60, wherein the distributed resource characteristic data set comprises a distributed resource pricing data set.

62. The computer-implemented method of any one of embodiments 54-61, further comprising:

applying a second untrusted third-party resource characteristic data set and the distributed resource characteristic data set from the distributed user platform to the exception detection model, wherein applying the exception detection model comprises:

integrating the second untrusted third-party resource characteristic data set and the distributed resource characteristic data set from the distributed user platform;

identifying a second offset between the second untrusted third-party resource characteristic data set and the distributed resource characteristic data set from the distributed user platform;

identifying a second exception period set, comprising at least one exception period in the second untrusted third-party resource characteristic data set, based upon a second deviation in the second offset;

removing the second exception period set from the second untrusted third-party resource characteristic data set to generate an updated second untrusted third-party resource characteristic data set;

comparing the updated untrusted third-party resource characteristic data set with the updated second untrusted third-party resource characteristic data set; and wherein generating the trusted resource characteristic data set based on at least the updated untrusted third-party resource characteristic data set comprises:

generating the trusted resource characteristic data set based on the comparison of the updated untrusted third-party resource characteristic data set with the updated second untrusted third-party resource characteristic data set.

63. An apparatus for generating a trusted resource characteristic data set based on at least one untrusted third-party resource characteristic data, the apparatus comprising at least one processor and at least one memory comprising computer program code, the at least one memory and the computer program code configured to, with the at least one processor, cause the apparatus to:

generate a trusted resource characteristic data set by applying at least an untrusted third-party resource characteristic data set and a distributed resource characteristic data set from a distributed user platform to an exception detection model, wherein to apply the exception detection model, the computer program code causes the apparatus to:

integrate the untrusted third-party resource characteristic data set and the distributed resource characteristic data set from the distributed user platform;

identify an offset between the untrusted third-party resource characteristic data set and the distributed resource characteristic data set from the distributed user platform;

identify an exception period set, comprising at least one exception period in the untrusted third-party resource characteristic data set, based upon a deviation in the offset;

remove the exception period set from the untrusted third-party resource characteristic data set to generate an updated untrusted third-party resource characteristic data set; and generate the trusted resource characteristic data set based on the updated untrusted third-party resource characteristic data set.

64. The apparatus of embodiment 63, wherein, to integrate the untrusted third-party resource characteristic data set and the distributed resource characteristic data set, the computer program code cause the apparatus to:

align the untrusted third-party resource characteristic data set and the distributed resource characteristic data set based on a temporal alignment.

65. The apparatus of any one of embodiments 63 or 64, wherein, to integrate the untrusted third-party resource characteristic data set and the distributed resource characteristic data set, the computer program code cause the apparatus to:

align the untrusted third-party resource characteristic data set and the distributed resource characteristic data set based on a temporal alignment and a resource set identifier alignment.

66. The apparatus of any one of embodiments 63-65, wherein, to identify the offset between the untrusted third-party resource characteristic data set and the distributed resource characteristic data set from the distributed user platform, the computer program code cause the apparatus to:

compare a first characteristic of a first resource in the untrusted third-party resource characteristic data set with the first characteristic of the first resource in the distributed resource characteristic data set from the distributed user platform to identify the offset.

67. The apparatus of embodiment 66, wherein the first characteristic of the first resource in the untrusted third-party resource characteristic set comprises a first average characteristic for the first characteristic based on the untrusted third-party resource characteristic set over a predefined timestamp interval, and wherein the first characteristic of the first resource in the distributed resource characteristic data set comprises a second average for the first characteristic of the first resource based on the distributed resource characteristic data set associated with the predefined timestamp interval, and wherein to compare, the computer program code cause the apparatus to:

compare the first average characteristic of the first resource based on the untrusted third-party resource characteristic data set with the second average for the first characteristic of the first resource based on the distributed resource characteristic data set from the distributed user platform to identify the offset, wherein the offset is associated with the predefined timestamp interval.

68. The apparatus of any one of embodiments 63-67, wherein, to identify the at least one exception period in the untrusted third-party resource characteristic data set based upon the deviation in the offset, the computer program code cause the apparatus to:

identify a first timestamp at which the deviation of the offset satisfies an exception deviation threshold;

identify a second timestamp at which the deviation of the offset does not satisfy the exception deviation threshold; and generate a first exception period based on the first timestamp and the second timestamp.

69. The apparatus of any one of embodiments 63-68, wherein the untrusted third-party resource characteristic data set comprises a third-party resource pricing data set.

70. The apparatus of any one of embodiments 63-69, wherein the distributed resource characteristic data set comprises a distributed resource pricing data set.

71. The apparatus of any one of embodiments 63-70, the at least one memory and the computer program code further configured to, with the at least one processor, cause the apparatus to:

apply a second untrusted third-party resource characteristic data set and the distributed resource characteristic data set from the distributed user platform to the exception detection model, wherein to apply the exception detection model, the computer program code cause the apparatus to:

integrate the second untrusted third-party resource characteristic data set and the distributed resource characteristic data set from the distributed user platform;

identify a second offset between the second untrusted third-party resource characteristic data set and the distributed resource characteristic data set from the distributed user platform;

identify a second exception period set, comprising at least one exception period in the second untrusted third-party resource characteristic data set, based upon a second deviation in the second offset;

remove the second exception period set from the second untrusted third-party resource characteristic data set to generate an updated second untrusted third-party resource characteristic data set;

compare the updated untrusted third-party resource characteristic data set with the updated second untrusted third-party resource characteristic data set; and wherein to generate the trusted resource characteristic data set based on at least the updated untrusted third-party resource characteristic data set, the computer program code is configured to cause the apparatus to:

generate the trusted resource characteristic data set based on the comparison of the updated untrusted third-party resource characteristic data set with the updated second untrusted third-party resource characteristic data set.

72. A computer-implemented method for rendering an offer adjustment interface to a client device for facilitating adjustment and approval via an offer adjustment interface, the method comprising:

dynamically rendering an offer analysis table, the offer analysis table comprising an indication of a received resource offer set comprising one or more resource offer data objects, wherein the offer analysis table is configured for navigating, by an offer control user of the client device, the received resource offer set, and wherein each resource offer data object is configured for receiving user input of an adjusted resource offer data object in real-time;

dynamically rendering, in a first region non-overlapping with the offer analysis table, a dashboard for accessing one or more analysis interfaces, the one or more analysis interfaces configured based on the resource offer set;

dynamically rendering, in a second region non-overlapping with the offer analysis table and the dashboard, an indication of an offer analytics data object, wherein the offer analytics data object is based on the resource offer set;

in response to user input of at least one adjusted resource data object for at least one selected resource data object:
identifying an adjusted resource offer set based on the received resource offer set and the at least one adjusted resource data object;
in real-time, dynamically rendering, in real-time, the at least one adjusted resource data object to the offer analysis table; and
in real-time, dynamically updating, based on the adjusted resource offer set, the rendering of the indication of the offer analytics data object; and dynamically rendering an offer submitting component configured for, in response to user engagement with the offer submitting component, transmitting a completion control signal.

73. The computer-implemented method of embodiment 72, further comprising:
in response to the user input of the at least one adjusted resource data object for the at least one selected resource data object, dynamically updating the one or more analysis interfaces based on the adjusted resource offer set.

74. The computer-implemented method of any one of embodiments 72 or 73, further comprising:
dynamically rendering an offer saving component configured for, in response to user engagement with the offer saving component, transmitting one or more control signals comprising the at least one adjustment data objects.

75. An apparatus for rendering an offer adjustment interface to a client device for facilitating adjustment and approval via an offer adjustment interface, the apparatus comprising at least one processor and at least one memory comprising computer program code, the at least one memory and the computer program code configured to, with the at least one processor, cause the apparatus to:
render, dynamically an offer analysis table, the offer analysis table comprising an indication of a received resource offer set comprising one or more resource offer data objects,
wherein the offer analysis table is configured for navigating, by an offer control user of the client device, the received resource offer set, and
wherein each resource offer data object is configured for receiving user input of an adjusted resource offer data object in real-time;
render, dynamically, in a first region non-overlapping with the offer analysis table, a dashboard for accessing one or more analysis interfaces, the one or more analysis interfaces configured based on the resource offer set;
render, dynamically, in a second region non-overlapping with the offer analysis table and the dashboard, an indication of an offer analytics data object, wherein the offer analytics data object is based on the resource offer set;
in response to user input of at least one adjusted resource data object for at least one selected resource data object:
identify an adjusted resource offer set based on the received resource offer set and the at least one adjusted resource data object;
render, dynamically and in real-time, the at least one adjusted resource data object to the offer analysis table; and
update, dynamically and in real-time, based on the adjusted resource offer set, the rendering of the indication of the offer analytics data object; and
render, dynamically, an offer submitting component configured to, in response to user engagement with the offer submitting component, transmit a completion control signal.

76. The apparatus of embodiment 75, the at least one memory and the computer program code further configured to, with the at least one processor, cause the apparatus to:
in response to the user input of the at least one adjusted resource data object for the at least one selected resource data object, update, dynamically the one or more analysis interfaces based on the adjusted resource offer set.

77. The apparatus of any one of embodiments 75 or 76, the at least one memory and the computer program code further configured to, with the at least one processor, cause the apparatus to:
render, dynamically, an offer saving component configured for, in response to user engagement with the offer saving component, transmitting one or more control signals comprising the at least one adjustment data objects.

78. A computer-implemented method for generating a resource offer set, the method comprising:
receiving a region-program identifier via one or more client devices;
receiving a collection period data object associated with the region-program identifier via the one or more client devices;
validating the collection period data object by comparing the collection period data object to a valid timestamp range object;
retrieving at least one resource offer generation input data set comprising at least a historical offer data set, a resource list data set, a market intelligence data set, and a resource mapping data set;
receiving a benchmark and portfolio target data set in response to an input by an offer control user via one or more client devices;
wherein the benchmark and portfolio target data set comprises at least one collection data parameter value for a collection data parameter associated with a region-program data object associated with the region-program identifier;
generating a resource offer set by applying at least one of the resource offer generation input data set and the benchmark and portfolio target data set to a resource offer generation model,
wherein the generated resource offer set satisfies the benchmark and portfolio target data set;
generating a control signal causing a renderable object comprising an offer adjustment interface displayed at a first of the one or more client devices and configured for updating the resource offer set to create an adjusted resource offer set, the offer adjustment interface comprising an indication of the resource offer set;
receiving a completion control signal from the first of the one or more client devices;

in response to the completion control signal, generating an approval request control signal causing a second renderable data object comprising an approval interface to be displayed at a second of the one or more client devices, wherein the approval interface comprises an indication of the adjusted resource offer set;

receiving, from the second of the one or more client devices, an offer approval control signal comprising an offer status indicator, wherein the offer status indicator comprises an approved status indicator or a rejected status indicator; and storing the resource offer set associated with the offer status indicator.

79. The computer-implemented method of embodiment 78, further comprising generating a trusted resource characteristic data set by applying at least an untrusted third-party resource characteristic data set and a distributed resource characteristic data set from a distributed user platform to an exception detection model, wherein applying the exception detection model comprises:
integrating the untrusted third-party resource characteristic data set and the distributed resource characteristic data set from the distributed user platform;
identifying an offset between the untrusted third-party resource characteristic data set and the distributed resource characteristic data set from the distributed user platform;
identifying an exception period set, comprising at least one exception period in the untrusted third-party resource characteristic data set, based upon a deviation in the offset;
removing the exception period set from the untrusted third-party resource characteristic data set to generate an updated untrusted third-party resource characteristic data set; and
generating the trusted resource characteristic data set based on the updated untrusted third-party resource characteristic data set, wherein generating the resource offer set comprises applying the at least one resource offer generation input data set and the trusted resource characteristic data set to the resource offer generation model.

80. The computer-implemented method of embodiment 79, further comprising applying a second untrusted third-party resource characteristic data set and the distributed resource characteristic data set from the distributed user platform to the exception detection model, wherein applying the exception detection model comprises:
integrating the second untrusted third-party resource characteristic data set and the distributed resource characteristic data set from the distributed user platform;
identifying a second offset between the second untrusted third-party resource characteristic data set and the distributed resource characteristic data set from the distributed user platform;
identifying a second exception period set, comprising at least one exception period in the second untrusted third-party resource characteristic data set, based upon a second deviation in the second offset;
removing the second exception period set from the second untrusted third-party resource characteristic data set to generate an updated second untrusted third-party resource characteristic data set;
comparing the updated untrusted third-party resource characteristic data set with the updated second untrusted third-party resource characteristic data set; and wherein generating the trusted resource characteristic data set based on at least the updated untrusted third-party resource characteristic data set comprises:
generating the trusted resource characteristic data set based on the comparison of the updated untrusted third-party resource characteristic data set with the updated second untrusted third-party resource characteristic data set.

81. An apparatus for generating a resource offer set, the apparatus comprising at least one processor and at least one memory comprising computer program code, the at least one memory and the computer program code configured to, with the at least one processor, cause the apparatus to:

receive a region-program identifier via one or more client devices;

receive a collection period data object associated with the region-program identifier via the one or more client devices;

validate the collection period data object by comparing the collection period data object to a valid timestamp range object;

retrieve at least one resource offer generation input data set comprising at least a historical offer data set, a resource list data set, a market intelligence data set, and a resource mapping data set;

receive a benchmark and portfolio target data set in response to an input by an offer control user via one or more client devices;

wherein the benchmark and portfolio target data set comprises at least one collection data parameter value for a collection data parameter associated with a region-program data object associated with the region-program identifier;

generate a resource offer set by applying at least one of the resource offer generation input data set and the benchmark and portfolio target data set to a resource offer generation model, wherein the generated resource offer set satisfies the benchmark and portfolio target data set;

generate a control signal causing a renderable object comprising an offer adjustment interface displayed at a first of the one or more client devices and configured for updating the resource offer set to create an adjusted resource offer set, the offer adjustment interface comprising an indication of the resource offer set;

receive a completion control signal from the first of the one or more client devices;

in response to the completion control signal, generate an approval request control signal causing a second renderable data object comprising an approval interface to be displayed at a second of the one or more client devices, wherein the approval interface comprises an indication of the adjusted resource offer set;

receive, from the second of the one or more client devices, an offer approval control signal comprising an offer status indicator, wherein the offer status indicator comprises an approved status indicator or a rejected status indicator; and store the resource offer set associated with the offer status indicator.

82. The apparatus of embodiment 81, the at least one memory and the computer program code further configured to, with the at least one processor, cause the apparatus to:
generate a trusted resource characteristic data set by applying at least an untrusted third-party resource characteristic data set and a distributed resource characteristic data set from a distributed user platform to an exception detection model,
wherein to apply the exception detection model, the computer program code causes the apparatus to:
integrate the untrusted third-party resource characteristic data set and the distributed resource characteristic data set from the distributed user platform;
identify an offset between the untrusted third-party resource characteristic data set and the distributed resource characteristic data set from the distributed user platform;
identify an exception period set, comprising at least one exception period in the untrusted third-party resource characteristic data set, based upon a deviation in the offset;
remove the exception period set from the untrusted third-party resource characteristic data set to generate an updated untrusted third-party resource characteristic data set; and
generate the trusted resource characteristic data set based on the updated untrusted third-party resource characteristic data set,
wherein to generate the resource offer set, the computer program code cause the apparatus to apply the at least one resource offer generation input data set and the trusted resource characteristic data set to the resource offer generation model.

83. The apparatus of embodiment 81, the at least one memory and the computer program code further configured to, with the at least one processor, cause the apparatus to:
apply a second untrusted third-party resource characteristic data set and the distributed resource characteristic data set from the distributed user platform to the exception detection model,
wherein, to apply, the computer program code is configured to cause the apparatus to:
integrate the second untrusted third-party resource characteristic data set and the distributed resource characteristic data set from the distributed user platform;
identify a second offset between the second untrusted third-party resource characteristic data set and the distributed resource characteristic data set from the distributed user platform;
identify a second exception period set, comprising at least one exception period in the second untrusted third-party resource characteristic data set, based upon a second deviation in the second offset;
remove the second exception period set from the second untrusted third-party resource characteristic data set to generate an updated second untrusted third-party resource characteristic data set;
compare the updated untrusted third-party resource characteristic data set with the updated second untrusted third-party resource characteristic data set; and
wherein to generate the trusted resource characteristic data set based on at least the updated untrusted third-party resource characteristic data set, the computer program code cause the apparatus to:
generate the trusted resource characteristic data set based on the comparison of the updated untrusted third-party resource characteristic data set with the updated second untrusted third-party resource characteristic data set.

84. A method for determining a predicted future demand for resources in a dynamic environment, allocating a constrained resources set in the dynamic environment, and generating, adjusting, and facilitating approval of a corresponding resource offer set, the method comprising:
receiving a request data object from a client device associated with a user;
receiving a tiering parameters data object;
receiving a decay parameters data object;
extracting, from the request data object, a resource request set, wherein the resource request set comprises a plurality of request parameters;
extracting, from the tiering parameters data object, a plurality of tiering parameters;
extracting, from the decay parameters data object, a plurality of decay parameters;
assigning the channel profile to a first tier from amongst a plurality of tiers, wherein assigning the channel profile to the first tier comprises applying the plurality of tiering parameters and a first request parameter from the plurality of request parameters to a first model;
generating an adjusted resource request set associated with the user by applying a decay curve to a second request parameter from the plurality of request parameters, wherein the decay curve is based at least in part on the plurality of decay parameters;
determining, based on the assigned first tier and the adjusted resource request set, if the channel profile satisfies each of plurality of threshold conditions;
in response to determining that the channel profile satisfies each of the plurality of threshold conditions, applying the adjusted resource request set and the assigned tier to a second model to generate a resource allocation set for the channel profile;
extracting, from the request data object, a request data set, wherein the request data set is associated with a first set of resources;
receiving a first context data object, wherein the first context data object is associated with one or more resource distribution channels;
retrieving a predicted channel and condition data set, wherein retrieving the predicted channel and condition data set comprises applying the request data set and the first context data object to a first model;
retrieving at least one resource offer generation input data set,
wherein the at least one resource offer generation input data set comprises at least an average resource term data set based on a portion of the predicted channel and condition data set or the resource allocation set;
receiving a benchmark and portfolio target data set in response to an input by an offer control user via one or more client devices;
generating a resource offer set by applying the at least one resource offer generation input data set and benchmark and portfolio target data set to a resource offer generation model, wherein the generated resource offer set satisfies the benchmark and portfolio target data set;
generating a control signal causing a renderable object comprising an offer adjustment interface displayed at a first of the one or more client devices and configured for updating the resource offer set to create an adjusted resource offer set, the offer adjustment interface comprising an indication of the resource offer set;

receiving a completion control signal from the first of the one or more client devices;

in response to the completion control signal, generating an approval request control signal causing a second renderable data object comprising an approval interface to be displayed at a second of the one or more client devices, wherein the approval interface comprises an indication of the adjusted resource offer set;

receiving, from the second of the one or more client devices, an offer approval control signal comprising an offer status indicator; and storing the adjusted resource offer set associated with the offer status indicator.

85. The method of embodiment 84, wherein the benchmark and portfolio target data set includes a distribution time delay input parameter, and the method further comprising:

obtaining a decay parameters data object associated with a decay curve; and adjusting the average resource term data set based on the distribution time delay input parameter and the decay curve.

86. An apparatus for determining a predicted future demand for resources in a dynamic environment, allocating a constrained resources set in the dynamic environment, and generating, adjusting, and facilitating approval of a corresponding resource offer set, the apparatus comprising at least one processor and at least one memory comprising computer program code, the at least one memory and the computer program code configured to, with the at least one processor, cause the apparatus to:

receive a request data object from a client device associated with a user;

receive a tiering parameters data object;

receive a decay parameters data object;

extract, from the request data object, a resource request set, wherein the resource request set comprises a plurality of request parameters;

extract, from the tiering parameters data object, a plurality of tiering parameters;

extract, from the decay parameters data object, a plurality of decay parameters;

assign the channel profile to a first tier from amongst a plurality of tiers, wherein assigning the channel profile to the first tier comprises applying the plurality of tiering parameters and a first request parameter from the plurality of request parameters to a first model;

generate an adjusted resource request set associated with the user by applying a decay curve to a second request parameter from the plurality of request parameters, wherein the decay curve is based at least in part on the plurality of decay parameters;

determine, based on the assigned first tier and the adjusted resource request set, if the channel profile satisfies each of plurality of threshold conditions;

in response to the determination that the channel profile satisfies each of the plurality of threshold conditions, apply the adjusted resource request set and the assigned tier to a second model to generate a resource allocation set for the channel profile;

extract, from the request data object, a request data set, wherein the request data set is associated with a first set of resources;

receive a first context data object, wherein the first context data object is associated with one or more resource distribution channels;

retrieve a predicted channel and condition data set, wherein retrieving the predicted channel and condition data set comprises applying the request data set and the first context data object to a first model;

retrieve at least one resource offer generation input data set, wherein the at least one resource offer generation input data set comprises at least an average resource term data set based on a portion of the predicted channel and condition data set or the resource allocation set;

receive a benchmark and portfolio target data set in response to an input by an offer control user via one or more client devices;

generate a resource offer set by applying the at least one resource offer generation input data set and benchmark and portfolio target data set to a resource offer generation model, wherein the generated resource offer set satisfies the benchmark and portfolio target data set;

generate a control signal causing a renderable object comprising an offer adjustment interface displayed at a first of the one or more client devices and configured for updating the resource offer set to create an adjusted resource offer set, the offer adjustment interface comprising an indication of the resource offer set;

receive a completion control signal from the first of the one or more client devices;

in response to the completion control signal, generate an approval request control signal causing a second renderable data object comprising an approval interface to be displayed at a second of the one or more client devices, wherein the approval interface comprises an indication of the adjusted resource offer set;

receive, from the second of the one or more client devices, an offer approval control signal comprising an offer status indicator; and store the adjusted resource offer set associated with the offer status indicator.

87. The apparatus of embodiment 86, wherein the benchmark and portfolio target data set includes a distribution time delay input parameter, and wherein the at least one memory and the computer program code further configured to, with the at least one processor, cause the apparatus to:

obtain a decay parameters data object associated with a decay curve; and adjust the average resource term data set based on the distribution time delay input parameter and the decay curve.

Many modifications and other embodiments of the inventions set forth herein will come to mind to one skilled in the art to which these inventions pertain having the benefit of the teachings presented in the foregoing descriptions and the associated drawings. For example, any combination of some or all of the subroutines and sub-processes described herein may be claimed in combination or individually without departing from the scope and spirit of the present disclosure. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for allocating a constrained resources set in a dynamic environment, the method comprising:

receiving, from a plurality of client devices, at least a first request data object associated with a first channel profile and a second request data object associated with a second channel profile, wherein the first request data object is associated with at least a first future resource volume and a first future time interval and the second request data object is associated with at least a second future resource volume and a second future time interval;

assigning the first channel profile and the second channel profile to a first tier from amongst a plurality of tiers;

determining, based on the assigned first tier and the first request data object, that the first channel profile satisfies each of a plurality of threshold conditions;

determining, based on the assigned first tier and the second request data object, that the second channel profile satisfies each of the plurality of threshold conditions;

generating channel context data synthesized from a plurality of non-uniform data sets associated with dynamic resource demand and wherein the plurality of non-uniform data sets is acquired from a plurality of external systems by:

scraping a first non-uniform data set from a first external system via a network, retrieving and extracting a second non-uniform data set from a second external system comprising an external social media site;

retrieving a stored third non-uniform data set from a repository;

periodically updating the third non-uniform data set via data received at regular intervals from a third external system;

receiving a fourth non-uniform data set from a fourth external system, the fourth non-uniform data set comprising external environment data;

wherein each of the first non-uniform data set, the second non-uniform data set, the third non-uniform data set, and the fourth non-uniform data set from the plurality of external systems comprises occluded relevant components to be utilized with an allocation model comprising a machine learning model;

determining at least a first third-party identifier corresponding to at least a portion of the first non-uniform data set;

determining at least a second third-party identifier corresponding to at least a portion of the second non-uniform data set;

determining at least a third third-party identifier corresponding to at least a portion of the third non-uniform data set;

determining at least a fourth third-party identifier corresponding to at least a portion of the fourth non-uniform data set;

wherein at least two of the first third-party identifier, the second third-party identifier, the third third-party identifier, or the fourth third-party identifier are not identical;

determining first attribute types corresponding to a plurality of first resource attribute values of the first third-party identifier;

determining second attribute types corresponding to a plurality of second resource attribute values of the second third-party identifier;

determining third attribute types corresponding to a plurality of third resource attribute values of the third third-party identifier;

determining fourth attribute types corresponding to a plurality of fourth resource attribute values of the fourth third-party identifier;

identifying standardized resource attribute values corresponding to each standardized resource identifier of a plurality of standardized resource identifiers, wherein the standardized resource attribute values associated with the standardized resource identifiers;

generating mapping scores for the first third-party identifier, the second third-party identifier, the third third-party identifier, and the fourth third-party identifier relative to one of the standardized resource identifiers by comparing the first resource attribute values, the second resource attribute values, the third resource attribute values, and the fourth resource attribute values with the standardized resource attribute values;

determining a that the mapping scores exceed a threshold value indicating that the first third-party resource identifier, the second third-party resource identifier, the third third-party identifier, and the fourth third-part identifier correspond to the one standardized resource identifier;

normalizing, scaling, and combining at at least the portion of data in the first non-uniform data set, the portion of data in the second non-uniform data set, the portion of data in the third non-uniform data set and the portion of data in the fourth non-uniform data set in a synergized data set linked to the standardized resource identifier, wherein the channel context data comprises the synergized data set; and validating the synergized data set for machine learning using a data sufficiency model, wherein validating the synergized data set comprise testing the data relative to an accuracy threshold of the data sufficiency model, wherein the synergized data set exceeds the accuracy threshold;

training the machine learning model of an allocation model using at least the synergized data set of the channel context data using a supervised learning process, the supervised learning process comprising receiving a plurality of user confirmations from a user interface of a client device during the training to improve an output of the model;

in response to determining that the first channel profile and the second channel profile satisfy each of the plurality of threshold conditions and in real time or near real time relative to receipt of the first request data object and the second request data object, applying a first resource request set associated with the first request data object, a second resource request set associated with the second request data object, a constrained plurality of resources, and the first assigned tier to the allocation model by:

applying the constrained plurality of resources, the first resource request set, and the second resource request set to the machine learning model;

wherein the machine learning model comprises a multivariate adaptive regression splines (MARS) model;

wherein applying the first resource request set and the second resource request set to the MARS model comprises utilizing a hinge function to automatically select variables associated with the first resource request set and the second resource request set and values associated with the variables for knots of the binge function to model an interaction between two or more of the variables to generate a decay set for a predetermined time window;
applying the decay set for the predetermined time window to a logistic regression model to determine a predicted resource allocation set comprising predicted resource allocations at least associated with the first channel profile and the second channel profile for the constrained plurality of resources; and
outputting the predicted resource allocation set;
in real time or near real time relative to receipt of the first request data object and the second request data object and based on the predicted resource allocation set, generating at least one control signal that:
dynamically allocates a first plurality of resources from the constrained plurality of resources and causes transmission of the first plurality of resources to a first system associated with the first channel profile; and
dynamically allocates a second plurality of resources from the constrained plurality of resources and causes transmission of the second plurality of resources to a second system associated with the second channel profile,
wherein the first plurality of resources and the second plurality of resources are determined by the predicted resource allocations in the predicted resource allocation set;
wherein the at least one control signal is transmitted during each of the predetermined time window, the first future time interval, and the second future time interval;
wherein the at least one control signal comprises renderable data transmitted to graphical user interfaces associated with each of the first system and the second system,
updating the training of the machine learning model to generate an updated allocation model with new training data derived from the predicted resource allocation set;
subsequent to updating the training of the machine learning model, receiving at least a third request data object associated with a third channel profile, wherein the third request data object is associated with at least a third future resource volume and a third future time interval;
generating, via the updated allocation model, a subsequent predicted resource allocation set; and
in real time or near real time relative to receipt of the third request data object, generating at least one control signal that dynamically allocates a third plurality of resources from a second constrained plurality of resources and causes transmission of the third plurality of resources to a third system associated with the third channel profile.

2. The method of claim 1, further comprising applying a plurality of tiering parameters and a first request parameter from the first request data object to a first machine learning model to generate first predicted resource volume data associated with the first channel profile, wherein the plurality of tiering parameters comprises an entropy parameter associated with a channel profile.

3. The method of claim 2, further comprising scaling the entropy parameter associated with the first channel profile based at least in part on assigning the entropy parameter associated with the first channel profile to a position in a ranked list of entropy parameters.

4. The method of claim 1, further comprising applying a plurality of tiering parameters and a first request parameter from the first request data object to a first machine learning model to generate first predicted resource volume data associated with the first channel profile, wherein the plurality of tiering parameters comprises an indication of a geographic location associated with a channel profile.

5. The method of claim 1, further comprising scaling a timing parameter based at least in part calculating a number of days reflected by the timing parameter and assigning the calculated number of days to a position in a ranked list of timing parameters.

6. The method of claim 1, further comprising applying a plurality of tiering parameters and a first request parameter from the first request data object to a first machine learning model to generate first predicted resource volume data associated with the first channel profile, wherein the plurality of tiering parameters comprises an indication of an audit status of a channel profile.

7. The method of claim 6, further comprising scaling the indication of the audit status of the first channel profile by at least converting the indication of the audit status of the first channel profile to a single-digit binary value.

8. The method of claim 1, further comprising, applying a plurality of tiering parameters and a first request parameter from the first request data object to a first machine learning model to generate first predicted resource volume data associated with the first channel profile, wherein the plurality of tiering parameters comprises an indication of an exclusivity status of a channel profile.

9. The method of claim 8, further comprising scaling the indication of the exclusivity status of the first channel profile by at least converting the indication of the exclusivity status of the first channel profile to a single-digit binary value.

10. The method of claim 1, wherein assigning the first channel profile to the first tier comprises applying a plurality of tiering parameters and a first request parameter from the first request data object to a first machine learning model by:
determining whether a parameter within the plurality of tiering parameters comprises an outlier; and
removing the outlier from the plurality of tiering parameters.

11. The method of claim 1, further comprising generating a second control signal causing a renderable object comprising an indication of the predicted resource allocation set to be displayed on an interface of a client device.

12. The method of claim 1, wherein the channel context data further comprises at least data extracted from historical records of resource allocations associated with a plurality of channel profiles.

13. The method of claim 1, the method further comprising:
transmitting, to an inventory system, at least one signal that causes the inventory system to physically sort materials corresponding to a set of resources based at least in part on the predicted resource allocation set,
the sorting comprising a first sorted amount of the materials corresponding to the first channel profile and a second sorted amount of the material corresponding to the second channel profile, wherein the first sorted amount and the second sorted amount are defined based at least in part on the predicted resource allocation set.

14. The method of claim 1, the method further comprising:
generating a second control signal causing rendering of a second renderable object comprising an offer adjustment interface, wherein the offer adjustment interface indicates a resource offer set for a set of resources to be allocated, and wherein, in response to receiving user interaction at the offer adjustment interface dynamically updating the set of resources to be allocated to an updated set of resources to be allocated, generating an updated resource allocation set corresponding to the updated set of resources to be allocated.

15. The method of claim 1, the method further comprising:

generating, for at least one user associated with the first channel profile, a second control signal causing a second renderable object comprising one or more access controls for accessing the predicted resource allocation set.

16. The method of claim 1, the method further comprising:

receiving a first indication that the plurality of resources are available to be distributed, and transmitting signals that distribute an available resource set to at least to the first channel profile and to the second channel profile, the signals configured in accordance with the predicted resource allocations in the predicted resource allocation set generated by channel context data trained utilizing the synthesized data set.

17. The method of claim 1, wherein the first plurality of resources is distributed based at least in part on allocation to the first channel profile and the second plurality of resources is distributed based at least in part on allocation to the second channel profile.

18. An apparatus for determining a predicted future demand for resources in a dynamic environment, the apparatus comprising at least one processor and at least one memory comprising computer program code, the at least one memory and the computer program code configured to, with the at least one processor, cause the apparatus to:

receive, from a plurality of client devices, at least a first request data object associated with a first channel profile and a second request data object associated with a second channel profile, wherein the first request data object is associated with at least a first future resource volume and a first future time interval and the second request data object is associated with at least a second future resource volume and a second future time interval;

assign the first channel profile and the second channel profile to a first tier from amongst a plurality of tiers;

determine, based on the assigned first tier and the first request data object, that the first channel profile satisfies each of a plurality of threshold conditions;

determine, based on the assigned first tier and the second request data object, that the second channel profile satisfies each of the plurality of threshold conditions;

generate channel context data synthesized from a plurality of non-uniform data sets associated with dynamic resource demand and wherein the plurality of non-uniform data sets is acquired from a plurality of external systems, wherein generating the channel context data the apparatus is caused to:

scrape a first non-uniform data set from a first external system via a network;

retrieve and extracting a second non-uniform data set from a second external system comprising an external social media site;

retrieve a stored third non-uniform data set from a repository;

periodically update the third non-uniform data set via data received at regular intervals from a third external system;

receive a fourth non-uniform data set from a fourth external system, the fourth non-uniform data set comprising external environment data;

wherein each of the first non-uniform data set, the second non-uniform data set, the third non-uniform data set, and the fourth non-uniform data set from the plurality of external systems comprises occluded relevant components to be utilized with an allocation model comprising a machine learning model;

determine at least a first third-party identifier corresponding to at least a portion of the first non-uniform data set;

determine at least a second third-party identifier corresponding to at least a portion of the second non-uniform data set;

determine at least a third third-party identifier corresponding to at least a portion of the third non-uniform data set;

determine at least a fourth third-party identifier corresponding to at least a portion of the fourth non-uniform data set;

wherein at least two of the first third-party identifier, the second third-party identifier, the third third-party identifier, or the fourth third-party identifier are not identical;

determine first attribute types corresponding to a plurality of first resource attribute values of the first third-party identifier;

determine second attribute types corresponding to a plurality of second resource attribute values of the second third-party identifier;

determine third attribute types corresponding to a plurality of third resource attribute values of the third third-party identifier;

determine fourth attribute types corresponding to a plurality of fourth resource attribute values of the fourth third-party identifier;

identify standardized resource attribute values corresponding to each standardized resource identifier of a plurality of standardized resource identifiers, wherein the standardized resource attribute values associated with the standardized resource identifiers;

generate mapping scores for the first third-party identifier, the second third-party identifier, the third third-party identifier, and the fourth third-party identifier relative to one of the standardized resource identifiers by comparing the first resource attribute values, the second resource attribute values, the third resource attribute values, and the fourth resource attribute values with the standardized resource attribute values;

determine that the mapping scores exceed a threshold value indicating that the first third-party resource identifier, the second third-party resource identifier, the third third-party identifier and the fourth third-party identifier correspond to the one standardized resource identifier;

normalize, scale, and combine at least the portion of data in the first non-uniform data set, the portion of data in the second non-uniform data set, the portion of data in the third non-uniform data set, and the portion of data in the fourth non-uniform data set in a synergized data set linked to the standardized resource identifier, wherein the channel context data comprises the synergized data set; and validating the synergized data set for machine learning using a data sufficiency model, wherein validating the synergized data set comprises testing the data relative to an accuracy threshold of the data sufficiency model, wherein the synergized data set exceeds the accuracy threshold;

train the machine learning model of an allocation model using at least the synergized data set of the channel context data using a supervised learning process, the supervised learning process comprising receiving a plurality of user confirmations from a user interface of a client device during the training to improve an output of the model;

in response to determining that the first channel profile and the second channel profile satisfy each of the plurality of threshold conditions and in real time or near real time relative to receipt of the first request data object and the second request data object, apply a first resource request set associated with the first request data object, a second resource request set associated with the second request data object, a constrained plurality of resources, and the first assigned tier to the allocation model by:

applying the constrained plurality of resources, the first resource request set, and the second resource request set to the machine learning model, wherein the machine learning model comprises a multivariate adaptive regression splines (MARS) model, wherein applying the first resource request set and the second resource request set to the MARS model comprises utilizing a hinge function to automatically select variables associated with the first resource request set and the second resource request set and values associated with the variables for knots of the hinge function to model an interaction between two or more of the variables to generate a decay set for a predetermined time window;

applying the decays set for the predetermined time window to a logistic regression model to determine a predicted resource allocation set comprising predicted resource allocations at least associated with the first channel profile and the second channel profile for the constrained plurality of resources; and outputting the predicted resource allocation set;

in real time or near real time relative to receipt of the first request data object and the second request data object and based on the predicted resource allocation set, generating at least one control signal that:

dynamically allocates a first plurality of resources from the constrained plurality of resources and causes transmission of the first plurality of resources to a first system associated with the first channel profile; and dynamically allocates a second plurality of resources from the constrained plurality of resources and causes transmission of the second plurality of resources to a second system associated with the second channel profile, wherein the first plurality of resources and the second plurality of resources are determined by the predicted resource allocations in the predicted resource allocation set, wherein the at least one control signal is transmitted during each of the predetermined time window, the first future time interval, and the second future time interval;

wherein the at least one control signal comprises renderable data transmitted to graphical user interfaces associated with each of the first system and the second system;

update the training of the machine learning model to generate an updated allocation model with new training data derived from the predicted resource allocation set;

subsequent to updating the training of the machine learning model, receive at least a third request data object associated with a third channel profile, wherein the third request data object is associated with at least a third future resource volume and a third future time interval;

generate, via the updated allocation model, a subsequent predicted resource allocation set; and in real time or near real time relative to receipt of the third request data object, generate at least one control signal that dynamically allocates a third plurality of resources from a second constrained plurality of resources and causes transmission of the third plurality of resources to a third system associated with the third channel profile.

19. A computer program product comprising at least one non-transitory computer-readable storage medium having computer-executable program code instructions stored therein, the computer-executable program code instructions comprising program code instructions configured to:

receive, from a plurality of client devices, at least a first request data object associated with a first channel profile and a second request data object associated with a second channel profile, wherein the first request data object is associated with at least a first future resource volume and a first future time interval and the second request data object is associated with at least a second future resource volume and a second future time interval;

assign the first channel profile and the second channel profile to a first tier from amongst a plurality of tiers;

determine, based on the assigned first tier and the first request data object, that the first channel profile satisfies each of the plurality of threshold conditions;

determine, based on the assigned first tier and the second request data object, that the second channel profile satisfies each of the plurality of threshold conditions;

generate channel context data synthesized from a plurality of non-uniform data sets associated with dynamic resource demand and wherein the plurality of non-uniform data sets is acquired from a plurality of external systems, wherein to generate the channel context data the program code instructions are configured to:

scraping a first non-uniform data set from a first external system via a network;

retrieving and extracting a second non-uniform data set from a second external system comprising an external social media site;

retrieving a stored third non-uniform data set from a repository;

periodically updating the third non-uniform data set via data received at regular intervals from a third external system;

receiving a fourth non-uniform data set from a fourth external system, the fourth non-uniform data set comprising external environment data;

wherein each of the first non-uniform data set, the second non-uniform data set, the third non-uniform data set, and the fourth non-uniform data set from the plurality of external systems comprises occluded relevant components to be utilized with an allocation model comprising a machine learning model;

determine at least a first third-party identifier corresponding to at least a portion of the first non-uniform data set;

determine at least a second third-party identifier corresponding to at least a portion of the second non-uniform data set;

determine at least a third third-party identifier corresponding to at least a portion of the third non-uniform data set;

determine at least a fourth third-party identifier corresponding to at least a portion of the fourth non-uniform data set;

wherein at least two of the first third-party identifier, the second third-party identifier, the third third-party identifier, or the fourth third-party identifier are not identical;

determine first attribute types corresponding to a plurality of first resource attribute values of the first third-party identifier;

determine second attribute types corresponding to a plurality of second resource attribute values of the second third-party identifier;

identify standardized resource attribute values corresponding to each standardized resource identifier of a plurality of standardized resource identifiers, wherein the standardized resource attribute values associated with the standardized resource identifiers;

generate mapping scores for the first third-party identifier, the second third-party identifier, the third third-party identifier, and the fourth third-party identifier relative to one of the standardized resource identifiers by comparing the first resource attribute values, the second resource attribute values, the third resource attribute values, and the fourth resource attribute values with the standardized resource attribute values;

determine that the mapping scores exceed a threshold value indicating that the first third-party resource identifier, the second third-party resource identifier, the third third-party identifier, and the fourth third-party identifier correspond to the one standardized resource identifier;

normalize, scale, and combine at least the portion of data in the first non-uniform data set, the portion of data in the second non-uniform data set, the portion of data in the third non-uniform data set, and the portion of data in the fourth non-uniform data set in a synergized data set linked to the standardized resource identifier, wherein the channel context data comprises the synergized data set; and validate the synergized data set for machine leaning using a data sufficiency model, wherein validating the synergized data set comprises testing the data relative to an accuracy threshold of the data sufficiency model, wherein the synergized data set exceeds the accuracy threshold;

train the machine learning model of an allocation model using at least the synergized data set of the channel context data using a supervised learning process, the supervised learning process comprising receiving a plurality of user confirmations from a user interface of a client device during the training to improve an output of the model;

in response to determining that the first channel profile and the second channel profile satisfy each of the plurality of threshold conditions and in real time or near real time relative to receipt of the first request data object and the second request data object, apply a first resource request set associated with the first request data object, a second resource request set associated with the second request data object, a constrained plurality of resources, and the first assigned tier to the allocation model by:

applying the constrained plurality of resources, the first resource request set, and the second resource request set to the machine learning model;

wherein the machine learning model comprises a multivariate adaptive regression splines (MARS) model;

wherein applying the first resource request set and the second resource request set to the MARS model comprises utilizing a hinge function to automatically select variables associated with the first resource request set and the second resource request set and values associated with the variables for knots of the hinge function to model an interaction between two or more of the variables to generate decay set for a predetermined time window;

applying the decay set for the predetermined time window to a logistic regression model to determine a predicted resource allocation set comprising predicted resource allocations at least associated with the first channel profile and the second channel profile for the constrained plurality of resources; and outputting the predicted resource allocation set;

in real time or near real time relative to receipt of the first request data object and the second request data object and based on the predicted resource allocation set, generate at least one control signal that:

dynamically allocates a first plurality of resources from the constrained plurality of resources and causes transmission of the first plurality of resources to a first system associated with the first channel profile; and dynamically allocates a second plurality of resources from the constrained plurality of resources and causes transmission of the second plurality of resources to a second system associated with the second channel profile, wherein the first plurality of resources and the second plurality of resources are determined by the predicted resource allocations in the predicted resource allocation set;

wherein the at least one control signal is transmitted during each of the predetermined time window, the first future time interval, and the second future time interval;

wherein the at least one control signal comprises renderable data transmitted to graphical user interfaces associated with each of the first system and the second system;

update the training of the machine learning model to generate an updated allocation model with new training data derived from the predicted resource allocation set;

subsequent to updating the training of the machine learning model, receive at least a third request data object associated with a third channel profile, wherein the third request data object is associated with at least a third future resource volume and a third future time interval;
generate, via the updated allocation model, a subsequent predicted resource allocation set; and
in real time or near real time relative to receipt of the third request data object, generate at least one control signal that dynamically allocates a third plurality of resources from a second constrained plurality of resources and causes transmission of the third plurality of resources to a third system associated with the third channel profile.

\* \* \* \* \*

UNITED STATES PATENT AND TRADEMARK OFFICE
CERTIFICATE OF CORRECTION

PATENT NO. : 11,954,623 B2  
APPLICATION NO. : 16/416883  
DATED : April 9, 2024  
INVENTOR(S) : Moorthy et al.

Page 1 of 1

It is certified that error appears in the above-identified patent and that said Letters Patent is hereby corrected as shown below:

In the Claims

Column 104,  
Line 21, "determining a that" should read --determining that--;  
Lines 24 and 25, "third-part" should read --third-party--;  
Line 27, "at at" should read --at--;  
Line 30, "set" should read --set,--;  
Line 37, "comprise" should read --comprises--.

Column 105,  
Line 2, "binge function" should read --hinge function--.

Column 106,  
Line 25, "comprising, applying" should read --comprising applying--;  
Line 60, "material" should read --materials--.

Column 108,  
Line 59, "identifier" should read --identifier,--.

Column 109,  
Line 42, "the decays set" should read --the decay set--.

Column 110,  
Line 45, "the plurality of" should read --a plurality of--.

Column 111,  
Line 58, "machine leaning" should read --machine learning--.

Column 112,  
Line 27, "generate decay set" should read --generate a decay set--.

Signed and Sealed this  
Twenty-eighth Day of January, 2025

Coke Morgan Stewart  
*Acting Director of the United States Patent and Trademark Office*